United States Patent
Aiki et al.

(10) Patent No.: US 9,279,984 B2
(45) Date of Patent: Mar. 8, 2016

(54) IMAGE DISPLAYING APPARATUS AND OPTICAL APPARATUS

(71) Applicant: Sony Corporation, Tokyo (JP)

(72) Inventors: Kazuma Aiki, Tokyo (JP); Katsuyuki Akutsu, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 123 days.

(21) Appl. No.: 14/161,262

(22) Filed: Jan. 22, 2014

(65) Prior Publication Data

US 2014/0160588 A1      Jun. 12, 2014

Related U.S. Application Data

(62) Division of application No. 12/805,038, filed on Jul. 8, 2010, now abandoned.

(30) Foreign Application Priority Data

Jul. 22, 2009  (JP) .................................. 2009-170730
Apr. 27, 2010  (JP) .................................. 2010-101615

(51) Int. Cl.
G02B 5/18       (2006.01)
G02B 27/01      (2006.01)
(Continued)

(52) U.S. Cl.
CPC .......... *G02B 27/0172* (2013.01); *G02B 5/1828* (2013.01); *G02B 5/32* (2013.01); *G02B 6/0038* (2013.01); *G02B 6/00* (2013.01); *G02B 2027/0125* (2013.01); *G02B 2027/0174* (2013.01)

(58) Field of Classification Search
CPC .. G02B 6/0008; G02B 6/0011; G02B 6/0038; G02B 5/1828
USPC ................ 359/34, 15, 565; 385/31, 146, 147; 362/600
See application file for complete search history.

(56) References Cited

U.S. PATENT DOCUMENTS 3,879,109 A    4/1975  Thomas
5,343,489 A *  8/1994  Wangler .......................... 372/93
(Continued)

FOREIGN PATENT DOCUMENTS

CN     1940610 A     4/2007
JP     2003-520984 A 7/2003
(Continued)

OTHER PUBLICATIONS

Chinese Office Action issued Feb. 28, 2014 for corresponding Chinese Application No. 201210166620.3.
(Continued)

*Primary Examiner* — Audrey Y Chang
(74) *Attorney, Agent, or Firm* — Michael Best & Friedrich LLP

(57) ABSTRACT

The image displaying apparatus includes an image production apparatus, a first light conduction section and a second light conduction section. The first light conduction section includes a first light conduction plate which propagates part of incident light thereto by total reflection in the inside thereof and emits the propagated light, and a reflection type volume hologram diffraction grating disposed on the first light conduction plate. The second light conduction section includes a second light conduction plate, a first deflection section and a second deflection section.

8 Claims, 30 Drawing Sheets

(51) Int. Cl.
*F21V 8/00* (2006.01)
*G02B 5/32* (2006.01)
*G02B 6/00* (2006.01)

(56) References Cited

U.S. PATENT DOCUMENTS

| | | |
|---|---|---|
| 6,833,955 B2 | 12/2004 | Niv |
| 7,418,170 B2 * | 8/2008 | Mukawa et al. ............ 385/31 |
| 2003/0067685 A1 | 4/2003 | Niv |
| 2005/0180687 A1 | 8/2005 | Amitai |
| 2007/0070504 A1 | 3/2007 | Akutsu et al. |
| 2007/0070859 A1 | 3/2007 | Hirayama |

FOREIGN PATENT DOCUMENTS

| | | |
|---|---|---|
| JP | 2005-521099 | 7/2005 |
| JP | 2006-162767 | 6/2006 |
| JP | 2007-012530 | 1/2007 |
| JP | 2007-094175 | 4/2007 |

OTHER PUBLICATIONS

Japanese Office Action of Japanese Application No. 2010-149346 mailed Nov. 19, 2013.

* cited by examiner

501

IMAGE DISPLAYING APPARATUS AND OPTICAL APPARATUS

CROSS REFERENCE TO RELATED APPLICATIONS

This is a Divisional Application of U.S. patent application Ser. No. 12/805,038, filed Jul. 8, 2010, which in turn claims priority from Japanese Application No.: 2009-170730, filed on Jul. 22, 2009, and Japanese Application No.: 2010-101615, filed on Apr. 27, 2010, the entire contents of which are incorporated herein by reference.

BACKGROUND OF THE INVENTION

1. Field of the Invention

This invention relates to an optical apparatus and an image displaying apparatus in which the optical apparatus is incorporated.

2. Description of the Related Art

A virtual image displaying apparatus as an image displaying apparatus wherein a virtual image optical system allows a two-dimensional image formed by an image formation apparatus to be observed as an enlarged virtual image by an observer is well known, for example, from JP-T-2005-521099 and Japanese Patent Laid-Open No. 2006-162767.

As conceptually illustrated in FIG. 25, the image displaying apparatus 900 mentioned includes an image formation apparatus 911 including a plurality of pixels arranged in a two-dimensional matrix, a collimate optical system 912 for converting light emitted from the pixels of the image formation apparatus 911 into parallel light and a light conduction section 930 for receiving, conducting and emitting the parallel light from the collimate optical system 912. The light conduction section 930 includes a light conduction plate 931 for propagating incident light in the inside thereof by total reflection and then emitting the propagated light therefrom, a first deflection section 940 formed, for example, from a single-layer light reflecting film for reflecting the light incident to the light conduction plate 931 such that the light incident to the light conduction plate 931 is totally reflected in the inside of the light conduction plate 931 and a second deflection section 950 formed, for example, from a light reflecting multi-layer film having a multi-layer lamination structure for emitting the light propagated in the inside of the light conduction plate 931 by total reflection from the light conduction plate 931. If, for example, a head-mounted display (HMD) unit is formed from such an image displaying apparatus 900 as described above, then reduction in weight and size of the apparatus can be achieved.

Alternatively, a virtual image displaying apparatus as an image displaying apparatus in which a hologram diffraction grating is used in order to allow an observer to observe a two-dimensional image formed by an image formation apparatus as an enlarged virtual image by a virtual image optical system is known, for example, from Japanese Patent Laid-Open No. 2007-094175 and Japanese Patent Laid-Open No. 2007-012530.

As conceptually illustrated in FIGS. 26 and 27, the image displaying apparatus 1000 mentioned above includes, as basic components thereof, an image formation apparatus 1011 for displaying an image, a collimate optical system 1012 and a virtual image optical system or light conduction section 1030 which receives light displayed by the image formation apparatus 1011 and conducts the inputted light to the pupil 41 of an observer. The light conduction section 1030 includes a light conduction plate 1031, and a first diffraction grating member 1040 and a second diffraction grating member 1050 provided on the light conduction plate 1031 and individually formed from a reflection type volume hologram diffraction grating. Light emitted from pixels of the image formation apparatus 1011 is inputted to the collimate optical system 1012, and parallel light is produced by the collimate optical system 1012 and then is introduced to the light conduction plate 1031. The parallel light enters and outgoes from a first face 1032 of the light conduction plate 1031. Meanwhile, the first diffraction grating member 1040 and the second diffraction grating member 1050 are mounted on a second face 1033 of the light conduction plate 1031 which extends in parallel to the first face 1032 of the light conduction plate 1031.

SUMMARY OF THE INVENTION

On an XY plane shown in FIG. 26, image displaying light emitted from the image formation apparatus 1011 is converted into a parallel light flux group wherein the angles of view, that is, the outgoing angles of light emitted from the pixels of the image formation apparatus 1011, are different from each other by the collimate optical system 1012. The parallel light flux group is converted into a light flux group wherein the angles of view are different from each other on an XZ plane orthogonal to the XY plane and is introduced to the light conduction plate 1031. It is to be noted that, in FIG. 26, representative parallel light fluxes on the XY plane are indicated by parallel light fluxes $r_1$ represented by a solid line, $r_2$ represented by an alternate long and short dash line and $r_3$ represented by a broken line. Further, in FIG. 27, representative parallel fluxes on the XZ plane are indicated by parallel light fluxes $R_1$ represented by a solid line, $R_2$ represented by an alternate long and short dash line and $R_3$ represented by a broken line.

In the image displaying apparatus 1000 shown in FIGS. 26 and 27, a leftward and rightward, that is, horizontal, direction and an upward and downward, that is, vertical, direction are defined as a Y direction and a Z direction, respectively. In particular, image displaying light for displaying an image, various kinds of information and so forth is conducted from a transverse direction to the pupil 41 of an observer and enters the pupil 41. It is to be noted that, where the image displaying apparatus 1000 is applied to a head-mounted type display (HMD) unit, the image formation apparatus and so forth are disposed not above the pupil 41 but in a transverse direction with respect to the pupil 41 so that good observation of the external world can be implemented.

On the other hand, with such a configuration as described above, since the propagation distance of the light conducted in the inside of the light conduction plate 1031 becomes comparatively long, a problem given below appears.

Here, in the configuration described above, the image displaying light inputted from the first face 1032 of the light conduction plate 1031 is inputted to the first diffraction grating member 1040 formed from a reflection type volume hologram diffraction grating disposed on the second face 1033 which is a position opposing to the first face 1032. It is to be noted that the reflection type volume hologram diffraction grating has a configuration having a uniform interference fringe pitch on the hologram surface irrespective of a position.

Regarding an X direction component on the XY plane, the light fluxes $r_1$, $r_2$ and $r_3$ of the light diffraction reflected by the first diffraction grating member 1040 in the light conduction plate 1031 are conducted as parallel light fluxes while repetitively totally reflecting between the first face 1032 and the second face 1033, and advances in a Y direction toward the second diffraction grating member 1050 formed from a reflection type volume hologram diffraction grating and provided on the other end of the light conduction plate 1031. Here, since the light conduction plate 1031 is thin and a path of the light which advances in the light conduction plate 1031 is comparatively long as described above, the number of times of total reflection to the second diffraction grating member 1050 is different depending upon a horizontal angle of view as shown in FIG. 26. Therefore, the number of times of reflection of the parallel light $r_3$ inputted while inclining to the second diffraction grating member 1050 (that is, whose horizontal angle of view is positive) from among the parallel light $r_1$, $r_2$ and $r_3$ inputted to the light conduction plate 1031 is smaller than the number of times of reflection of the parallel light $r_1$ inputted to the light conduction plate 1031 with an angle in the opposite direction to the direction of the parallel light $r_3$ (that is, whose horizontal angle of view is negative). In particular, since the interference fringe pitch on the hologram surface of the first diffraction grating member 1040 is uniform, regarding the outgoing angle of diffraction reflection in the first diffraction grating member 1040, the parallel light $r_3$ whose horizontal angle of view is positive is greater than the parallel light $r_1$ whose horizontal angle of view is negative. Then, the parallel light of angles of view inputted to the second diffraction grating member 1050 goes beside from the total reflection condition by the diffraction reflection, and is emitted from the light conduction plate 1031 and then inputted to the pupil 41 of the observer.

In this manner, in the advancing direction of the parallel light fluxes, the number of times of reflection in the light conduction plate 1031 is different depending upon the horizontal angle of view. In other words, the optical path length is different. However, since all of the propagated light fluxes are parallel light fluxes, as it were, a light flux group advances in such a manner as to be folded. As it is apparent if inverse ray tracing is carried out in the configuration shown in FIG. 14 of Japanese Patent Laid-Open No. 2007-12530, there exists a light flux which is returned and reflected at a position extending over the edge portion of the first diffraction grating member 1040 and the second face 1033 from within the light flux group. If the inverse ray tracing is carried out, then part of the light fluxes (that is, a portion reflected on the second face 1033) is repetitively reflected to be diffracted at a different position of the first diffraction grating member 1040 to reach the collimate optical system 1012. On the other hand, the remaining light fluxes are diffracted at an end portion of the first diffraction grating member 1040 to reach the collimate optical system 1012 as they are. In particular, while the light fluxes are parallel light fluxes emitted from the same pixel and having the same angles of view, there exists a light flux which is diffraction reflected at a different portion of the first diffraction grating member 1040 to be multiplexed in the light conduction plate 1031 to propagate.

In this manner, the width regarding the Y direction of a necessary light flux in such an optical system as described above, that is, an aperture stop width in the Y direction, is determined by an end point at which the light flux is folded. On the light conduction plate 1031, the position of the first diffraction grating member 1040 on which the parallel light flux group emitted from the collimate optical system 1012 and inputted to the light conduction plate 1031 is diffraction reflected is determined as the aperture stop position in the Y direction.

On the other hand, regarding the incoming light $R_1$, $R_2$ and $R_3$ whose horizontal angles of view are different from each other on the XZ plane, while the X direction component is repetitively reflected in the light conduction plate 1031, the Z direction component reaches an emerging portion without being reflected. In particular, the light emitted from the collimate optical system 1012 is converged and inputted from the first face 1032 on the XZ plane and then advances in the Y direction in the light conduction plate 1031. Then, the light fluxes advance while being reflected on the first face 1032 and the second face 1033 of the light conduction plate 1031 so as to spread in the Z direction until they come to the second diffraction grating member 1050. Then, the light fluxes are reflected and diffracted by and then emitted from the diffraction grating member 1050 so that they are introduced to the pupil 41 of the observer. In this manner, in the image displaying apparatus 1000, the necessary width of the light fluxes in the Z direction, that is, the aperture stop width in the Z direction, is determined depending upon the position of the pupil 41 of the observer.

Since the aperture stop position in the Z direction is the position of the pupil 41 of the observer, the distance from the collimate optical system 1012 to the aperture stop position in the Z direction is equal to the sum of the distance over which the light is repetitively totally reflected and propagated in the inside of the light conduction plate 1031 and the distance from the light conduction plate 1031 to the pupil 41 of the observer. Therefore, the distance is very long. On the other hand, since the aperture stop position in the Y direction is the position of the first diffraction grating member 1040 disposed on the light conduction plate 1031, the distance to the aperture stop position in the Y direction can be made smaller than that to the aperture stop position in the Z direction. In this manner, since the distance to the aperture stop position is great in the Z direction, the diameter of the collimate optical system 1012 in the Z direction must be set greater than the diameter in the Y direction.

Further, where the diameter of the aperture stop in the Z direction in the image formation apparatus 911 and 1011 is set great, the light ray angle of the peripheral angle of view becomes great in an image emitted from the image formation apparatus 911 and 1011. As a result, the display contrast in a liquid crystal display apparatus or the like used in the image formation apparatus 911 and 1011 decreases and makes a cause of degradation of the picture quality.

Accordingly, it is desirable to provide an image displaying apparatus which allows an observer to observe a two-dimensional image formed by an image formation apparatus as an enlarged virtual image by means of a virtual image optical system and wherein there is no necessity to use a lens of a large diameter in the image formation apparatus and an optical apparatus suitable to incorporate in the image displaying apparatus.

According to a first mode of the present invention, there is provided an image displaying apparatus including:

(A) an image production apparatus;

(B) a first light conduction section adapted to receive, conduct and emit a light emitted from the image production apparatus; and (C) a second light conduction section adapted to receive and conduct light emitted from the first light conduction section and then emit the light toward the pupil of an observer, the first light conduction section including (B-1) a first light conduction plate for propagating part of the incident light by total reflection in the inside thereof and emitting the light therefrom, and (B-2) a reflection type volume hologram diffraction grating disposed on the first light conduction plate, the second light conduction section including
- (C-1) a second light conduction plate adapted to propagate incoming light in the inside thereof by total reflection and then emit the light,
- (C-2) a first deflection section disposed in the second light conduction plate and adapted to deflect light incident to the second light conduction plate such that the light introduced to the second light conduction plate is totally reflected in the inside of the second light conduction plate, and
- (C-3) a second deflection section disposed in the second light conduction plate and adapted to deflect the light propagated in the inside of the second light conduction plate by total reflection over a plural number of times in order to emit the light propagated in the inside of the second light conduction plate by total reflection from the second light conduction plate.

It is to be noted that the term "total reflection" is used here and hereafter to signify internal total reflection or total reflection in the inside of the first light conduction plate or of the second light conduction plate.

According to the first mode of the present invention, there is provided an optical apparatus including:
a first light conduction section configured to receive, conduct and emit a light flux; and
a second light conduction section configured to receive and conduct the light flux emitted from the first light conduction section and then emit the light toward the pupil of an observer,
the first light conduction section including
- (a-1) a first light conduction plate for propagating part of the incident light by total reflection in the inside thereof and emitting the light therefrom, and
- (a-2) a reflection type volume hologram diffraction grating disposed on the first light conduction plate,
the second light conduction section including
- (b-1) a second light conduction plate adapted to propagate incoming light in the inside thereof by total reflection and then emit the light,
- (b-2) first deflection section disposed in the second light conduction plate for deflecting light incident to the second light conduction plate such that the light introduced to the second light conduction plate is totally reflected in the inside of the second light conduction plate, and
- (b-3) second deflection section disposed in the second light conduction plate for deflecting the light propagated in the inside of the second light conduction plate by total reflection over a plural number of times in order to emit the light propagated in the inside of the second light conduction plate by total reflection from the second light conduction plate.

According to a second mode of the present invention, there is provided an image displaying apparatus including:
(A) an image production apparatus; and
(B) a light conduction section configured to receive and conduct light outputted from the image production apparatus and then emit the light toward the pupil of an observer,
the light conduction section including
- (B-1) a light conduction plate for propagating the incident light by total reflection in the inside thereof and emitting the light therefrom,
- (B-2) a first deflection section disposed in the light conduction plate and adapted to deflect the light incident to the light conduction plate so that the light incident to the light conduction plate is totally reflected in the inside of the light conduction plate, and
- (B-3) a second deflection section disposed in the light conduction plate and configured to deflect the light propagated in the inside of the light conduction plate by total reflection over a plural number of times in order to emit the light propagated in the inside of the light conduction plate by total reflection from the light conduction plate,
the image displaying apparatus further including
a beam expansion section configured to expand, where an entering direction of the light into the light conduction plate and a propagation direction of the light in the light conduction plate are defined as an X direction and a Y direction, respectively, the light emitted from the image production apparatus along a Z direction and emit the expanded light to the light conduction section.

According to the second mode of the present invention, there is provided an optical apparatus including:
a light conduction section configured to receive, conduct and emit a light flux,
the light conduction section including
a light conduction plate for propagating the incident light by total reflection in the inside thereof and emitting the propagated light therefrom,
a first deflection section disposed in the light conduction plate for deflecting the light incident to the light conduction plate so that the light incident to the light conduction plate is totally reflected in the inside of the light conduction plate, and
a second deflection section disposed in the light conduction plate for deflecting the light propagated in the inside of the light conduction plate by total reflection over a plural number of times in order to emit the light propagated in the inside of the light conduction plate by total reflection from the light conduction plate,
the optical apparatus further including
beam expansion section configured to expand, where an entering direction of the light flux into the light conduction plate and a propagation direction of the light in the light conduction plate are defined as an X direction and a Y direction, respectively, the light flux along a Z direction and emit the expanded light to the light conduction means.

According to another mode of the present invention, there is provided an image displaying apparatus, including:
(A) an image production apparatus;
(B) a first light conduction section configured to receive, conduct and emit a light emitted from the image production apparatus; and
(C) a second light conduction section configured to receive and conduct light emitted from the first light conduction section and then emit the light toward the pupil of an observer,
the first light conduction section including
- (B-1) a first light conduction plate for propagating part of the incident light by total reflection in the inside thereof and emitting the light therefrom, and
- (B-2) a reflection type volume hologram diffraction grating disposed on the first light conduction plate,
the second light conduction section including
- (C-1) a second light conduction plate configured to propagate incoming light in the inside thereof by total reflection and then emit the light;
- (C-2) a first deflection section disposed in the second light conduction plate and configured to deflect light incident to the second light conduction plate, and (C-3) a second deflection section disposed in the second light conduction plate and configured to deflect the light propagated in the inside of the second light conduction plate by total reflection.

According to a further mode of the present invention, there is provided an image displaying apparatus, including:

(A) an image production apparatus; and (B) a light conduction section configured to receive and conduct light outputted from the image production apparatus and then emit the light toward the pupil of an observer, the light conduction section including (B-1) a light conduction plate for propagating the incident light by total reflection in the inside thereof and emitting the light therefrom, (B-2) a first deflection section disposed in the light conduction plate and configured to deflect light incident to the light conduction plate, and (B-3) a second deflection section disposed in the light conduction plate and configured to deflect the light propagated in the inside of the light conduction plate by total reflection over a plural number of times, the image displaying apparatus further including a beam expansion section configured to expand, where an entering direction of the light into the light conduction plate and a propagation direction of the light in the light conduction plate are defined as a first direction and a second direction, respectively, the light emitted from the image production apparatus along a third direction different from the first direction and the second direction and emit the expanded light to the light conduction section.

It is to be noted that the "second light conduction section" in the image displaying apparatus and the optical apparatus according to the first mode of the present invention and the "light conduction section" in the image displaying apparatus and the optical apparatus according to the second mode of the present invention are substantially same as each other. Thus, in the description given hereinbelow, the "light conduction section" in the image display apparatus and the optical apparatus according to the second mode of the present invention is referred to as "second light conduction section" for the convenience of description. Similarly, the "second light conduction plate" in the image displaying apparatus and the optical apparatus according to the first mode of the present invention and the "light conduction plate" in the image displaying apparatus and the optical apparatus according to the second mode of the present invention are substantially same as each other. Thus, in the description given hereinbelow, the "light conduction plate" in the image display apparatus and the optical apparatus according to the second mode of the present invention is referred to as "second light conduction plate" for the convenience of description.

In the image displaying apparatus and the optical apparatus according to the first mode of the present invention, the first light conduction section is disposed between the image production apparatus and the second light conduction section and is configured from the first light conduction plate and the reflection type volume hologram diffraction grating. Accordingly, the first light conduction section functions as a kind of beam expander, that is, as a kind of beam expansion means, and the shape of a light flux emitted from the image production apparatus and introduced into the first light conduction section is expanded along the light propagation direction by the internal total reflection in the first light conduction plate by the reflection type volume hologram diffraction grating. Then, the light flux of the expanded form is introduced into the second light conduction section. On the other hand, the image displaying apparatus and the optical apparatus according to the second mode of the present invention include the beam expansion section for expanding light or a light flux in the Z direction and introducing the expanded light or light flux to the light conduction section. Therefore, the necessity for setting the diameter of the aperture stop in the Z direction of the image production apparatus to a large diameter is eliminated, and the necessity to use a lens of a large diameter in the image production apparatus is eliminated. Consequently, reduction in size and weight of the image displaying apparatus can be anticipated, and such a situation that the display contrast drops and the picture quality is deteriorated is prevented. Further, while the first light conduction section is formed from the reflection type volume hologram diffraction grating, since interference fringes formed on the reflection type volume hologram diffraction grating have a uniform angle and exhibit uniform refractive index modulation over the entirety thereof, there is no necessity for alignment which is difficult and a dispersion is less likely to occur.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

Figure 1:
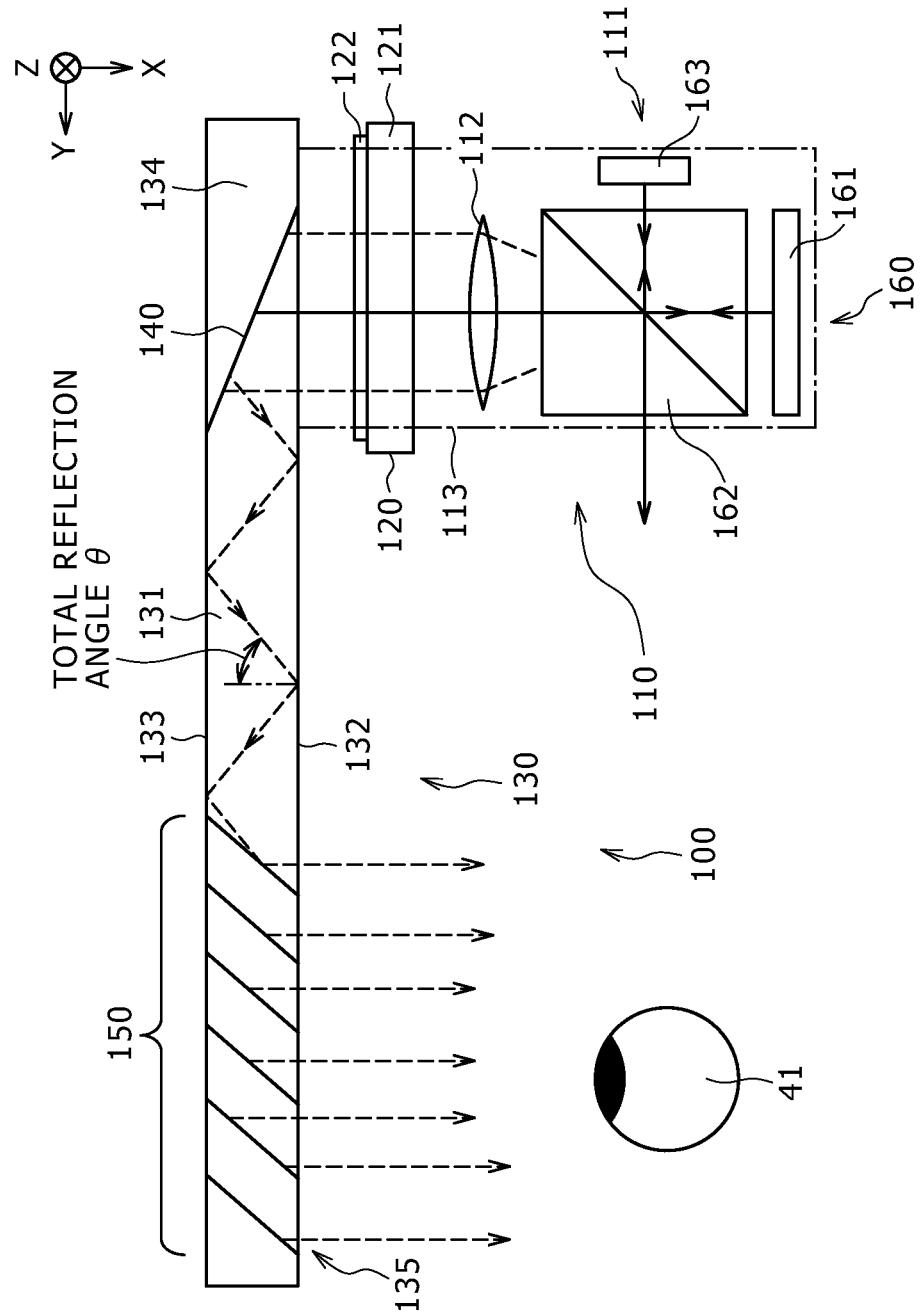
FIG. 1 is a schematic view conceptually showing an image displaying apparatus of an embodiment 1.

In the following, the present invention is described in detail in connection with several embodiments thereof with reference to the accompanying drawings. It is to be noted, however, that the present invention is not limited to the embodiments and various numerical values and materials applied in the embodiments are given for illustrative purpose only. It is to be noted that the description is given in the following order.
1. General Description of the Image Displaying Apparatus, Optical Apparatus and Head-Mounted Type Display Unit of the Invention
2. Embodiment 1 (image displaying apparatus and optical apparatus according to the first mode of the invention)
3. Embodiment 2 (modification to the embodiment 1)
4. Embodiment 3 (different modification to the embodiment 1)
5. Embodiment 4 (modification to the embodiment 3)
6. Embodiment 5 (head-mounted type display unit)
7. Embodiment 6 (modification to the head-mounted type display unit)
8. Embodiment 7 (image displaying apparatus and optical apparatus according to the second mode of the invention)
9. Embodiment 8 (modification to the embodiment 7) General Description of the Image Displaying Apparatus and the Optical Apparatus of the Invention The image display apparatus according to the first mode or the second mode of the present invention may be configured such that the image production apparatus includes:

(A-1) an image formation apparatus having a plurality of pixels arrayed in a two-dimensional matrix; and
(A-2) a collimate optical system for converting light emitted from the pixels of the image formation apparatus into parallel light; and
a light flux of the parallel light obtained by the conversion by the collimate optical system is introduced to the first light conduction section or the beam expansion section.

It is to be noted that the image production apparatus having such a configuration as just described is hereinafter referred to as "image production apparatus of the first form."

Alternatively, the image display apparatus according to the first mode or the second mode of the present invention may be configured such that the image production apparatus includes:

(A-1) a light source;
(A-2) a collimate optical system for converting light emitted from the light source into parallel light;
(A-3) a scanning section for scanning the parallel light emitted from the collimate optical system; and
(A-4) a relay optical system for relaying the parallel light scanned by the scanning section; and
a light flux of the parallel light obtained by the conversion by the relay optical system is introduced to the first light conduction section or the beam expansion section. It is to be noted that the image production apparatus having such a configuration as just described is hereinafter referred to as "image production apparatus of the second form."

The image displaying apparatus according to the first mode of the present invention including the image production apparatus of the first form and the image production apparatus of the second form (such image displaying apparatus may be hereinafter referred to generally as "image displaying apparatus according to the first mode") may be configured such that, where the light propagation direction by the total reflection in the inside of the second light conduction plate is represented as Y direction and the thicknesswise direction of the second light conduction plate is represented as X direction, the light propagation direction by the total reflection in the inside of the first light conduction plate is a Z direction and the thicknesswise direction of the first light conduction plate is the X direction, and the beam diameter along the Z direction of the light emitted from the first light conduction plate is greater than the beam diameter along the Z direction of the light incident to the first light conduction plate. It is to be noted that, where an optically reflecting element such as a mirror is disposed between the first light conduction plate and the second light conduction plate so that light emitted from the first light conduction plate is introduced in a variously varied direction to the second light conduction plate, the relationship of the X, Y and Z directions of the first light conduction plate to those of the second light conduction plate should be determined based on the behavior of light when it is assumed that the optical reflecting element such as a mirror is removed. This similarly applies also to the description given below. Also in the image displaying apparatus according to the second mode of the present invention including the image production apparatus of the first form and the image production apparatus of the second form (such image displaying apparatus may be hereinafter referred to generally as "image displaying apparatus according to the second mode"), the beam diameter along the Z direction of light emitted from the entire beam expansion section is greater than the beam diameter in the Z direction of light incident to the beam expansion section.

The image display apparatus and so forth according to the first mode of the present invention including the preferred forms described above may be configured such that the reflection type volume hologram diffraction grating is disposed on a face of the first light conduction plate opposing to the second light conduction plate; and part of the light incident to the first light conduction plate is diffracted by the reflection type volume hologram diffraction grating, totally reflected once in the inside of the first light conduction plate, totally reflected once on the surface of the reflection type volume hologram diffraction grating, diffracted by the reflection type volume hologram diffraction grating and then emitted from the first light conduction plate while the remaining part of the light incident to the first light conduction plate is emitted from the first light conduction plate after passing through the first light conduction plate and the reflection type volume hologram diffraction grating. It is to be noted that such a behavior of light in the first light conduction section as described above is hereinafter referred to as "emission of the light from the first light conduction section by two times of total reflection" for the convenience of description. The interference fringes formed on the reflection type volume hologram diffraction grating should be optimized so that such a Bragg condition that part of the light incident to the first light conduction plate is diffracted by the reflection type volume hologram diffraction grating, totally reflected once in the inside of the first light conduction plate, totally reflected once on the surface of the reflection type volume hologram diffraction grating, diffracted by the reflection type volume hologram diffraction grating and then emitted from the first light conduction plate may be satisfied.

However, the configuration of the reflection type volume hologram diffraction grating is not limited to that described above. In other words, the configuration the reflection type volume hologram diffraction grating is not limited to the configuration wherein all of part of the light incident to the first light conduction plate is emitted from the first light conduction section by the emission of the light from the first light conduction section by two times of total reflection. In particular, the reflection type volume hologram diffraction grating may be configured otherwise such that the light is totally reflected in the inside of the first light conduction plate, totally reflected on the surface of the reflection type volume hologram diffraction grating, totally reflected in the inside of the first light conduction plate again, totally reflected on the surface of the reflection type volume hologram diffraction grating again, diffracted by the reflection type volume hologram diffraction grating and then emitted from the first light conduction plate. In other words, the reflection type volume hologram diffraction grating may be configured such that part of the part of the light incident to the first light conduction plate is emitted by the "emission of the light from the first light conduction plate by two times of total reflection" and the remaining part of the part of the light incident to the first light conduction plate is emitted by "emission of the light from the first light conduction section by four times of total reflection." Further, the reflection type volume hologram diffraction grating may be configured otherwise such that emission of the light from the first light conduction section by a greater plural number of times of total reflection may occur.

Where all of the part of the light entering the first light conduction plate by the emission of the light from the first light conduction section by two times of total reflection" is emitted, preferably the light amount of the part of the light and the light amount of the remaining part of the light in the first light conduction plate is equal to each other from the point of view of achieving uniformity in intensity distribution of light emitted from the entire first light conduction section. To this end, preferably $$T(1-\eta)=(T\cdot\eta)^2$$

where $\eta$ is the reflection efficiency of the reflection type volume hologram diffraction grating which composes the first light conduction section and T is the light transmission factor of the reflection type volume hologram diffraction grating. In particular, where T=1, preferably $$\eta=0.62$$

is satisfied. In order to achieve this, optimization of selection of a material for forming the reflection type volume hologram diffraction grating, optimization of the thickness of the reflection type volume hologram diffraction grating and optimization of the refractive index modulation degree $\Delta n$ of the reflection type volume hologram diffraction grating should be carried out.

Further, the image displaying apparatus and so forth according to the first mode of the present invention including the preferred forms and configurations described above may be structured such that the first light conduction section has a structure wherein the first light conduction plate, the reflection type volume hologram diffraction grating and a transparent parallel flat plate are laminated in order from the light incidence side. In particular, that the reflection type volume hologram diffraction grating is sandwiched by the first light conduction plate and the transparent parallel flat plate is preferable from the point of view of protection of the reflection type volume hologram diffraction grating, prevention of scattering of light and prevention of a drop of the contract and deterioration of the resolution.

Alternatively, the image displaying apparatus and so forth according to the first mode of the present invention including the preferred forms and configurations described above may be configured such that the first deflection section is configured from a diffraction grating element. In this instance, the image displaying apparatus may be configured such that the first deflection section is configured from a reflection type volume hologram diffraction grating; and where the light propagation direction by the total reflection in the inside of the second light conduction plate is represented a Y direction and the thicknesswise direction of the second light conduction plate is represented as X direction, the direction in which the interference fringes of the reflection type volume hologram diffraction grating which configures the first deflection section are juxtaposed, that is, the diffraction direction, is the Y direction and the direction in which the interference fringes of the reflection type volume hologram diffraction grating which configures the first light conduction section are juxtaposed, that is, the diffraction direction, is a Z direction. Further, in this instance or in such a configuration as just described, image displaying apparatus and so forth may further include a phase difference plate disposed between the first light conduction plate and the second light conduction plate and adapted to vary a phase difference of polarization components outputted from the first light conduction plate. Furthermore, the image displaying apparatus may be configured such that the polarized light components of the light passing through the phase difference plate are parallel to the Z direction, that is, the phase difference plate is disposed such that a polarized light component of the light to enter the first deflection section becomes parallel to the Z direction. Further, the image displaying apparatus may be configured such that a second phase difference plate for varying the phase difference of polarized light components emitted from the collimate optical system or the relay optical system is disposed between the collimate optical system or the relay optical system and the first light conduction plate. Furthermore, the image displaying apparatus may be configured such that the polarized light components of the light passing through the second phase difference plate are parallel to the Y direction, that is, the second phase difference plate is disposed such that a polarized light component of the light to enter the first light conduction plate becomes parallel to the Y direction.

Alternatively, the image display apparatus and so forth according to the first mode or the second mode of the present invention including the preferred forms and configurations described above may be configured such that the first deflection section diffracts the light incident to the second light conduction plate; and the second deflection section diffracts the light propagated in the inside of the second light conduction plate by total reflection over a plural number of times. In this instance, the image displaying apparatus and so forth may be configured such that the first deflection section and the second deflection section are individually configured from a diffraction grating element. Furthermore, the image displaying apparatus and so forth may be configured such that the diffraction grating element is configured from a reflection type diffraction grating element, or the diffraction grating element is configured from a transmission type diffraction grating element, or else one of the diffraction grating elements is configured from a reflection type diffraction grating element and the other one of the diffraction grating elements is configured from a transmission type diffraction grating element.

Or, the image display apparatus and so forth according to the first mode or the second mode of the present invention including the preferred forms and configurations described above may be configured such that the first deflection section reflects the light incident to the second light conduction plate; and the second deflection section transmits and reflects the light propagated in the inside of the second light conduction plate by total reflection over a plural number of times. In this instance, the image display apparatus and so forth may be configured such that the first deflection section functions as a reflecting mirror; and the second deflection section functions as a half-mirror.

Meanwhile, the image display apparatus or the optical apparatus according to the second mode of the present invention including the preferred forms and configurations described above may be configured such that the beam expansion section is configured from a first reflecting mirror and a second reflecting mirror;

the first reflecting mirror is positioned on the opposite side to the image production apparatus with the light conduction section sandwiched therebetween (in other words, positioned on the opposite side to the light incidence side of the light conduction section); and the second reflecting mirror is positioned adjacent the image production apparatus with respect to the light conduction section (in other words, positioned on the light incidence side of the light conduction section). Further, in this instance, the image display apparatus or the optical apparatus may be configured such that part of the light emerging from the image production apparatus repetitively undergoes, in order by a predetermined number of times, passage through the light conduction plate and the first deflection section, reflection by the first reflecting mirror, passage through the light conduction plate and the first deflection section, reflection by the second reflecting mirror, and passage of part of the light through the light conduction plate and the first deflection section.

Alternatively, the image display apparatus or the optical apparatus according to the second mode of the present invention including the preferred forms and configurations described above may be configured such that the beam expansion section is configured from a half-mirror and a reflecting mirror; and the half-mirror and the reflecting mirror are positioned adjacent the image production apparatus with respect to the light conduction section (in other words, positioned on the light incidence side of the light conduction section). Further, in this instance, the image displaying apparatus or the optical apparatus may be configured such that part of the light emitted from the image production apparatus passes through the half-mirror and introduced into the light conduction plate and the remaining part of the light is reflected on the half-mirror and introduced into the reflecting mirror, and part of the light reflected on the reflecting mirror passes through the half-mirror and introduced into the light conduction plate while the remaining part of the light is reflected on the half-mirror and introduced into the reflecting mirror; the passage and reflection actions being repetitively carried out by a predetermined number of times.

The image formation apparatus of the image production apparatus in the first mode may be, for example, an image formation apparatus which includes a reflection type spatial light modulation apparatus and a light source, another image information apparatus which includes a transmission type spatial light modulation apparatus and a light source or a further image formation apparatus which includes light emitting elements such as organic EL (Electro Luminescence) elements, inorganic EL elements or light emitting diodes (LEDs). Among them, the image formation apparatus which includes a reflection type spatial light modulation apparatus and a light source is used preferably. The spatial light modulation apparatus may be, for example, a liquid crystal display apparatus of the transmission type or the reflection type which includes light valves such as, for example, LCOS (Liquid Crystal On Silicon) light valves or a digital micromirror device (DMD), and the light source may be a light emitting element. Further, the reflection type spatial light modulation apparatus may include a liquid crystal display apparatus, and a beam splitter for reflecting part of light from a light source so as to be introduced to the liquid crystal display apparatus and passing part of the light reflected by the liquid crystal display apparatus therethrough so as to be introduced to the collimator optical system. The light emitting element which forms the light source may be a red light emitting element, a green light emitting element, a blue light emitting element or a white light emitting element. Further, the light emitting element may be, for example, a semiconductor laser element, a solid-state laser or an LED. The number of pixels may be determined based on specifications required for the image displaying apparatus. The particular value of the number of pixels may be 320×240, 432×240, 640×480, 854×480, 1024×768 or 1920×1080. The collimate optical system has a function of converting position information of a pixel into angle information of the optical system of the second light conduction section. The collimate optical system may be a convex lens, a concave lens, a free-form surface prism or a hologram lens which are used singly or in combination so that the optical system may have a positive optical power as a whole.

Meanwhile, the light source of the image production apparatus in the second mode may be a light emitting element and particularly a red light emitting element, a green light emitting element, a blue light emitting element or a white light emitting element. Further, the light emitting element may be, for example, a semiconductor laser element, a solid-state laser or an LED. The number of pixels or virtual pixels of the image displaying apparatus of the second mode may be determined based on specifications required for the image displaying apparatus. The particular value of the number of pixels or virtual pixels may be 320×240, 432×240, 640×480, 854×480, 1024×768 or 1920×1080. Where the light source is formed from a red light emitting element, a green light emitting element and a blue light emitting element, preferably, for example, a cross prism is used to carry out color synthesis. The scanning section carries out horizontal scanning and vertical scanning of the light emitted from the light source. For example, a MEMS (Micro Electro Mechanical System) having micromirrors rotatable in two-dimensional directions or a galvano mirror may be used. The relay optical system may be formed from a well-known relay optical system.

For example, as an image formation apparatus or a light source which is configured from a light emitting element and a light valve, the following configurations may be applied in addition to a backlight which generally emits white light and a liquid crystal display apparatus which includes red light emitting elements, green light emitting elements and blue light emitting elements.

Image Formation Apparatus A

The image formation apparatus A includes:

(α) a first image formation apparatus which includes a first light emitting panel wherein a plurality of first light emitting elements for emitting blue light are arrayed in a two-dimensional matrix;

(β) a second image formation apparatus which includes a second light emitting panel wherein a plurality of second light emitting elements for emitting green light are arrayed in a two-dimensional matrix;

(γ) a third image formation apparatus which includes a third light emitting panel wherein a plurality of third light emitting elements for emitting red light are arrayed in a two-dimensional matrix; and (δ) a section configured to integrate light emitting from the first, second and third image formation apparatus into a single light flux (such means may be a dichroic prism; this similarly applies also in the following description), and the light emitting/no-light emitting state of each of the first, second and third light emitting elements is controlled.

Image Formation Apparatus B

The image formation apparatus B includes:

(α) a first image formation apparatus which includes a first light emitting element for emitting blue light, and a first light passage controlling apparatus for controlling passage/non-passage therethrough of the emitted light emitted from the first light emitting element for emitting blue light (the first light passage controlling apparatus is a kind of light valve which is formed, for example, from a liquid crystal display device, a digital micromirror device (DMD) or an LCOS device; this similarly applies also in the following description);

(β) a second image formation apparatus which includes a second light emitting element for emitting green light, and a second light passage controlling apparatus (light valve) for controlling passage/non-passage therethrough of the emitted light emitted from the second light emitting element for emitting green light;

(γ) a third image formation apparatus which includes a third light emitting element for emitting red light, and a third light passage controlling apparatus (light valve) for controlling passage/non-passage therethrough of the emitted light emitted from the third light emitting element for emitting red light; and (δ) a section configured to integrate the light passing through the first, second and third light passage controlling apparatus into a single light flux, and the passage/non-passage of the emitted light emitted from the light emitting elements is controlled by the light passage controlling apparatus to display an image. As a section (material) for conducting the emitted light emitted from the first, second and third light emitting elements to the light passage controlling apparatus, a light conduction member, a microlens array, a mirror, a reflecting plate or a condensing lens may be used.

Image Formation Apparatus C

The image formation apparatus C includes:

(α) a first image formation apparatus which includes a first light emitting panel wherein a plurality of first light emitting elements for emitting blue light are arrayed in a two-dimensional matrix and a blue light passage controlling apparatus (light valve) for controlling passage/non-passage of the emitted light emitted from the first light emitting panel;

(β) a second image formation apparatus which includes a second light emitting panel wherein a plurality of second light emitting elements for emitting green light are arrayed in a two-dimensional matrix and a green light passage controlling apparatus (light valve) for controlling passage/non-passage of the emitted light emitted from the second light emitting panel;

(γ) a third image formation apparatus which includes a third light emitting panel wherein a plurality of third light emitting elements for emitting red light are arrayed in a two-dimensional matrix and a red light passage controlling apparatus (light valve) for controlling passage/non-passage of the emitted light emitted from the third light emitting panel; and (δ) a section configured to integrate the light passing through the blue, green and red light passage controlling apparatus into a single light flux, and the passage/non-passage of the emitted light emitted from the first, second and third light emitting panels is controlled by the light passage controlling apparatus (light valve) to display an image.

Image Formation Apparatus D

The image formation apparatus D is a color display image formation apparatus of the field sequential type and includes:

(α) a first image formation apparatus including a first light emitting element for emitting blue light;

(β) a second image formation apparatus including a second light emitting element for emitting green light;

(γ) a third image formation apparatus including a third light emitting element for emitting red light;

(δ) a section configured to integrate the light emitted from the first, second and third image formation apparatus into a single light flux; and (∈) a light passage controlling apparatus (light valve) for controlling passage/non-passage of the emitted light emitted from the integrating section, and the passage/non-passage of the emitted light emitted from the light emitting elements is controlled by the light passage controlling apparatus to display an image.

Image Formation Apparatus E

Also the image formation apparatus E is a color display image formation apparatus of the field sequential type and includes:

(α) a first image formation apparatus including a first light emitting panel wherein a plurality of first light emitting elements for emitting blue light are arrayed in a two-dimensional matrix;

(β) a second image formation apparatus including a second light emitting panel wherein a plurality of second light emitting elements for emitting green light are arrayed in a two-dimensional matrix;

(γ) a third image formation apparatus including a third light emitting panel wherein a plurality of third light emitting elements for emitting red light are arrayed in a two-dimensional matrix;

(δ) a section configured to integrate the light emitted from the first, second and third image formation apparatus into a single light flux; and (∈) a light passage controlling apparatus (light valve) for controlling passage/non-passage of the emitted light emitted from the integrating section, and the passage/non-passage of the emitted light emitted from the light emitting panels is controlled by the light passage controlling apparatus to display an image.

Image Formation Apparatus F

The image formation apparatus F is a color display image formation apparatus of the passive matrix type or the active matrix type wherein the light emission/no-light emission state of each of first, second and third light emitting elements is controlled to display an image.

Image Formation Apparatus G

The image information apparatus G is a color display image formation apparatus of the field sequential type which includes a light passage controlling apparatus (light valve) for controlling passage/non-passage of emitted light emitted from light emitting element units arrayed in a two-dimensional matrix. The light emission/no-light emission state of each of first, second and third light emitting elements in each light emitting element unit is time-divisionally controlled. Further, the light passage controlling apparatus controls passage/non-passage of the emitted light emitted from the first, second and third light emitting elements to display an image.

In a preferred configuration of the image production apparatus in the first or second form, the first deflection section functions as a reflecting mirror and the second deflection section functions as a half-mirror as described hereinabove. In such a form as just described, the first deflection section, or the reflecting mirror which forms the beam expansion section, can be formed from a light reflecting film, which is a kind of mirror, made of, for example, a metal including an alloy for reflecting light incident to the second light conduction plate or a diffraction grating (for example, a hologram diffraction grating film) for diffracting light incident to the second light conduction plate. Meanwhile, the second deflection section, or the half-mirror which forms the beam expansion section, can be formed, for example, from a dielectric multilayer film, a half-mirror, a polarized light beam splitter or a hologram diffraction grating film. The first and second defection sections are disposed in the inside of the second light conduction plate, that is, incorporated in the inside of the second light conduction plate. Thus, the first defection section reflects or diffracts parallel light incident to the second light conduction plate so that the parallel light incident to the second light conduction plate is totally reflected in the inside of the second light conduction plate. Meanwhile, the second deflection section reflects or diffracts the parallel light propagated in the inside of the second light conduction plate by total reflection by a plural number of times and emits the reflected or diffracted light in the form of parallel light from the second light conduction plate.

Alternatively, in another preferred configuration of the image production apparatus in the first or second form, the first and second deflection sections are formed, for example, from a reflection type diffraction grating element, particularly, for example, from a reflection type volume hologram diffraction grating as described hereinabove. It is to be noted that the first deflection section formed from a reflection type volume hologram diffraction grating is hereinafter referred to sometimes as "first diffraction grating member" and the second deflection section formed from a reflection type volume hologram diffraction grating is hereinafter referred to sometimes as "second diffraction grating member" for the convenience of description.

In order to make the first or second diffraction grating member ready for diffraction reflection of P (here P=3 for red, green and blue) different kinds of light having P different wavelength bands or wavelengths, it can be formed by laminating P diffraction grating layers each formed from a reflection type volume hologram diffraction grating. In each diffraction grating layer, interference fringes corresponding to one frequency band or frequency are formed. Alternatively, in order to make the first or second diffraction grating member ready for diffraction reflection of P different kinds of light having P different wavelength bands or wavelengths, it may be configured such that the first or second diffraction grating member formed from a single diffraction grating layer has p kinds of interference fringes formed therein. Or it is possible to adopt a different configuration wherein an angle of view is divided, for example, equally into three angles and the first or second diffraction grating member is formed by laminating diffraction grating layers corresponding to the divisional angles of view. By adopting any of the configurations described, it is possible to achieve increase of the diffraction efficiency, increase of the diffraction reception angle and optimization of the diffraction angle when light having each wavelength band or wavelength is diffracted and reflected by the first or second diffraction grating member. Also the reflection type volume hologram diffraction grating of the first light conduction section may be configured similarly.

The first and second diffraction grating members may be formed from a photopolymer material. The material and the basic structure of the first and second diffraction grating members each formed from a reflection type volume hologram diffraction grating may be same as those of an existing reflection type volume hologram diffraction grating. The reflection type volume hologram diffraction grating signifies a hologram diffraction grating which diffracts and reflects only + first order diffraction light. While the diffraction grating member has interference fringes formed from the inside to the surface thereof, the formation method of such interference fringes may be same as a traditional formation method. In particular, for example, object light is irradiated upon a member of a photopolymer material, which forms the diffraction grating member, from a first predetermined direction on one side while reference light is simultaneously irradiated upon the member, which forms the diffraction grating member, from a second predetermined direction on the opposite side. Then, interference fringes formed by the object light and the reference light are recorded in the inside of the member which forms the diffraction grating member. If the first predetermined direction, the second predetermined direction and the wavelengths of the object light and the reference light are selected appropriately, then a desired pitch of the interference fringes on the surface of the diffraction grating member and a diffraction inclination angle or slant angle of the interference fringes can be obtained. The inclination angle of interference fringes signifies an angle defined by the surface of the diffraction grating member or diffraction grating layer and the interference fringes. Where the first and second diffraction grating members are formed from a lamination structure of P diffraction grating layers each formed from a reflection type volume hologram diffraction grating, the P diffraction grating layers may first be produced separately from each other and then laminated or adhered using, for example, an ultraviolet curing bonding agent. Or, the P diffraction grating layers may be produced otherwise by producing a single diffraction grating layer using a photopolymer material having self-bonding properties and then successively adhering a photopolymer material having self-bonding properties. The reflection type volume hologram diffraction grating which forms the first light conduction section may be configured similarly.

While, in the image production apparatus of the first or second form, light formed as a plurality of parallel light fluxes by the collimate optical system or the relay optical system is introduced into the second light conduction plate, the request for such parallel light is based on the fact that light wave information when such light is introduced into the second light conduction plate need to be maintained also after the light is emitted from the second light conduction plate through the first and second deflection sections. It is to be noted that, in order to produce a plurality of parallel light fluxes, particularly a light emitting portion of the image formation apparatus should be positioned at the position of a focal length of, for example, the collimate optical system or the relay optical system. The collimate optical system has a function of converting position information of a pixel into angle information in the optical system of the optical apparatus.

In the image display apparatus, the second light conduction plate has two parallel faces, that is, a first face and a second face, extending in parallel to the light propagation direction, that is, to the Y direction, by internal total reflection in the second light conduction plate. Where the face of the second light conduction plate through which light enters is a second light conduction plate incidence face and the face of the second light conduction plate from which light emerges is a second light conduction plate emergence face, the second light conduction plate incidence face and the second light conduction plate emergence face may be formed from the first face. Or, the second light conduction plate incidence face may be formed from the first face while the second light conduction plate emergence face is formed from the second face.

The second light conduction plate, first light conduction plate or transparent parallel flat plate may be formed from any of such materials as glass including quartz glass and optical glass such as BK7, and plastics materials such as PMMA, polycarbonate resins, acrylic-based resins, amorphous polypropylene-based resins and styrene-based resins including AS resins. The shape of the second light conduction plate is not limited to the flat shape but may be a curved shape.

The image display apparatus of the present invention can be used to configure, for example, a head-mounted type display (HMD) unit and is effective to achieve reduction in weight and size of the apparatus. Further, a disagreeable feeling when the apparatus is mounted can be reduced significantly, and besides the production cost can be reduced.

The head-mounted type display unit includes:

(1) a frame of the glasses type for being mounted on the head of an observer; and (2) an image display apparatus of the present invention.

The head-mounted type display unit may include one image display apparatus of the present invention (monocular type) or two image display apparatus of the present invention (binocular type).

The frame includes a front portion disposed in front of the observer, two temple portions attached for pivotal motion to the opposite ends of the front portion by hinges, and two modern portions attached to end portions of the temple portions, and further includes nose pads. Where the entire head-mounted type display unit is viewed, the assembly of the frame and the nose pads has a structure substantially same as that of ordinary glasses except that it does not have a rim. The frame may be formed from a material same as that used for configuration of ordinary glasses such as a metal, an alloy, a plastic material or a suitable combination of such materials. Also the nose pads may be formed in a well-known configuration and structure.

Further, from a point of view of the design of the head-mounted type display unit or of easiness of mounting of the head-mounted type display unit, the head-mounted type display unit is formed preferably such that wiring lines such as a signal line and a power supply line from one or two image production apparatus extend through the temple portions and the inside of the modern portions and outwardly from the end portions of the modern portions and are connected to an external circuit which may be a controlling circuit. Further, each image production apparatus includes a headphone section, and the head-mounted type display unit is configured further preferably such that headphone wiring lines from the image production apparatus extend through the temple portions and the inside of the modern portions and further from the end portions of the modern portions to the headphone sections. The headphone sections may be, for example, those of the inner ear type or those of the canal type. More particularly, the headphone section wiring lines are preferably configured such that they extend from the end portions of the modern portions to the headphone sections in such a manner as to go round the rear side of the auricles or ear capsules.

The head-mounted type display unit may be formed such that an image pickup apparatus is attached to a central portion of the front portion. The image pickup apparatus particularly includes a solid-state image pickup element formed, for example, from a CCD sensor or a CMOS sensor, and a lens. Wiring lines from the image pickup apparatus may, for example, extend along the rear face of the front portion and be connected to one of the image displaying apparatus. Further, the wiring lines may be included in the wiring lines extending from the image production apparatus.

Where the head-mounted type display unit is formed as that of the binocular type, preferably it is configured such that the second light conduction section is disposed as a whole on the center side of the face of the observer with respect to the image production apparatus; that the head-mounted type display unit further includes a coupling member for coupling the two image displaying apparatus to each other; that the coupling member is attached to the side, which opposes to the observer, of a central portion of the frame positioned between the two pupils of the observer; and that a projection image of the coupling member is included in a projection image of the frame.

If the head-mounted type display unit is structured such that the coupling member is attached to the central portion of the frame positioned between the two pupils of the observer in this manner, that is, where the image display apparatus are not attached directly to the frame, then when the observer mounts the frame on the head thereof, the temple portions are placed into an outwardly expanded state. As a result, even if the frame is deformed, such deformation of the frame does not cause displacement or positional variation of the image reproduction apparatus or of the second light conduction section, or even if the deformation causes such displacement, the amount of such displacement is very small. Therefore, such a situation that the angle of convergence of the left and right images varies can be prevented with certainty. Besides, since there is no necessity to raise the rigidity of the front portion of the frame, increase in weight of the frame, degradation in design performance and increase of the cost are not encountered. Further, since the image displaying apparatus are not attached directly to the frame of the glasses type, the design, color and so forth of the frame can be selected freely depending upon the liking of the observer, and also the restriction to the design of the frame is little and the degree of freedom in design is high. In addition, the coupling member is disposed between the observer and the frame, and besides a projection image of the coupling member is included in a projection image of the frame. In other words, when the head-mounted type display unit is observed from the front of the observer, the coupling member is hidden by the frame. Accordingly, high design performances can be provided to the head-mounted type display unit.

It is to be noted that the coupling member is attached preferably to the face of the central portion of the front portion thereof which is positioned between the two pupils of the observer. The central portion of the front portion corresponds to a bridging portion of ordinary glasses.

Although the two image displaying apparatus are coupled to each other by the coupling member, particularly the image production apparatus are attached preferably to end portions of the coupling member such that the attachment state thereof can be adjusted. In this instance, each image production apparatus is preferably positioned on the outer side with respect to the pupils of the observer. Further, in such a configuration as just described, where the distance between the attached portion center of one of the image production apparatus and an end portion of the frame is represented by $\alpha$, the distance from the center of the coupling member to the end portion of the frame by $\beta$, the distance between the attached portion center of the other image production apparatus and the end portion of the frame by $\gamma$, and the length of the frame by L, $0.01 \times L \leq \alpha \leq 0.30 \times L$ is satisfied. Preferably, $0.05 \times L \leq \alpha \leq 0.25 \times L$ is satisfied. Further, $0.35 \times L \leq \beta \leq 0.65 \times L$ is satisfied, and preferably, $0.45 \times L \leq \beta \leq 0.55 \times L$ is satisfied. Furthermore, $0.70 \times L \leq \gamma \leq 0.99 \times L$ is satisfied, and preferably, $0.75 \times L \leq \gamma \leq 0.95 \times L$ is satisfied. The attachment of the image production apparatus to the opposite end portions of the coupling member is carried out in the following manner. In particular, for example, three through-holes are provided at different locations of each end portion of the coupling member, and threaded portions corresponding to the through-holes are provided on each image production apparatus. Then, a screw is inserted into each through-hole and screwed into a corresponding one of the threaded portions provided on the image production apparatus. A spring is inserted in advance between the screw and the threaded-portion. Thus, the mounted state of the image production apparatus, that is, the inclination of the image production apparatus with respect to the coupling member, can be adjusted by the tightened state of the screws.

Here, the attachment portion center of an image production apparatus is a bisecting point, along an axial direction of the frame, of a portion of a projection image of the frame with which a projection image of the image production apparatus which is obtained when the image production apparatus and the frame are projected to a virtual plane in a state wherein the image production apparatus is attached to the coupling member overlaps. Further, the center of the coupling member is a bisecting point, along the axial direction of the frame, of a portion of the coupling member at which the coupling member contacts with the frame in the state wherein the coupling member is attached to the frame. The length of the frame where the frame is curved is a length of the projection image of the frame. It is to be noted that the projection direction is a perpendicular direction to the face of the observer.

Alternatively, the head-mounted type display unit may be formed such that, although the two image displaying apparatus are coupled to each other by the coupling member, particularly the coupling member couples the two second light conduction sections to each other. It is to be noted that the two second light conduction sections are sometimes produced as a unitary member. In such an instance, the coupling member is attached to the integrally produced second light conduction sections, and also this coupling form is included in the form wherein the coupling member couples the two second light conduction sections to each other. Where the distance between the center of one of the image production apparatus and one end portion of the frame is represented by $\alpha'$ and the distance between the center of the other image production apparatus and the one end portion of the frame is represented by $\gamma'$, also the values of $\alpha'$ and $\gamma'$ are preferably equal to those of $\alpha$ and $\gamma$ specified hereinabove, respectively. It is to be noted that the center of an image production apparatus is a bisecting point, along an axial direction of the frame, of a portion of a projection image of the frame with which a projection image of the image production apparatus which is obtained when the image production apparatus and the frame are projected to a virtual plane in a state wherein the image production apparatus is attached to the second light conduction section overlaps.

The shape of the coupling member can essentially be determined arbitrarily as far as the projection image of the coupling member is included in the projection image of the frame, and, for example, the coupling member may have a shape of a bar or an elongated plate. Also the material of the coupling member may be a metal, an alloy, a plastic material or a suitable combination of such materials.

Embodiment 1

Figure 4:
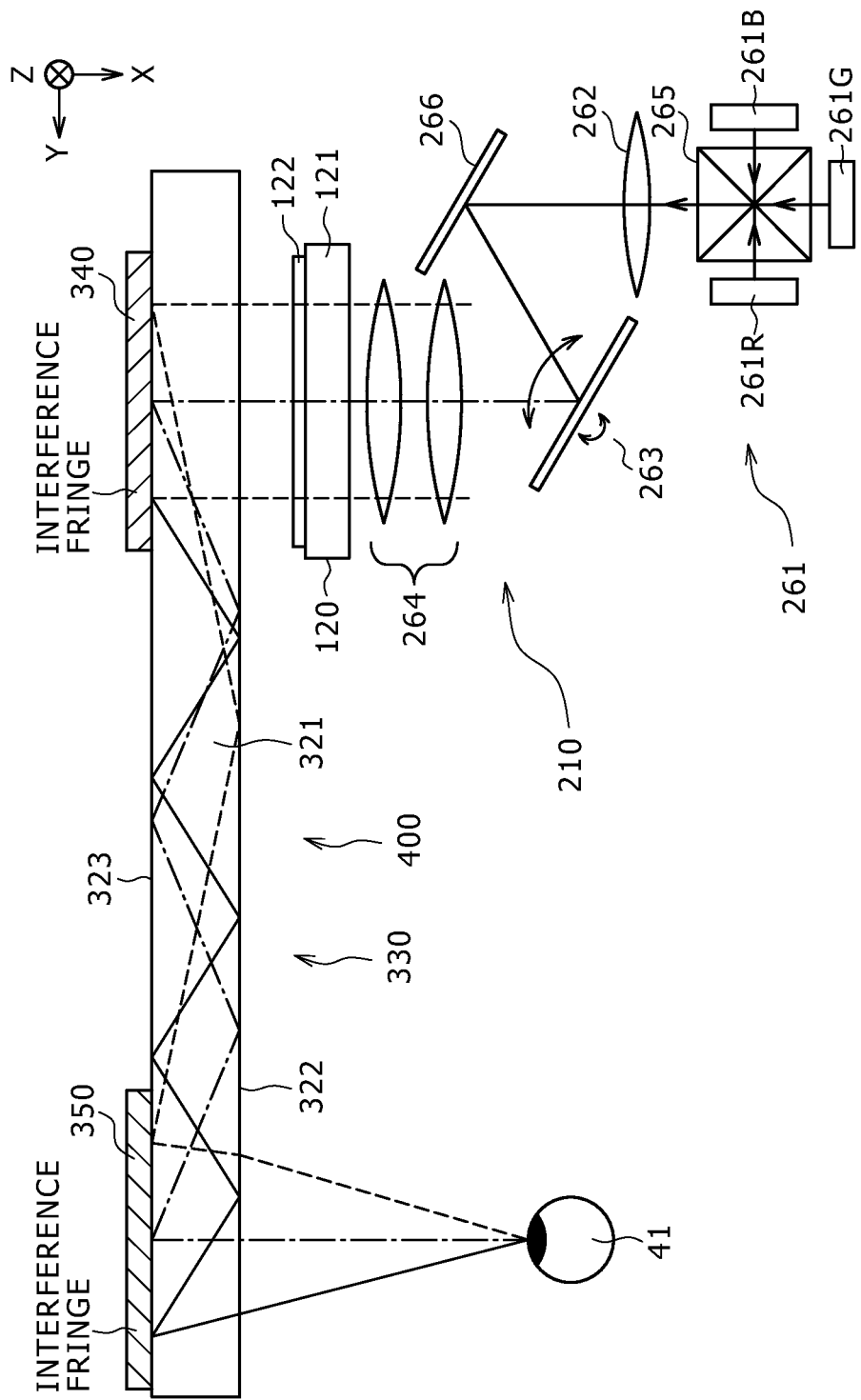
FIG. 4 is a schematic view conceptually showing an image displaying apparatus of an embodiment 4.
Figure 5A:
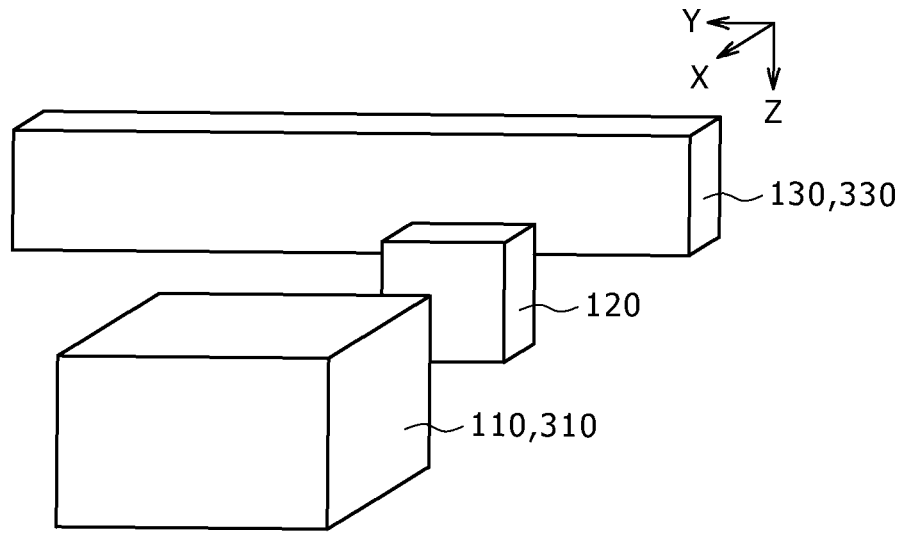
FIG. 5A is a view schematically showing an arrangement state of an image production apparatus, a first light conduction section and a second light conduction section.
Figure 5B:
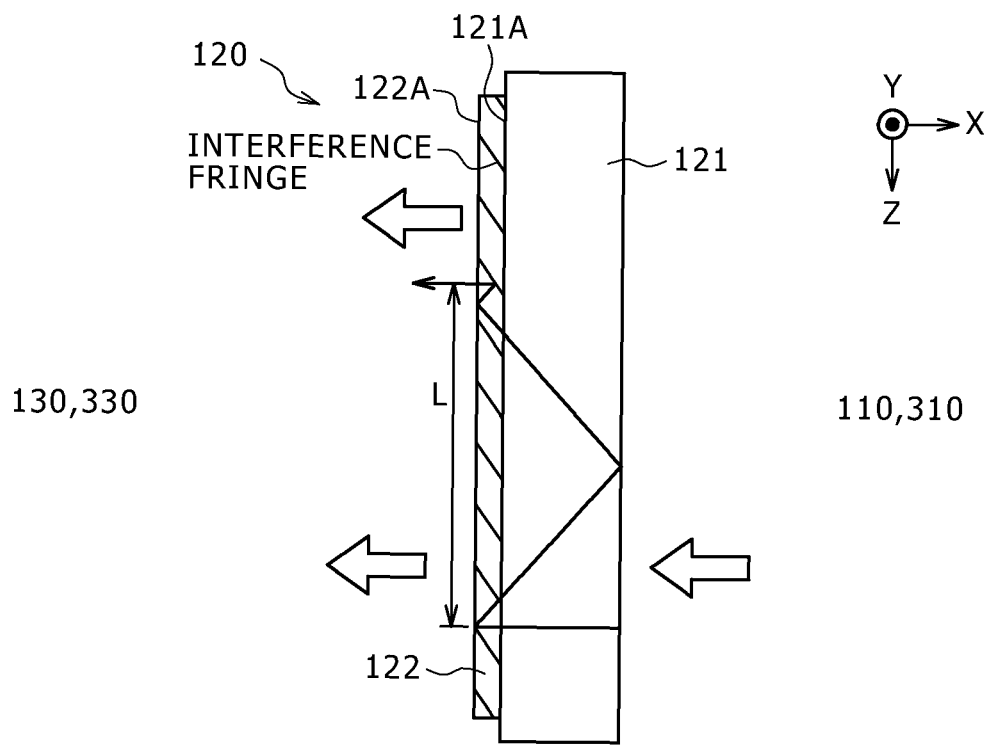
FIG. 5B is a schematic view conceptually showing the first light conduction section in section.

An embodiment 1 relates to the image displaying apparatus according to the first mode of the present invention and the optical apparatus according to the first mode of the present invention and further relates to the image production apparatus of the first form. The image displaying apparatus according to the embodiment 1 and embodiments 2 to 4 hereinafter described are conceptually shown in FIGS. 1, 2, 3A and 4, respectively. Further, an arrangement state of the image production apparatus, a first light conduction section and a second light conduction section is schematically shown in FIG. 5A, and a concept when the first light conduction section is cut is illustrated in FIG. 5B.

The image displaying apparatus 100, 200, 300 or 400 according to the embodiment 1 or any of the embodiments 2 to 4 hereinafter described includes (A) an image production apparatus 110 or 210;

(B) a first light conduction section 120 adapted to receive, conduct and emit the light emitted from the image production apparatus 110 or 210; and (C) a second light conduction section 130 or 330 adapted to receive and conduct light emitted from the first light conduction section 120 and then emit the light toward the pupil 41 of an observer 40. The first light conduction section 120 includes:
(B-1) a first light conduction plate 121 for propagating part of the incident light by total reflection in the inside thereof and emitting the propagated light therefrom;
(B-2) a reflection type volume hologram diffraction grating 122 disposed on the first light conduction plate 121. Meanwhile, the second light conduction section 130 or 330 includes:
(C-1) a second light conduction plate 131 or 331 adapted to propagate incoming light in the inside thereof by total reflection and then emit the light;
(C-2) a first deflection section 140 or 340 disposed on the second light conduction plate 131 or 331 and adapted to deflect light incident to the second light conduction plate 131 or 331 such that the light introduced to the second light conduction plate 131 or 331 is totally reflected in the inside of the second light conduction plate 131 or 331; and
(C-3) a second deflection section 150 or 350 disposed on the second light conduction plate 131 or 331 and adapted to deflect the light propagated in the inside of the second light conduction plate 131 or 331 by total reflection over a plural number of times in order to emit the light propagated in the inside of the second light conduction plate 131 or 331 by total reflection from the second light conduction plate 131 or 331. It is to be noted that the second light conduction section 130 or 330 is of the see-through type or half-transmission type.

Meanwhile, the optical apparatus in the embodiment 1 or any of the embodiments 2 to 4 hereinafter described includes:
a first light conduction section 120 adapted to receive, conduct and emit a light flux; and
a second light conduction section 130 or 330 adapted to receive and conduct the light flux emitted from the first light conduction section 120 and then emit the light.
The first light conduction section 120 includes:
(a-1) a first light conduction plate for propagating part of the incident light by total reflection in the inside thereof and emitting the propagated light therefrom; and
(a-2) a reflection type volume hologram diffraction grating 122 disposed on the first light conduction plate 121, and the second light conduction section 130 or 330 includes:
(b-1) a second light conduction plate 131 or 331 adapted to propagate incoming light in the inside thereof by total reflection and then emit the light;
(b-2) a first deflection section 140 or 340 disposed on the second light conduction plate 131 or 331 and adapted to deflect light incident to the second light conduction plate 131 or 331 such that the light introduced to the second light conduction plate 131 or 331 is totally reflected in the inside of the second light conduction plate 131 or 331; and
(b-3) a second deflection section 150 or 350 disposed on the second light conduction plate 131 or 331 and adapted to deflect the light propagated in the inside of the second light conduction plate 131 or 331 by total reflection over a plural number of times in order to emit the light propagated in the inside of the second light conduction plate 131 or 331 by total reflection from the second light conduction plate 131 or 331.

Here, in the image displaying apparatus 100 or 300 of the embodiment 1 or the embodiment 3 which is hereinafter described, the image production apparatus 110 includes:
(A-1) an image formation apparatus 111 having a plurality of pixels arrayed in a two-dimensional matrix; and
(A-2) a collimate optical system 112 for converting light emitted from the pixels of the image formation apparatus 111 into parallel light; and
a light flux of the parallel light obtained by the conversion by the collimate optical system 112 is introduced to the first light conduction section 120.

The first deflection section 140 and the second deflection section 150 are disposed in the inside of the second light conduction plate 131. The first deflection section 140 reflects light entering the second light conduction plate 131, and the second deflection section 150 passes and reflects the light propagated in the inside of the second light conduction plate 131 by total reflection by a plural number of times. In other words, the first deflection section 140 functions as a reflecting mirror, and the second deflection section 150 functions as a half mirror. More particularly, the first deflection section 140 provided in the inside of the second light conduction plate 131 is formed from a light reflecting mirror which is a kind of mirror made of aluminum for reflecting light entering the second light conduction plate 131. Meanwhile, the second deflection section 150 provided in the inside of the second light conduction plate 131 is formed from a multilayer laminated structure wherein a large number of dielectric laminate films are laminated. The dielectric laminate films are formed, for example, from a $TiO_2$ film as a high dielectric constant material and a $SiO_2$ film as a low dielectric constant material. A multilayer laminated structure wherein a large number of dielectric laminate films are laminated is disclosed in JP-T-2005-521099. While, in FIGS. 1 and 2, a dielectric laminate film of six layers is shown, the number of layers of the dielectric laminate film is not limited to this. Between adjacent ones of the dielectric laminate films, a thin piece made of a material same as that of the second light conduction plate 131 is sandwiched. It is to be noted that, by the first deflection section 140, parallel light entering the second light conduction plate 131 is reflected or refracted so that the incident parallel light may be totally reflected in the inside of the second light conduction plate 131. On the other hand, by the second deflection section 150, parallel light propagated in the inside of the second light conduction plate 131 by total reflection is reflected or diffracted by a plural number of times and emitted in the form of parallel light from the second light conduction plate 131.

The first deflection section 140 may be formed by cutting away a portion 134 of the second light conduction plate 131 at which the first deflection section 140 is to be provided to provide an inclined face at which the first deflection section 140 is to be formed on the second light conduction plate 131, forming a light reflecting film on the inclined face by vapor deposition and adhering the cut away portion 134 of the second light conduction plate 131 back to the first deflection section 140. Meanwhile, the second deflection section 150 may be formed by producing a multilayer laminate structure wherein a large number of layers of a material such as the material of the second light conduction plate 131 such as, for example, glass and a large number of dielectric laminated films, which can be formed, for example, by vapor deposition, are laminated, cutting away a portion 135 of the second light conduction plate 131 at which the second deflection section 150 is to be provided to form an inclined face, adhering the multilayer laminate structure to the inclined face, and carrying out polishing to put the profile in order. The second light conduction section 130 wherein the first deflection section 140 and the second deflection section 150 are provided in the second light conduction plate 131 can be obtained in this manner.

In the embodiment 1 or the embodiment 3 which is hereinafter described, the image formation apparatus 111 includes a reflection type spatial optical modulation apparatus 160 and a light source 163 which is formed from a light emitting diode which emits white light. More particularly, the reflection type spatial optical modulation apparatus 160 includes a liquid crystal display (LCD) apparatus 161 formed from an LCOS as a light valve, and a polarized light beam splitter 162 for reflecting a part of the light from the light source 163 to introduce the light to the liquid crystal display apparatus 161, and passing part of the light reflected by the liquid crystal display apparatus 161 therethrough so as to be introduced to the collimate optical system 112. The liquid crystal display apparatus 161 includes a plurality of, for example, 320×240, pixels or liquid crystal cells arrayed in a two-dimensional matrix. The polarized light beam splitter 162 has a known configuration and structure. Non-polarized light emitted from the light source 163 collides with the polarized light beam splitter 162. The polarized light beam splitter 162 passes a P polarized light component of the incident light therethrough and emits the same to the outside of the system. On the other hand, an S polarized light component of the incident light is reflected by the polarized light beam splitter 162 and enters the liquid crystal display apparatus 161. Then, the S polarized light component is reflected in the inside of the liquid crystal display apparatus 161 and then emitted from the liquid crystal display apparatus 161. Here, of the light emitted from the liquid crystal display apparatus 161, light emitted from a pixel which displays "white" includes much P polarized light component, and light emitted from another pixel which displays "black" includes much S polarized light component. Accordingly, the P polarized light component from within the light emitted from the liquid crystal display apparatus 161 and colliding with the polarized light beam splitter 162 passes through the polarized light beam splitter 162 and are introduced to the collimate optical system 112. Meanwhile, the S polarized light component is reflected by the polarized light beam splitter 162 and returned to the light source 163. The liquid crystal display apparatus 161 includes a plurality of, for example, 320×240, pixels (the number of liquid crystal cells is equal to three times the number of pixels) arrayed in a two-dimensional matrix. The collimate optical system 112 is formed, for example, from a convex lens, and the image formation apparatus 111, more particularly, the liquid crystal display apparatus 161, is disposed at the position of a focal length of the collimate optical system 112 in order to produce parallel light. Meanwhile, one pixel is formed from a red light emitting subpixel for emitting red light, a green light emitting subpixel for emitting green light and a blue light emitting subpixel for emitting blue light.

Here, in the embodiment 1 or in any of the embodiments 2 to 4, the second light conduction plate 131 or 331 made of an optical glass or plastic material has two parallel faces (first face 132 or 332 and second face 133 or 333) extending in parallel to a light propagation direction, that is, in a Y direction, by internal total reflection of the second light conduction plate 131 or 331. The first face 132 or 332 and the second face 133 or 333 oppose to each other. Parallel light enters through the first face 132 or 332 which corresponds to a light incident face and propagates by total reflection in the inside of the second light conduction plate 131 or 331, whereafter it is emitted from the first face 132 or 332 which corresponds to a light emergent face. It is to be noted that the light incident face and the light emergent face are not limited to them but the light incident face may be formed from the second face 133 or 333 and the light emergent face may be formed from the first face 132 or 332.

In order to make the reflection type volume hologram diffraction grating 122, which forms the first light conduction section 120, ready for diffraction reflection of P (here P=3 for red, green and blue) different kinds of light having P different wavelength bands or wavelengths, the reflection type volume hologram diffraction grating 122 is formed by laminating P diffraction grating layers each formed from a reflection type volume hologram diffraction grating. It is to be noted that, in each diffraction grating layer made of a photopolymer material, interference fringes corresponding to one frequency band or frequency are formed, and the diffraction grating layers are produced by a hitherto known method. More particularly, the reflection type volume hologram diffraction grating 122 has a structure wherein a diffraction grating layer for diffracting and reflecting red light, another diffraction grating layer for diffracting and reflecting green light and a further diffraction grating layer for diffracting and reflecting blue light are laminated. The pitch of the interference fringes formed on the diffraction grating layers or diffraction optical elements is fixed, and the interference fringes have a linear form and extend in parallel to the Y direction. It is to be noted that the reflection type volume hologram diffraction grating 122 is shown with a single layer. Adoption of such a configuration as just described can achieve increase of the diffraction efficiency, increase of the diffraction reception angle and optimization of the diffraction angle when light having the frequency bands or frequencies is diffracted and reflected by the reflection type volume hologram diffraction grating 122. It is to be noted that also a first diffraction grating member 340 and a second diffraction grating member 350 hereinafter described may be configured similarly.

Here, where the light propagation direction by internal total reflection in the second light conduction plate 131 or 331 is defined as Y direction and the thicknesswise direction of the second light conduction plate 131 or 331 is defined as X direction, the light propagation direction by internal total reflection of the first light conduction plate 121 is a Z direction and the thicknesswise direction of the first light conduction plate 121 is the X direction. Then, the beam diameter along the Z direction of light emitted from the first light conduction plate 121 is greater than the beam diameter along the Z direction of light incident to the first light conduction plate 121.

FIG. 5B shows the inside of the reflection type volume hologram diffraction grating 122 in an enlarged scale. Referring to FIG. 5B, the reflection type volume hologram diffraction grating 122 is disposed on a face 121A of the first light conduction plate 121 which opposes to the second light conduction plate 131 or 331. Thus, part of light incident to the first light conduction plate 121 is diffracted by the reflection type volume hologram diffraction grating 122 and is totally reflected once in the inside the first light conduction plate 121. Then, the light is totally reflected by the surface 122A of the reflection type volume hologram diffraction grating 122 and diffracted by the reflection type volume hologram diffraction grating 122, whereafter it is emitted from the first light conduction plate 121. Meanwhile, the remaining part of the light incident to the first light conduction plate 121 passes through and is emitted from the first light conduction plate 121 and the reflection type volume hologram diffraction grating 122. In particular, in the embodiments 1 to 4, "emission of light from the first light conduction section by two times of total reflection" is adopted. Then, in order to make the light amount of the part and the light amount of the remaining part of the light in the first light conduction plate 121 equal to each other to establish uniformity of the intensity distribution of the light to be emitted from the entire first light conduction section 120, where the reflection efficiency of the reflection type volume hologram diffraction grating 122 is represented by η and the light transmission factor T is T=1, the reflection efficiency η is set to 0.62.

Further, by adopting such a configuration as described above, it is possible to make the beam diameter along the Z direction of light to be emitted from the first light conduction plate 121 greater by twice than the beam diameter along the Z direction of light to be incident to the first light conduction plate 121. In other words, the first light conduction section 120 functions as a kind of expander. Accordingly, the shape of a light flux emitted from the image production apparatus 110 to enter the first light conduction section 120 is deformed appropriately by the first light conduction section 120, and the light flux of the deformed shape enters the second light conduction section 130 or 330. Therefore, there is no necessity to set the diameter of the aperture stop in the Z direction in the image formation apparatus 111 to a great diameter. In other words, there is no necessity to increase the diameter of the lens provided in the collimate optical system 112 provided in the image formation apparatus 111, and reduction in size and weight of the image displaying apparatus can be anticipated. Further, such a problem that the display contrast drops and the picture quality is deteriorated does not occur.

If the surface 122A of the reflection type volume hologram diffraction grating 122 is not sufficiently smooth or flat, then the light may be scattered or drop of the contrast or deterioration of the resolution may occur. From a point of view of prevention of occurrence of such a problem as just described and also of protection of the reflection type volume hologram diffraction grating 122, the first light conduction section 120 may otherwise be configured such that the first light conduction plate 121, reflection type volume hologram diffraction grating 122 and transparent parallel flat plat are laminated in order from the light incidence side. This also applies similarly to the other embodiments described below.

Embodiment 2

Figure 2:
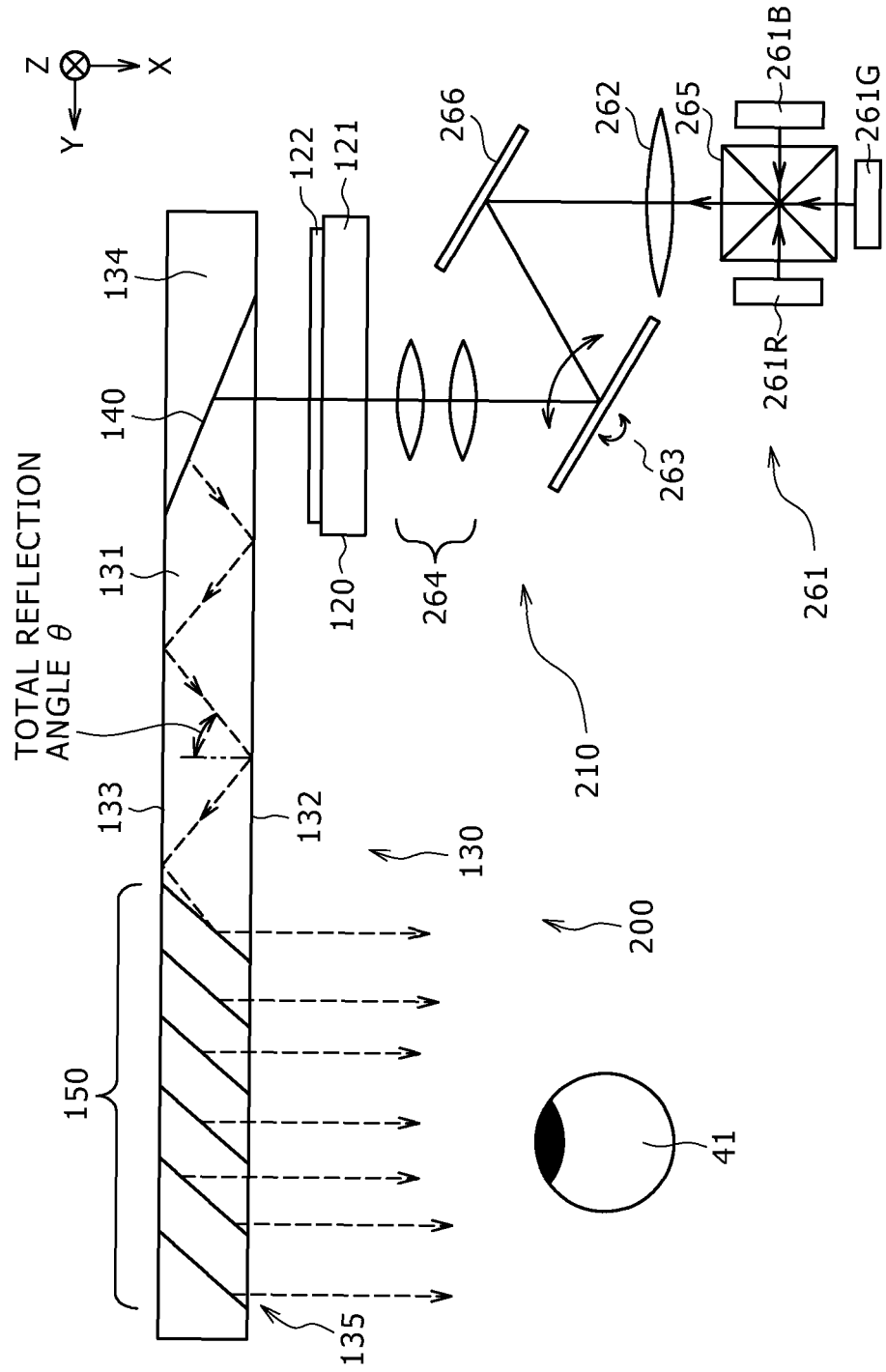
FIG. 2 is a similarly view but conceptually showing an image displaying apparatus of an embodiment 2.

The embodiment 2 is a modification to the embodiment 1 and relates to the image production apparatus 210 of the second mode. The image displaying apparatus 200 of the embodiment 2 or an image displaying apparatus 400 of the embodiment 4 hereinafter described includes, as shown in FIG. 2 or 4, (A-1) a light source 261;
(A-2) a collimate optical system 262 for converting light emitted from the light source 261 into parallel light;
(A-3) a scanning section 263 for scanning the parallel light emitted from the collimate optical system 262; and
(A-4) a relay optical system 264 for relaying the parallel light scanned by the scanning section 263; and
a light flux of the parallel light obtained by the conversion by the relay optical system 264 is introduced to the first light conduction section 120.

The first light conduction section 120 and the second light conduction section 130 have a configuration and a structure similar to those of the first light conduction section 120 and the second light conduction section 130 described hereinabove in connection with the embodiment 1, respectively, and therefore, overlapping description of them is omitted herein to avoid redundancy.

A light source 261 includes a red light emitting element 261R for emitting red light, a green light emitting element 261G for emitting green light and a blue light emitting element 261B for emitting blue light, each formed from a semiconductor laser element. Light of the three primary colors emitted from the light source 261 passes through a cross prism 265, whereupon color synthesis is carried out to form a single light flux. The resulting light enters a collimate optical system 262 which generally has a positive optical power and emerges as parallel light from the collimate optical system 262. The parallel light is reflected by a total reflection mirror 266 and then subjected to horizontal scanning and vertical scanning by a scanning section 263 formed from an MEMS which includes micromirrors disposed for rotation in two-dimensional directions and can scan the incoming parallel light two-dimensionally so that the parallel light is converted into a kind of a two-dimensional image and virtual pixels are produced. Then, light from the virtual pixels passes through a relay optical system 264 formed from a well-known relay optical system, and a light flux in the form of parallel light enters the first light conduction section 120 and the second light conduction section 130.

Embodiment 3

Figure 3:
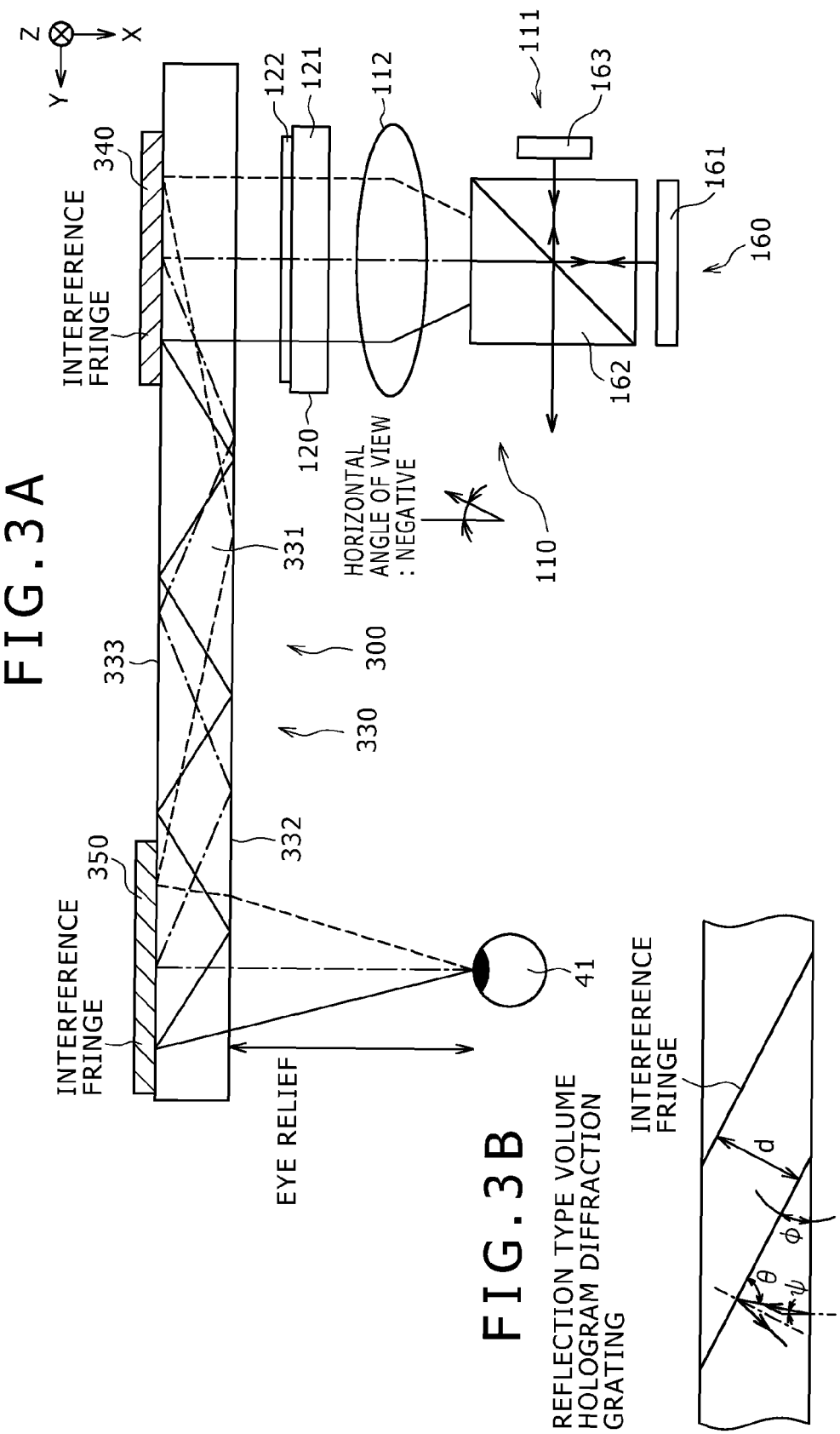
FIG. 3A is a view conceptually showing an image displaying apparatus of an embodiment 3.
FIG. 3B is an enlarged schematic sectional view showing part of a reflection type volume hologram diffraction grating of the image displaying apparatus of FIG. 3A.

Also the embodiment 3 is a modification to the embodiment 1. Referring to FIG. 3A, the image formation apparatus 111 and collimate optical system 112 and the first light conduction section 120 in the image displaying apparatus 300 of the embodiment 3 have a configuration and a structure same as those of the image formation apparatus 111 and collimate optical system 112 and the first light conduction section 120 described hereinabove in connection with the embodiment 1, respectively. Although the second light conduction section 330 is different in the configuration and structure of the first and second deflection sections, also it has a basic configuration and structure similar to those of the second light conduction section 130 in the embodiment 1. In particular, the second light conduction section 330 includes (C-1) a second light conduction plate 331 adapted to propagate incoming light in the inside thereof by total reflection and then emit the light;
(C-2) a first deflection section 340 disposed on the second light conduction plate 331 and adapted to deflect light incident to the second light conduction plate 331 such that the light introduced to the second light conduction plate 331 is totally reflected in the inside of the second light conduction plate 331; and
(C-3) a second deflection section 350 disposed on the second light conduction plate 331 and adapted to deflect the light propagated in the inside of the second light conduction plate 331 by total reflection over a plural number of times in order to emit the light propagated in the inside of the second light conduction plate 331 by total reflection from the second light conduction plate 331.

In the embodiment 3, the first and second deflection sections are disposed on the surface of the second light conduction plate 331, particularly on the second face 333 of the second light conduction plate 331. The first deflection section diffracts light entering the second light conduction plate 331, and the second deflection section diffracts light, which has propagated in the inside of the second light conduction plate 331, by total reflection, over a plural number of times. Each of the first and second deflection sections is formed from a diffraction grating element, particularly a reflection type diffraction grating element, more particularly a reflection type volume hologram diffraction grating. In the following description, the first deflection section formed from a reflection type volume hologram diffraction grating is referred to as "first diffraction grating member 340" for the convenience of description, and the second deflection section formed from a reflection type volume hologram diffraction grating is referred to as "second diffraction grating member 350" for the convenience of description.

In the embodiment 3 or the embodiment 4 hereinafter described, in order to make the first diffraction grating member 340 and the second diffraction grating member 350 ready for diffraction reflection of P (here P=3 for red, green and blue) different kinds of light having P different wavelength bands or wavelengths, the first diffraction grating member 340 and the second diffraction grating member 350 are formed by laminating P diffraction grating layers each formed from a reflection type volume hologram diffraction grating. It is to be noted that, in each diffraction grating layer made of a photopolymer material, interference fringes corresponding to one frequency band or frequency are formed, and the diffraction grating layers are produced by a hitherto known method. More particularly, the first diffraction grating member 340 and the second diffraction grating member 350 have a structure wherein a diffraction grating layer for diffracting and reflecting red light, another diffraction grating layer for diffracting and reflecting green light and a further diffraction grating layer for diffracting and reflecting blue light are laminated. The pitch of the interference fringes formed on the diffraction grating layers or diffraction optical elements is fixed, and the interference fringes have a linear form and extend in parallel to the Z direction. It is to be noted that, in FIGS. 3A and 4, the first diffraction grating member 340 and the second diffraction grating member 350 are shown with a single layer. Adoption of such a configuration as just described can achieve increase of the diffraction efficiency, increase of the diffraction reception angle and optimization of the diffraction angle when light having the frequency bands or frequencies is diffracted and reflected by the first diffraction grating member 340 and the second diffraction grating member 350.

FIG. 3B shows an enlarged schematic partial section of a reflection type volume hologram diffraction grating. Referring to FIG. 3B, the reflection type volume hologram diffraction grating has interference fringes having an inclination angle $\phi$ formed therein. Here, the inclination angle $\phi$ is defined by the surface and the interference fringes of the reflection type volume hologram diffraction grating. The interference fringes are formed from the inside to the surface of the reflection type volume hologram diffraction grating. The interference fringes satisfy the Bragg condition. The Bragg condition is a condition which satisfies the following expression (A):

$$m \cdot \lambda = 2 \cdot d \cdot \sin(\theta) \quad (A)$$

where m is a positive integer, $\lambda$ a wavelength, d the pitch of the grating face, that is, the distance in a normal direction of a virtual plane including the interference fringes, and $\theta$ the complementary angle to the angle at which light enters the interference fringes. Meanwhile, the relationship between the inclination angle $\phi$ and the incidence angle $\psi$ where light enters the diffraction grating member at the incidence angle $\psi$ is given by the following expression (B):

$$\theta = 90° - (\phi + \psi) \quad (B)$$

The first diffraction grating member 340 is disposed on, that is, adhered to, the second face 333 of the second light conduction plate 331 as described hereinabove, and diffracts and reflects parallel light entering the second light conduction plate 331 from the first face 332 so as to be totally reflected in the inside of the second light conduction plate 331. Further, the second diffraction grating member 350 is disposed on or adhered to the second face 333 of the second light conduction plate 331 as described hereinabove, and diffracts and reflects the parallel light, which has propagated in the inside of the second light conduction plate 331 by total reflection, by a plural number of times such that the light is emitted from the first face 332 of the second light conduction plate 331 while it remains in the form of parallel light. However, the configuration of the incident and emergent faces is not limited to this, but the second light conduction plate incidence face may be formed from the second face 333 and the second light conduction plate emergence face may be formed from the first face 332.

Also the second light conduction plate 331 is configured such that parallel light of the three colors of red, green and blue propagates in the inside thereof by total reflection and then emerges therefrom. At this time, since the second light conduction plate 331 is thin and the light path of light advancing in the inside of the second light conduction plate 331 is long, the number of times of total reflection to the second diffraction grating member 350 differs depending upon the angle of view, that is, the horizontal angle of view. More particularly, the number of times of reflection of parallel light entering with an angle, that is, a horizontal angle of view, of a direction in which it approaches the second diffraction grating member 350 from within parallel light which enters the second light conduction plate 331 is smaller than the number of times of reflection of parallel light which enters the second light conduction plate 331 with a horizontal angle of view of a direction in which it is spaced away from the second diffraction grating member 350. This is because the angle which is defined by the parallel light diffracted and reflected by the first diffraction grating member 340 and entering the second light conduction plate 331 with a horizontal angle of view of a direction in which it approaches the second diffraction grating member 350 and a normal to the second light conduction plate 331 when light propagating in the inside of the second light conduction plate 331 collides with the inner face of the second light conduction plate 331 is smaller than the angle which is defined by the parallel light entering the second light conduction plate 331 with a horizontal angle of view of the opposite direction and the normal to the second light conduction plate 331. Further, the shape of the interference fringes formed in the inside of the second diffraction grating member 350 and the shape of the interference fringes formed in the inside of the first diffraction grating member 340 have a symmetrical relationship to each other with respect to the XZ plane of the second light conduction plate 331.

Also the second light conduction plate 331 in the embodiment 4 described subsequently has a configuration and a structure basically same as those of the second light conduction plate 331 described above.

In the embodiment 3, where the light propagation direction by internal total reflection in the second light conduction plate 331 is defined as Y direction and the thicknesswise direction of the second light conduction plate 331 is defined as X direction, the direction in which the interference fringes in the first diffraction grating member 340 and the second diffraction grating member 350 are juxtaposed, that is, the diffraction direction, is the Y direction. Further, the direction in which the interference fringes in the reflection type volume hologram diffraction grating 122 which forms the first light conduction section 120, that is, the diffraction grating of the reflection type volume hologram diffraction grating 122, is the Z direction.

In the embodiment 3, the distance between the centers of the first deflection section, that is, the first diffraction grating member 340, and the second defection section, that is, the second diffraction grating member 350, is 30 mm, and the wavelength of the incident light is 522 nm. Further, the diffraction angle of incident light entering at 0 degree into the second light conduction plate 331, that is, the total reflection angle in the second light conduction plate 331, is 59 degrees.

Further, the thickness of the second light conduction plate 331 is 1.5 mm and the refractive index is 1.52 while the eye relief is 15 mm. At this time, the distance from an incident point to the second light conduction plate 331 of light which collides with the center of the first diffraction grating member 340 (such incident point is hereinafter referred to as "light incident point") to the pupil of the observer is 40 mm in the air conversion length. Then, when the horizontal angle of view is in the negative, the distance from the light incident point to the pupil 41 of the observer is greatest. Here, if the horizontal angle of view is ±11 degrees and the vertical angle of view is ±8.3 degrees, then the air conversion length of the distance from the light incident point of a ray of light having a horizontal angle of view of −11 degrees to the pupil 41 of the observer is 47 mm. It is necessary to assure an aperture stop (clear aperture) of the vertical angle of view of ±8.3 degrees at the distance of 48 mm. Accordingly, the aperture of the projection optical system necessary in the vertical direction is, where the diameter of the pupil of the observer is 3 mm, 17 mm. This aperture corresponds to the length of the light emerging region of the first light conduction section 120 along the Z direction. Where the thickness of the first light conduction plate 121 is 3 mm, the refractive index is 1.52, the wavelength of incidence light is 522 nm and the diffraction angle of 0-degree incidence light, that is, the total reflection angle in the first light conduction plate 121, is 59 degrees, the diffractive angle corresponding to the angle of view of −8.3 degrees is 49.7 degrees, and the distance over which the light advances by one time of total reflection (refer to "L" in FIG. 5B) is 7.1 mm. Through such a procedure of calculation as described above, the aperture of the lens provided in the image formation apparatus which is necessary to introduce parallel light into the first light conduction section 120 is determined to be 10.5 mm.

As described above, in the embodiment 3, where the light propagation direction by internal total reflection in the second light conduction plate 331 is defined as Y direction and the thicknesswise direction of the second light conduction plate 331 is defined as X direction, the diffraction direction by the first diffraction grating member 340 and the second diffraction grating member 350 is the Y direction and the diffraction direction by the reflection type volume hologram diffraction grating 122 which forms the first light conduction section 120 is the Z direction. In this instance, a phase difference plate for varying the phase difference of a polarized light component emitted from the first light conduction plate 121 may be disposed between the first light conduction plate 121 and the second light conduction plate 331. It is to be noted that preferably the polarized light component emitted from the first light conduction plate 121 is made parallel to the Z direction. In other words, the phase difference plate may be disposed such that the polarized light component to enter the first diffraction grating member 340 may be parallel to the Z direction. Here, the phase difference plate may be a half-wave plate or two quarter-wave plates, and an S polarized light component should be introduced into the first diffraction grating member 340. Further, a second phase difference plate for varying the phase difference of a polarized light component emitted from the collimate optical system or the relay optical system may be disposed between the collimate optical system or the relay optical system and the first light conduction plate 121. In this instance, preferably the second phase plate is disposed such that the polarized light component to enter the first light conduction plate 121 becomes parallel to the Y direction. Here, the phase difference plate may be a half-wave plate or two quarter-wave plates, and an S polarized light component should be introduced into the reflection type volume hologram diffraction grating 122. This similarly applies also to the embodiment 4 described below, and a second phase difference plate may be disposed also in the embodiment 1 or the embodiment 2. Although preferably a polarized light component of light passing through the phase difference plate is parallel to the Z direction as described above, the reason is such as described below. In particular, an incident light ray is reflected and Bragg diffracted by the interference fringes, and the diffracted light emerges (refer to FIG. 3B which is an enlarged schematic partial sectional view of a reflection type volume hologram diffraction grating). Here, the "polarized light component which is parallel to the plane of the figure and perpendicular to the incident light" is considered to enter as "p polarized light" into the interference fringes. On the other hand, the "polarized light component perpendicular to the plane of the figure" is considered to enter as "s polarized light" to the interference fringes. The diffraction efficiency of the reflection type volume hologram diffraction grating has a polarization dependency, and the diffraction efficiency of "p polarized light" is lower than that of "s polarized light." Accordingly, from a point of view of raising the light utilization efficiency, preferably the polarized light to be introduced into the reflection type volume hologram diffraction grating is "s polarized light."

Embodiment 4

The embodiment 4 is a modification to the embodiment 3. The image displaying apparatus of the embodiment 4 is conceptually shown in FIG. 4. The light source 261, collimate optical system 262, scanning section 263, relay optical system 264 and so forth of the image displaying apparatus of the embodiment 4 have a configuration and a structure same as those of the embodiment 2. Further, the second light conduction section 330 in the embodiment 4 has a configuration and a structure same as those of the second light conduction section 330 in the embodiment 3.

Embodiment 5

Figure 6:
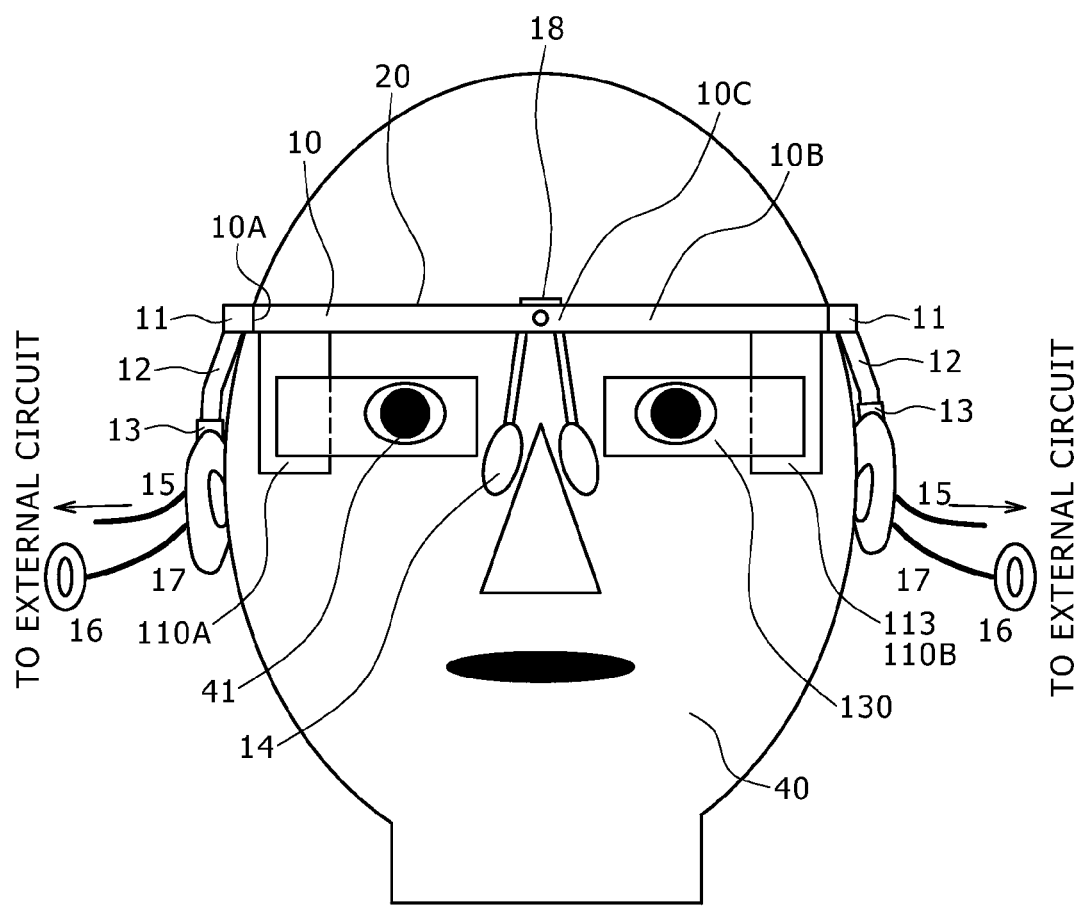
FIG. 6 is a schematic view of a head-mounted type display unit of an embodiment 5 as viewed from the front.
Figure 7:
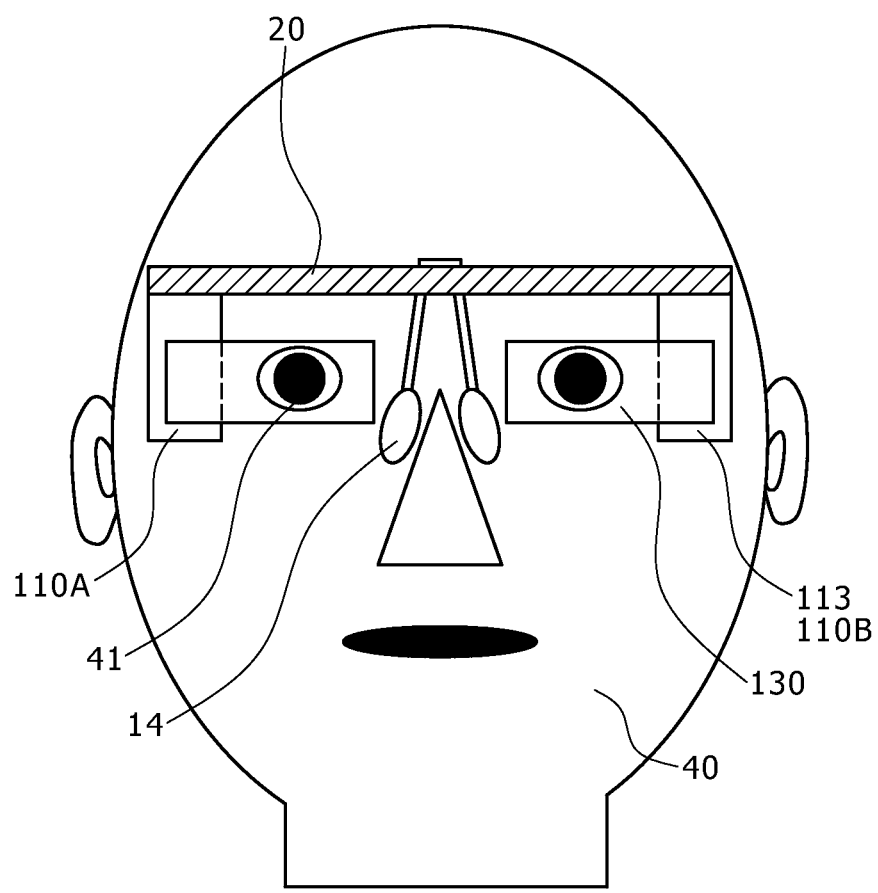
FIG. 7 is a schematic view of the head-mounted type display unit of FIG. 6 as viewed from the front with a frame removed.
Figure 8:
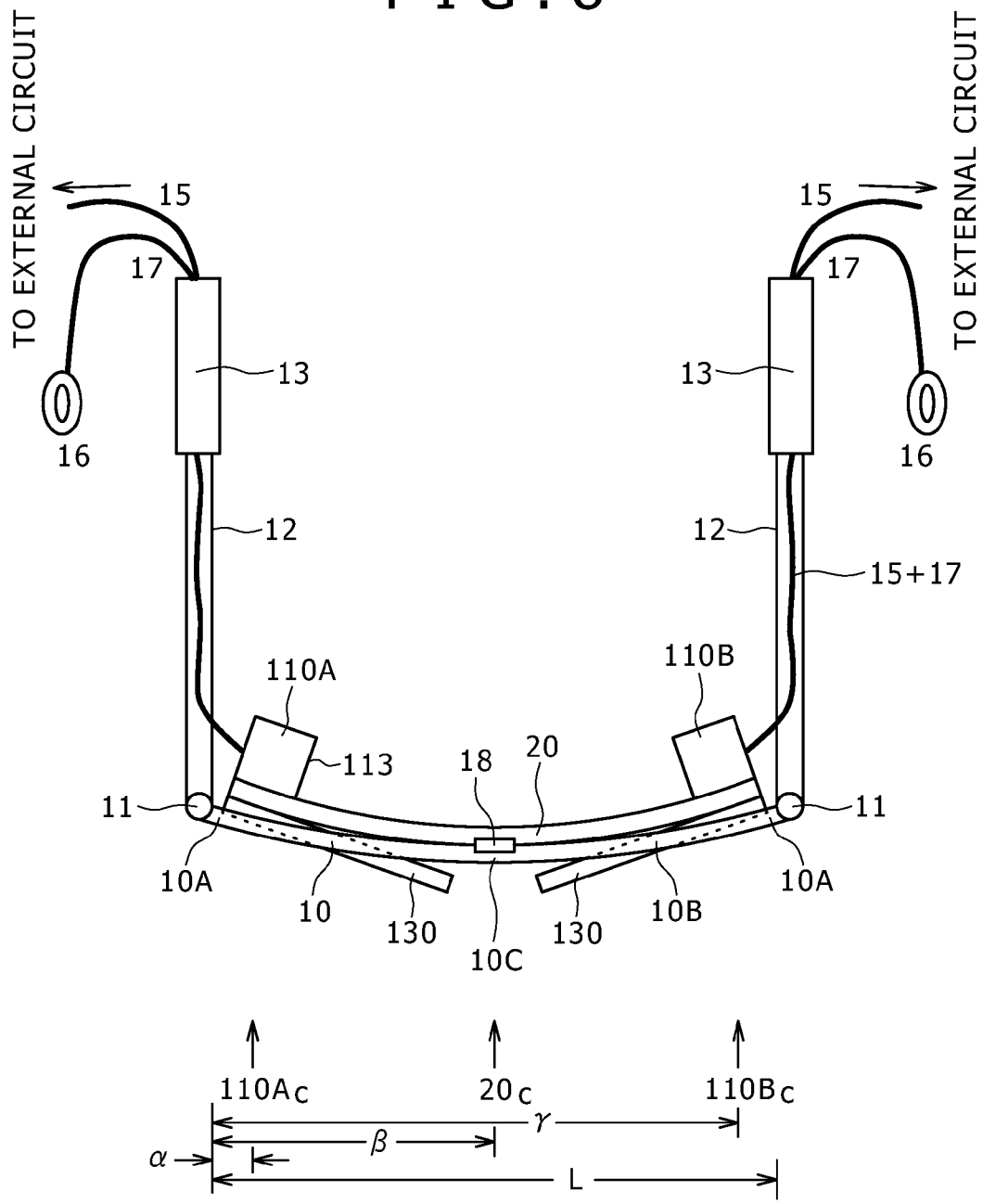
FIG. 8 is a schematic view of the head-mounted type display unit of FIG. 6 as viewed from above.
Figure 9:
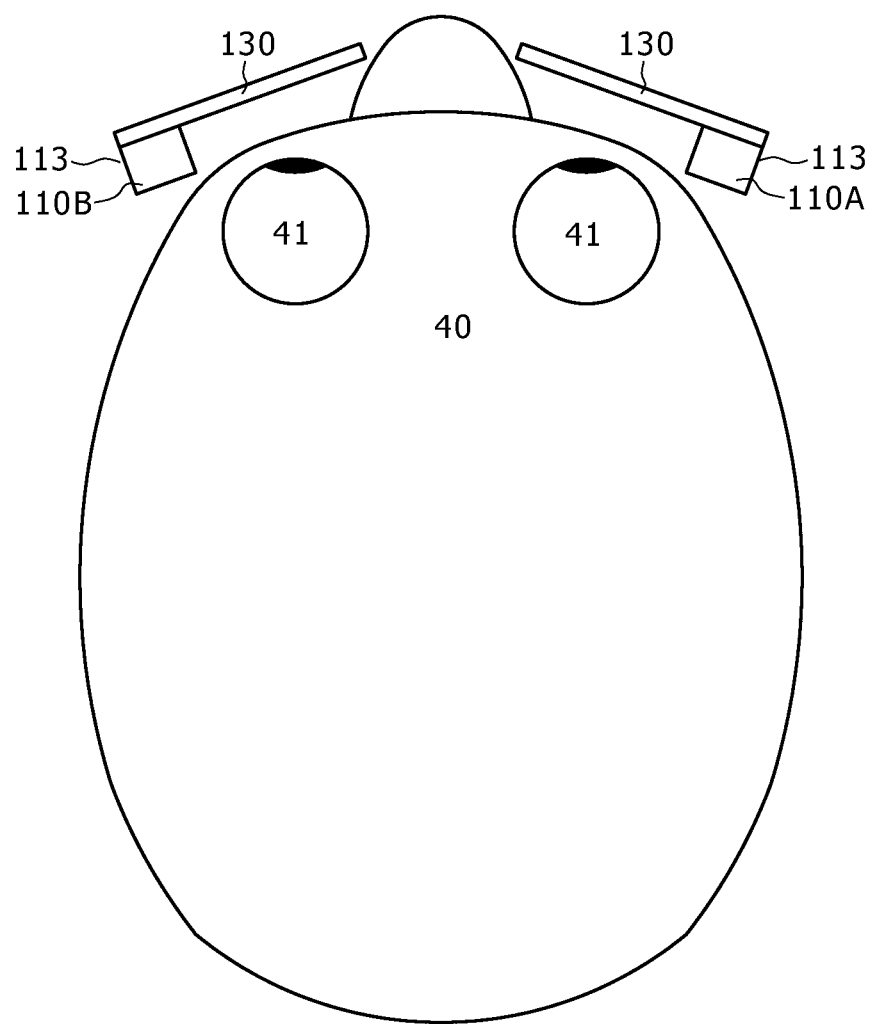
FIG. 9 is a schematic view, as viewed from above, of the head-mounted type display unit of FIG. 6 mounted on the head of an observer showing only the image displaying apparatus with the frame omitted.

The embodiment 5 relates to the image displaying apparatus according to the first mode of the present invention, and more particularly to a head-mounted type display unit in which any one of the image displaying apparatus 100, 200, 300 and 400 described hereinabove in connection with the embodiments 1 to 4, respectively. A schematic view of the head-mounted type display unit of the embodiment 5 as viewed from the front is shown in FIG. 6, and a schematic view of the head-mounted type display unit of the embodiment 5 as viewed from the front where a frame is removed is shown in FIG. 7. Further, a schematic view of the head-mounted type display unit of the embodiment as viewed from above is shown in FIG. 8, and a view of the head-mounted type display unit of the embodiment 5 in a state wherein it is mounted on the head of an observer 40 as viewed from above is shown in FIG. 9. It is to be noted that FIG. 9 only shows the image displaying apparatus for the convenience of description while the frame is omitted. Further, while, in the following description, the image display apparatus described is represented by the image displaying apparatus 100, it is a matter of course that it is possible to apply the image displaying apparatus 200, 300 and 400.

The head-mounted type display unit of the embodiment 5 includes:

(A) a frame 10 of the glasses type adapted to be mounted on the head of an observer 40; and (B) two image display apparatus 100.

It is to be noted that the head-mounted type display unit in the present embodiment 5 or the embodiment 6 hereinafter described is of the both-eye type including two image display apparatus 100.

The head-mounted type display unit of the embodiment 5 further includes a coupling member 20 for coupling the two image display apparatus 100. The coupling member 20 is attached to the side, which opposes to the observer, of a central portion 10C of a frame 10 positioned between the two pupils 41 of the observer 40, that is, to a location between the observer 40 and the frame 10, for example, using a screw not shown. Further, a projection image of the coupling member 20 is included in a projection image of the frame 10. In particular, when the head-mounted type display unit is viewed from the front of the observer 40, the coupling member 20 is hidden by the frame 10 and cannot be visually observed. Further, while the two image display apparatus 100 are connected to each other by the coupling member 20, particularly image reproduction apparatus 110A and 110B are attached to the opposite end portions of the coupling member 20 such that the attached state thereof can be adjusted. The image reproduction apparatus 110A and 110B are positioned on the outer side with respect to the pupils 41 of the observer 40. In particular, where the distance between the attached portion center $110A_c$ of the image production apparatus 110A and an end portion 10A of the frame 10 is represented by α, the distance from the center $20_c$ of the coupling member 20 to the end portion 10A of the frame 10 by β, the distance between the attached portion center $110B_c$ of the other image production apparatus 110B and the end portion 10A of the frame 10 by γ, and the length of the frame 10 b L, the following expressions are satisfied:

$$\alpha = 0.1 \times L$$

$$\beta = 0.5 \times L$$

$$\gamma = 0.9 \times L$$

Attachment of the image production apparatus, particularly the image reproduction apparatus 110A and 110B, to the opposite end portions of the coupling member 20 is carried out in the following manner. In particular, for example, through holes (not shown) are provided in three portions at each end of the coupling member, a tapped hole corresponding to a through-hole, that is, a threaded portion not shown, is provided in the image reproduction apparatus 110A and 110B, and a screw not shown is inserted into each of the through-holes and screwed into the tapped hole provided in each of the image reproduction apparatus 110A and 110B. A spring is inserted between the screw and the tapped hole in advance. Thus, the attachment state of each image production apparatus, that is, the inclination of each image production apparatus with respect to the coupling member, can be adjusted by the tightened state of the screw. After the attachment, the screws are hidden by lids not shown. It is to be noted that, in FIGS. 7 and 11, slanting lines are applied to the coupling members 20 and 30 in order to clearly indicate the coupling members 20 and 30, respectively.

The frame 10 includes a front portion 10B disposed in front of the observer 40, two temple portions 12 pivotally attached to the opposite ends of the front portion 10B through hinges 11, and two modern portions (also called end cells or ear pads) attached to end portions of the temple portions 12. The coupling member 20 is attached to the central portion 10C of the front portion 10B positioned between the two pupils 41 of the observer 40. The central portion 10C corresponds to a bridge in ordinary glasses. Nose pads 14 are attached to the side of the coupling member 20 opposing to the observer 40. It is to be noted that, in FIGS. 8 and 12, the nose pads 14 are omitted. The frame 10 and the coupling member 20 are made of a metal or plastic material, and the coupling member 20 has shape of a curved bar.

Further, a wiring line 15 including a signal line and a power supply line and extending from the image production apparatus 110A extends from an end portion of the corresponding modern section 13 to the outside through the inside of the corresponding temple section 12 and the modern section 13. Further, the image reproduction apparatus 110A and 110B have a headphone section 16, and a headphone section wiring line 17 extending from each of the image reproduction apparatus 110A and 110B extends from an end portion of the corresponding modern section 13 to the corresponding headphone section 16 through the inside temple section 12 and the inside of the modern section 13. More particularly, the headphone section wiring line 17 extends from an end portion of the modern section 13 to the headphone section 16 such that it goes round the rear side of the auricle. By such a configuration as just described, the head-mounted type display unit does not give such an impression that the headphone sections 16 and the headphone section wiring lines 17 are disposed disorderly to the observer but gives a fine feeling.

To the central portion 10C of the front portion 10B, an image pickup apparatus 18 is attached which includes a solid-state image pickup element formed from CCD (Charge coupled device) or CMOS (Complementary metal oxide semiconductor) sensors and a lens all not shown. In particular, a through-hole is formed at the central portion 10C of the frame 10, and a recessed portion is provided at a portion of the coupling member 20 opposing to the through-hole provided at the central portion 10C. The image pickup apparatus 18 is disposed in the recessed portion. Light entering through the through-hole provided in the central portion 10C is focused on the solid-state image pickup element by the lens. A signal from the solid-state image pickup element is sent to the image production apparatus 110A through a wiring line not shown extending from the image pickup apparatus 18 and further to an external circuit. It is to be noted that the wiring line passes between the coupling member 20 and the front portion 10B and is connected to the image production apparatus 110A. By the configuration described, the user is less likely to visually confirm that the image pickup apparatus 18 is incorporated in the head-mounted type display unit.

In this manner, in the head-mounted type display unit (HMD) of the embodiment 5, the coupling member 20 couples the two image display apparatus 100 to each other, and this coupling member 20 is attached to the central portion 10C of the frame 10 positioned between the two pupils 41 of the observer 40. In particular, each of the image display apparatus 100 is not structured such that it is attached directly to the frame 10. Accordingly, when the observer 40 mounts the frame 10 on the head thereof, the temple portions 12 are placed into an outwardly expanded state, and as a result, even if the frame 10 is deformed, no displacement or positional variation of the image reproduction apparatus 110A and 110B occurs, and even if such displacement occurs, the amount thereof is very small. Therefore, the convergence angle of the left and right images can be prevented from varying with certainty. Besides, since there is no necessity to raise the rigidity of the front portion 10B of the frame 10, increase in weight of the frame 10, degradation in design property and increase in cost are not caused. Further, since the image displaying apparatus 100 is not attached directly to the frame 10 of the glasses type, it is possible to freely select the design, color and so forth of the frame 10 in accordance with the liking of the observer and the degree of freedom in design is high with the restriction to the design of the frame 10 reduced. In addition, when the head-mounted type display unit is viewed from the front of the observer, the coupling member 20 is hidden by the frame 10. This can provide a high design property to the head-mounted type display unit.

Embodiment 6

Figure 10:
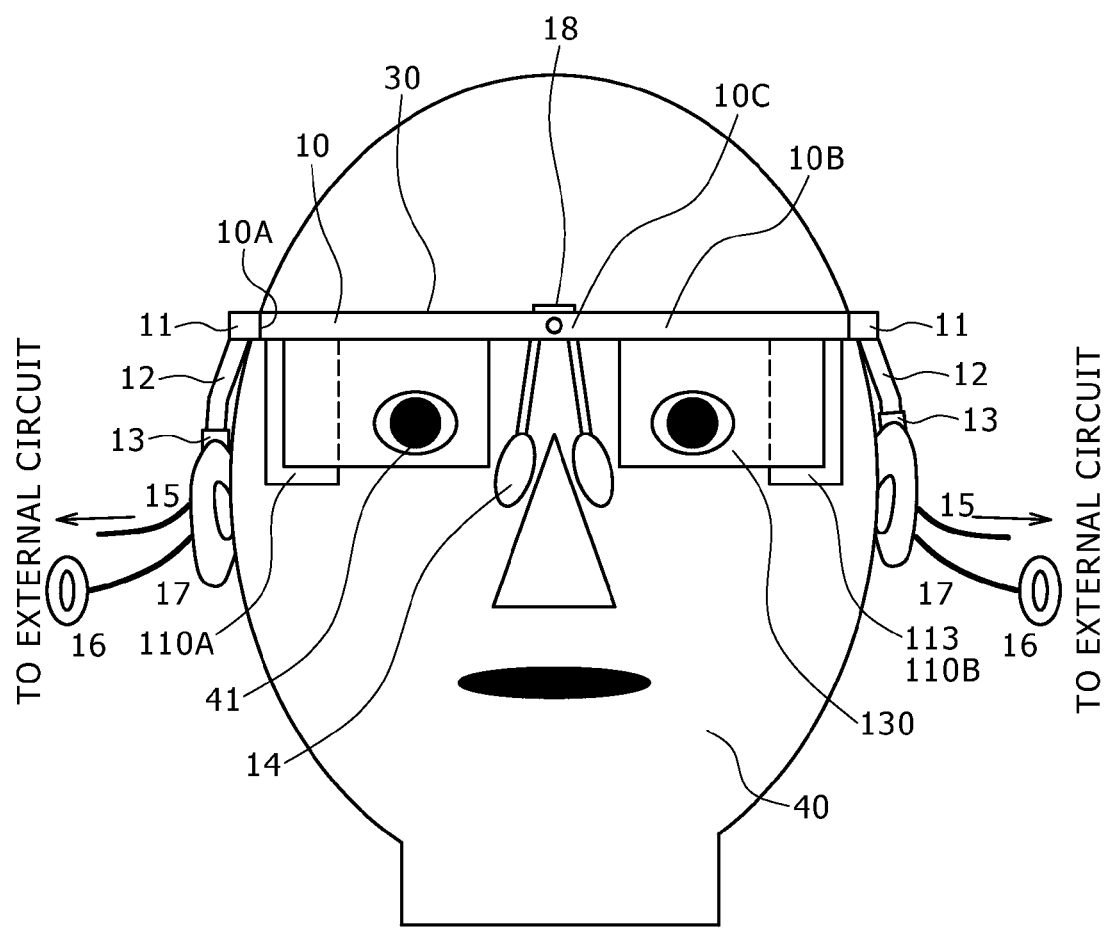
FIG. 10 is a schematic view of a head-mounted type display unit of an embodiment 6 as viewed from the front.
Figure 11:
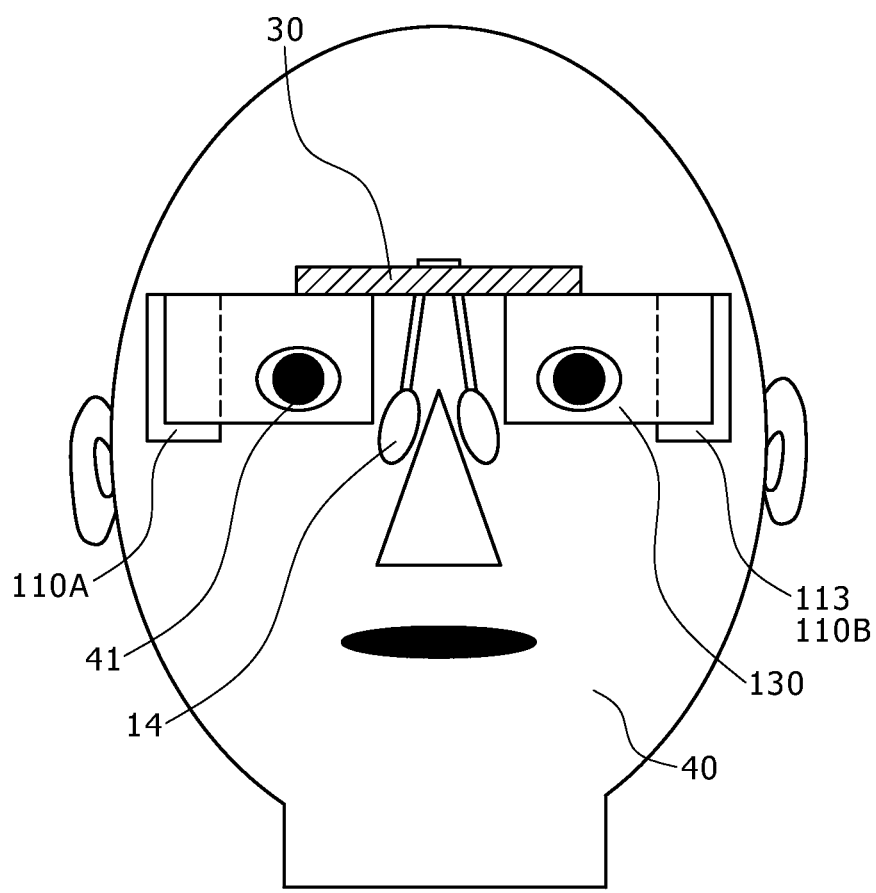
FIG. 11 is a schematic view of the head-mounted type display unit of FIG. 10 as viewed from the front with a frame removed.
Figure 12:
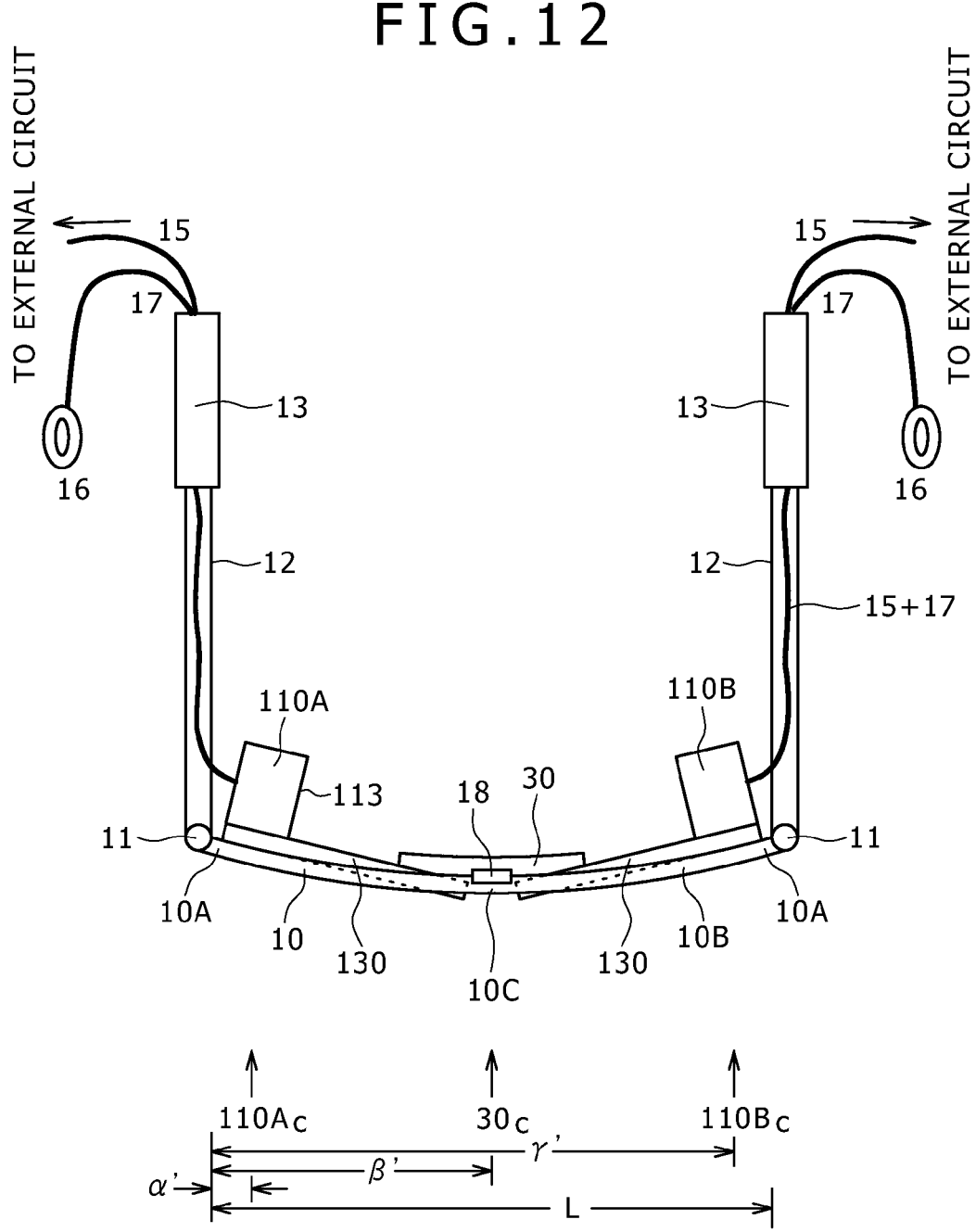
FIG. 12 is a schematic view of the head-mounted type display unit of FIG. 10 as viewed from above.

The embodiment 6 is a modification to the embodiment 5. A schematic view of the head-mounted type display unit of the embodiment 6 as viewed from the front is shown in FIG. 10, and another schematic view of the head-mounted type display unit of the embodiment as viewed from the front where a frame is removed is shown in FIG. 11. A further schematic view of the head-mounted type display unit of the embodiment 6 as viewed from above is shown in FIG. 12.

In the head-mounted type display unit of the embodiment 6, a coupling member 30 in the form of a bar is different from that in the embodiment 5 in that it couples two second light conduction sections 130 to each other in place of coupling the two image reproduction apparatus 110A and 110B to each other. It is to be noted that it is possible to produce the two second light conduction sections 130 integrally with each other and attach the coupling member 30 to the integrated second light conduction sections 130.

Also in the head-mounted type display unit of the embodiment 6, the coupling member 30 is attached to the central portion 10C of the frame 10 positioned between the two pupils 41 of the observer 40, for example, using a screw, and the image production apparatus 110 are positioned on the outer sides with respect to the pupils 41. It is to be noted that the image production apparatus 110 are attached to the opposite end portions of the second light conduction section 130. Where the distance from the center $30_C$ of the coupling member 30 to one end portion of the frame 10 is represented by β and the length of the frame 10 by L, β=0.5×L is satisfied. It is to be noted that, also in the embodiment 6, the value of α' and the value of γ' are equal to the values of α and γ in the embodiment 5, respectively.

In the embodiment 6, the frame 10 and the image displaying apparatus have a configuration and a structure same as those of the frame 10 and the image displaying apparatus described hereinabove in connection with the embodiment 5, respectively. Therefore, detailed description of them is omitted herein to avoid redundancy. Also the head-mounted type display unit of the embodiment 6 has a configuration and a structure substantially same as those of the head-mounted type display unit of the embodiment 5 except the differences described above, and therefore, overlapping description of the same is omitted hereinto avoid redundancy.

Embodiment 7

Figure 13A:
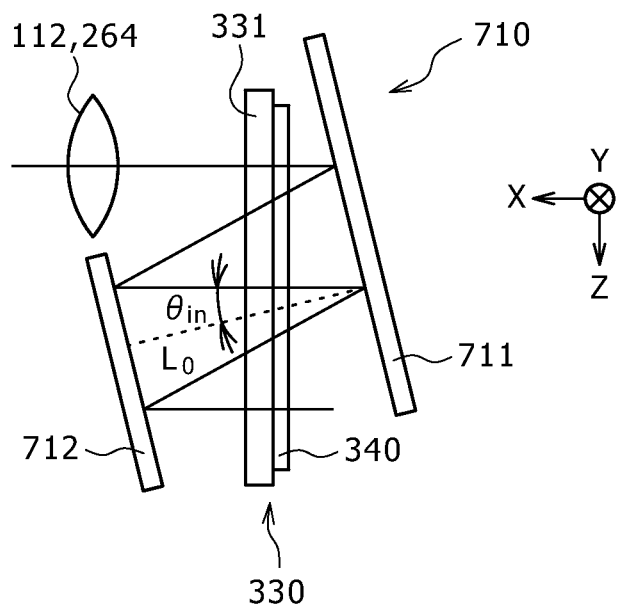
FIGS. 13A and 13B are views schematically showing arrangement states of an image production apparatus, a beam expansion section and a light conduction section in an embodiment 7 and an embodiment 8.
Figure 14:
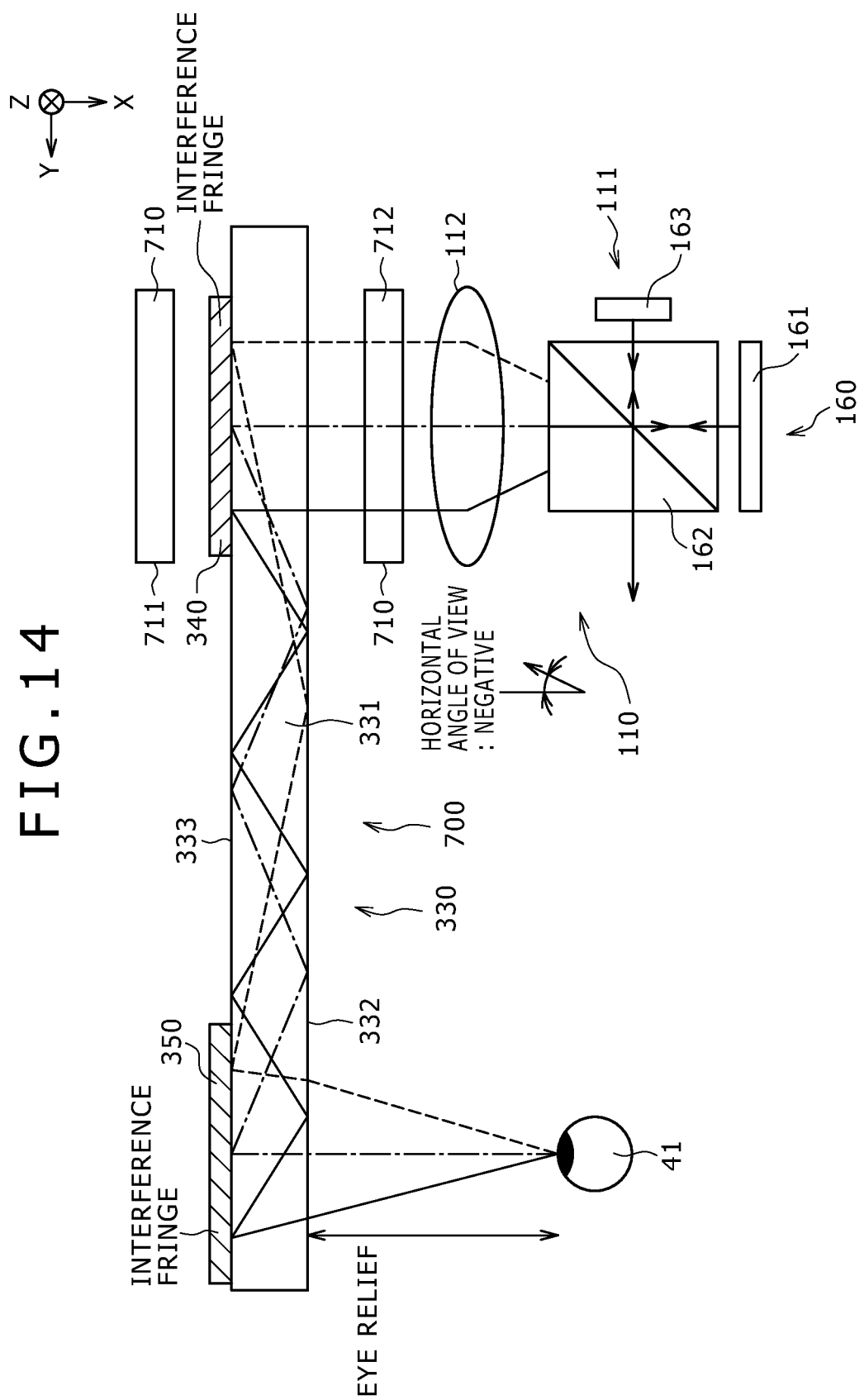
FIG. 14 is a schematic view conceptually showing an image displaying apparatus of the embodiment 7.
Figure 15:
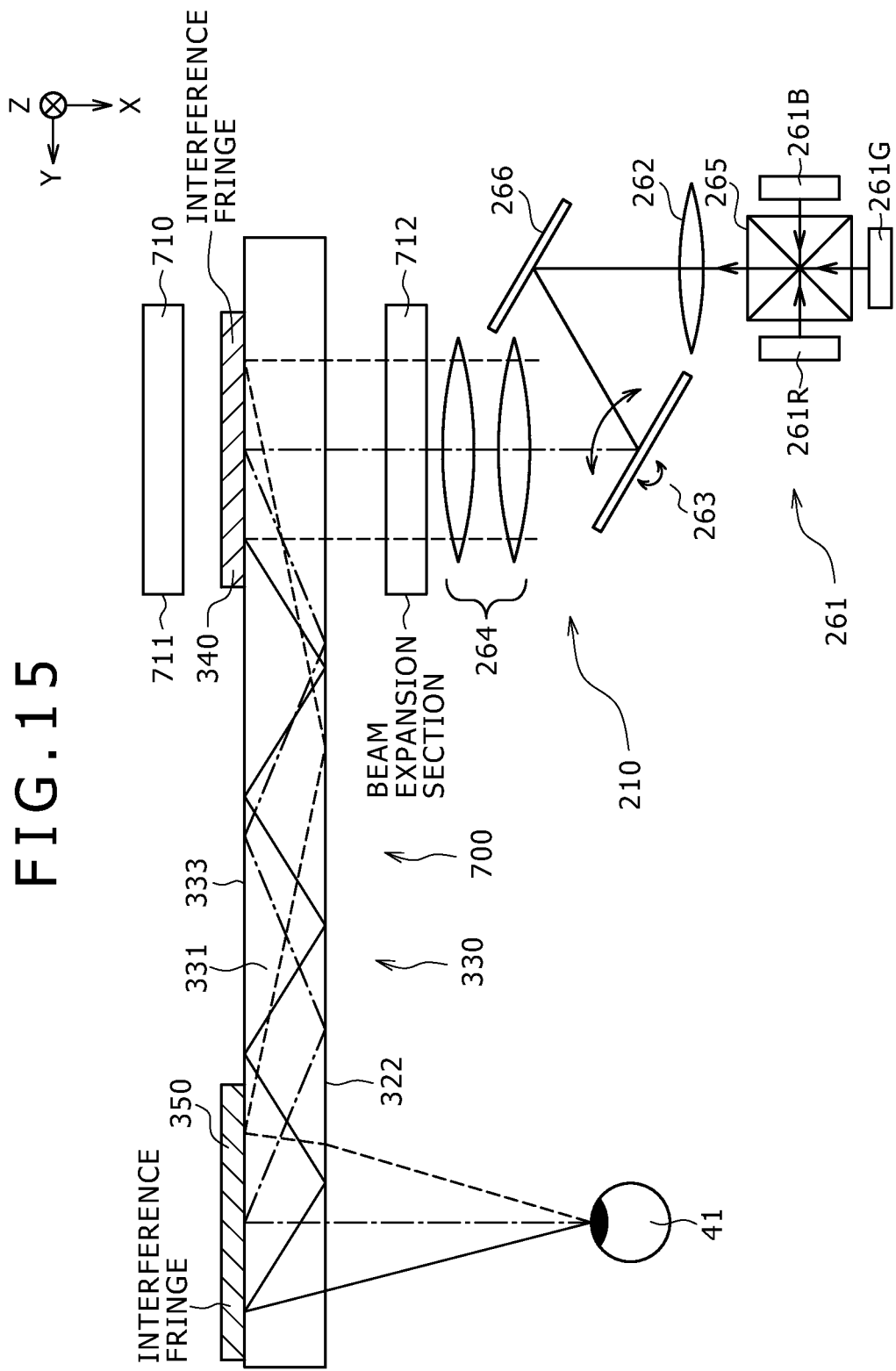
FIG. 15 is a schematic view conceptually showing a modification to the image displaying apparatus of FIG. 14.

The embodiment 7 relates to an image display apparatus according to the second mode of the present invention and an optical apparatus according to the second mode of the present invention and further to the image production apparatus according to the first or second form of the present invention. The image display apparatus in the embodiment 7 is conceptually shown in FIG. 14 or 15, and an arrangement state of the image production apparatus, beam expansion section and light conduction section (referred to as "second light conduction section" from a relationship to the other embodiments) is schematically illustrated in FIG. 13A. It is to be noted that the image displaying apparatus shown in FIG. 14 is configured such that the beam expansion section in the embodiment 7 is applied to the image displaying apparatus of the embodiment 3 shown in FIGS. 3A and 3B. Meanwhile, the image displaying apparatus shown in FIG. 15 is configured such that the beam expansion section in the embodiment 7 is applied to the image displaying apparatus of the embodiment 4 shown in FIG. 4.

The image displaying apparatus 700 or 800 according the embodiment 7 or an embodiment 8 hereinafter described includes:

(A) an image production apparatus 110 or 210; and (B) a light conduction section (second light conduction section 130 or 330) adapted to receive and conduct light outputted from the image production apparatus 110 or 210 and then emit the light toward the pupil 41 of an observer 40. The light conduction section (second light conduction section 130 or 330) includes:

(B-1) a light conduction plate (second light conduction plate 131 or 331) for propagating the incident light by total reflection in the inside thereof and emitting the propagated light therefrom;

(B-2) a first deflection section 140 or 340 disposed on the light conduction plate (second light conduction plate 131 or 331) and adapted to deflect the light incident to the light conduction plate (second light conduction plate 131 or 331) so that the light incident to the light conduction plate (second light conduction plate 131 or 331) is totally reflected in the inside of the light conduction plate (second light conduction plate 131 or 331); and (B-3) a second deflection section 150 or 350 disposed on the light conduction plate (second light conduction plate 131 or 331) and adapted to deflect the light propagated in the inside of the light conduction plate (second light conduction plate 131 or 331) by total reflection over a plural number of times in order to emit the light propagated in the inside of the light conduction plate (second light conduction plate 131 or 331) by total reflection from the light conduction plate (second light conduction plate 131 or 331). It is to be noted that the second light conduction section 130 or 330 is of the sea-through type or half-transmission type.

Meanwhile, the optical apparatus according to the embodiment 7 or the embodiment 8 hereinafter described includes a light conduction section (second light conduction section 130 or 330) adapted to receive, conduct and emit a light flux. The light conduction section (second light conduction section 130 or 330) includes:

a light conduction plate (second light conduction plate 131 or 331) for propagating the incident light by total reflection in the inside thereof and emitting the propagated light therefrom;

a first deflection section 140 or 340 disposed on the light conduction plate (second light conduction plate 131 or 331) and adapted to deflect the light incident to the light conduction plate (second light conduction plate 131 or 331) so that the light incident to the light conduction plate (second light conduction plate 131 or 331) is totally reflected in the inside of the light conduction plate (second light conduction plate 131 or 331); and a second deflection section 150 or 350 disposed on the light conduction plate (second light conduction plate 131 or 331) and adapted to deflect the light propagated in the inside of the light conduction plate (second light conduction plate 131 or 331) by total reflection over a plural number of times in order to emit the light propagated in the inside of the light conduction plate (second light conduction plate 131 or 331) by total reflection from the light conduction plate (second light conduction plate 131 or 331).

Further, in the embodiment 7 or the embodiment 8 hereinafter described, the image displaying apparatus or the optical apparatus further includes a beam expansion section 710 or 810 adapted to expand, where an entering direction of the light flux into the light conduction plate (second light conduction plate 131 or 331) and a propagation direction of the light in the light conduction plate (second light conduction plate 131 or 331) are defined as an X direction (in the drawings, indicated by a −X direction) and a Y direction, respectively, the light along a Z direction different from the X and Y directions and emit the expanded light to the light conduction section.

In the embodiment 7, as shown in FIG. 13A, the beam expansion section 710 includes a first reflecting mirror 711 and a second reflecting mirror 712. The first reflecting mirror 711 is positioned on the opposite side to the image production apparatus with respect to the light conduction section, that is, with respect to the second light conduction section 330, that is, positioned on the opposite side to the light entering side of the light conduction section, while the second reflecting mirror 712 is positioned adjacent the image production apparatus with respect to the light conduction section, that is, positioned on the light entering side of the light conduction section. Then, part of the light emitted from the image production apparatus passes through the light conduction plate and first deflection section, that is, the second light conduction section 330. Thereafter, a series of operations that the light passing through the second light conduction section 330 is reflected by the first reflecting mirror 711 and passes through the light conduction plate and the first deflection section, that is, the second light conduction section 330, and then is reflected by the second reflecting mirror 712, whereafter part of the reflected light passes through the light conduction plate and the first deflection section, that is, the second light conduction section 330, is repeated by a predetermined number of times. In the example illustrated in FIG. 13A, the light is reflected twice by the second reflecting mirror 712. Where the first reflecting mirror 711 and the second reflecting mirror 712 extend in parallel to each other and light is reflected twice by the second reflecting mirror 712, the light which begins to propagate in the inside of the light conductor plate, that is, the second light conduction plate 331, is finally elongated by approximate three times in the Z direction of the light which first enters the light conduction plate, that is, the second light conduction plate 331.

Here, the first reflecting mirror 711 and the second reflecting mirror 712 preferably extend in parallel to each other. Further, the light entering the light conduction plate, that is, the second light conduction plate 331, may first be incident perpendicularly to the light conduction plate, that is, to the second light conduction plate 331, or may enter at a certain incident angle other than 0 degrees.

Meanwhile, where the first diffraction grating member 340 is formed from a reflection type volume hologram diffraction grating, the light transmission factor T of the reflection type volume hologram diffraction grating can be set, for example, to 0.1 to 0.9 by selection of the material to be used for the reflection type volume hologram diffraction grating, optimization of the thickness of the reflection type volume hologram diffraction grating and optimization of the refractive index modulation degree Δn of the reflection type volume hologram diffraction grating. The light transmission factor T may be determined, for example, by carrying out various tests. Or, the light transmission factor T may be varied along the Z direction. By the countermeasures, the difference in brightness in the Z direction of the light which propagates in the inside of the light conduction plate, that is, of the second light conduction plate 331, can be reduced.

Where light which first enters the light conduction plate, that is, the second light conduction plate 331, enters perpendicularly into the light conduction plate, that is, into the second light conduction plate 331, and the first reflecting mirror 711 and the second reflecting mirror 712 extend in parallel to each other and besides the distance between the first reflecting mirror 711 and the second reflecting mirror 712, that is, the length of a normal to the first reflecting mirror 711 when the normal crosses with the second reflecting mirror 712, is represented by $L_0$, the angle defined by the first reflecting mirror 711 and the conduction plate, that is, the second light conduction plate 331, is represented by $\theta_d$, the incidence angle when the light enters the first reflecting mirror 711 is represented by $\theta_{in}$ and besides the length in the Z direction of the light when the light first enters the first reflecting mirror 711 is represented by $Z_0$, $L_0$, $\theta_d$, $\theta_{in}$ and $Z_0$ may have a relationship given by the following expression:

$$Z_0 = 2 \times L_0 \times \tan(\theta_{in}) \times \cos(\theta_d)$$

By adopting such a configuration as described above, the beam diameter in the Z direction of light to emerge from the beam expansion section 710 can be made greater than the beam diameter along the Z direction of the light incident to the beam expansion section 710. Accordingly, the shape of the light flux emitted from the image production apparatus to enter the beam expansion section 710 is deformed appropriately by the beam expansion section 710 and then introduced into the second light conduction section 330. Therefore, there is no necessity to set a great diameter of the aperture stop in the Z direction in the image formation apparatus. In other words, there is no necessity to increase the diameter of the lens provided in the collimate optical system or the like provided in the image formation apparatus, and reduction in size and weight of the image displaying apparatus can be anticipated. Further, such a problem that the display contrast drops and the picture quality deteriorates does not occur. This similarly applies also to the embodiment 8 hereinafter described.

In the image displaying apparatus 700 of the embodiment 7, the image production apparatus 110 includes, similarly as in the embodiment 1:

(A-1) an image formation apparatus 111 having a plurality of pixels arrayed in a two-dimensional matrix; and
(A-2) a collimate optical system 112 for converting light emitted from the pixels of the image formation apparatus 111 into parallel light; and
a light flux of the parallel light obtained by the conversion by the collimate optical system 112 is introduced to the beam expansion section 710.

Or, in the image displaying apparatus 700 of the embodiment 7, the image production apparatus 210 includes, similarly as in the embodiment 2:

(A-1) a light source 261;
(A-2) a collimate optical system 262 for converting light emitted from the light source 261 into parallel light;
(A-3) a scanning section 263 for scanning the parallel light emitted from the collimate optical system 262; and
(A-4) a relay optical system 264 for relaying the parallel light scanned by the scanning section 263; and
a light flux of the parallel light obtained by the conversion by the relay optical system 264 is introduced to the beam expansion section 710.

It is to be noted that the light conduction section, that is, the second light conduction section 330, may be configured similarly to the second light conduction section 330 described hereinabove in connection with the embodiment 3, and therefore, overlapping description the same is omitted hereinto avoid redundancy. Further, the image displaying apparatus of the embodiment 7 described hereinabove and the image displaying apparatus of the embodiment 8 which is hereinafter described can naturally be applied to the head-mounted type display units described hereinabove in connection with the embodiments 5 and 6.

Embodiment 8

Figure 13B:
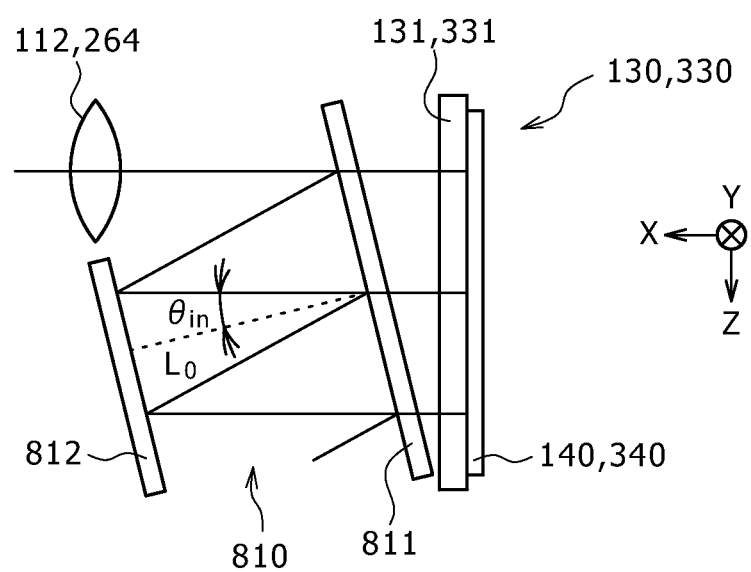
Figure 16:
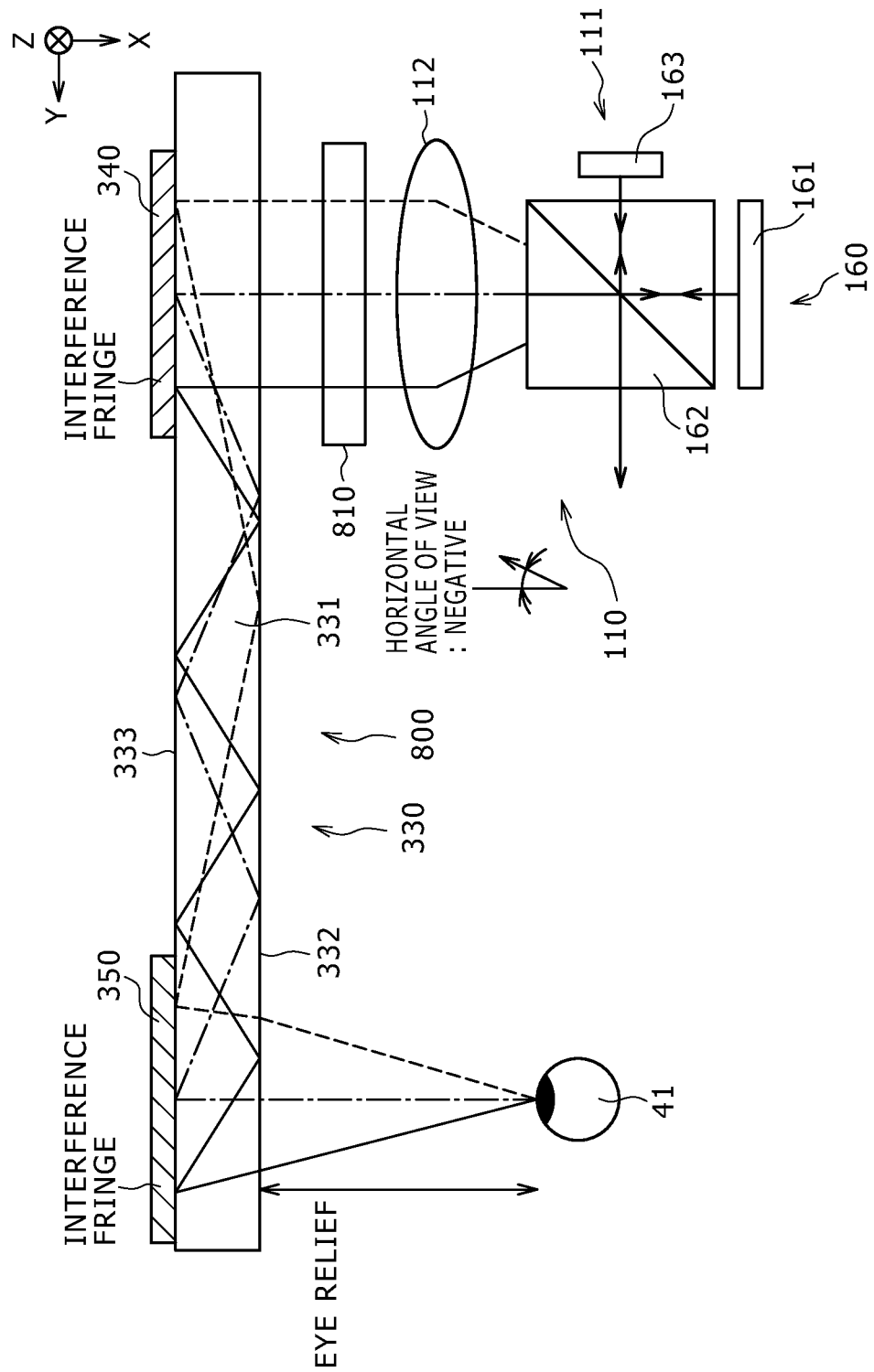
FIG. 16 is a schematic view conceptually showing an image displaying apparatus of the embodiment 8.
Figure 17:
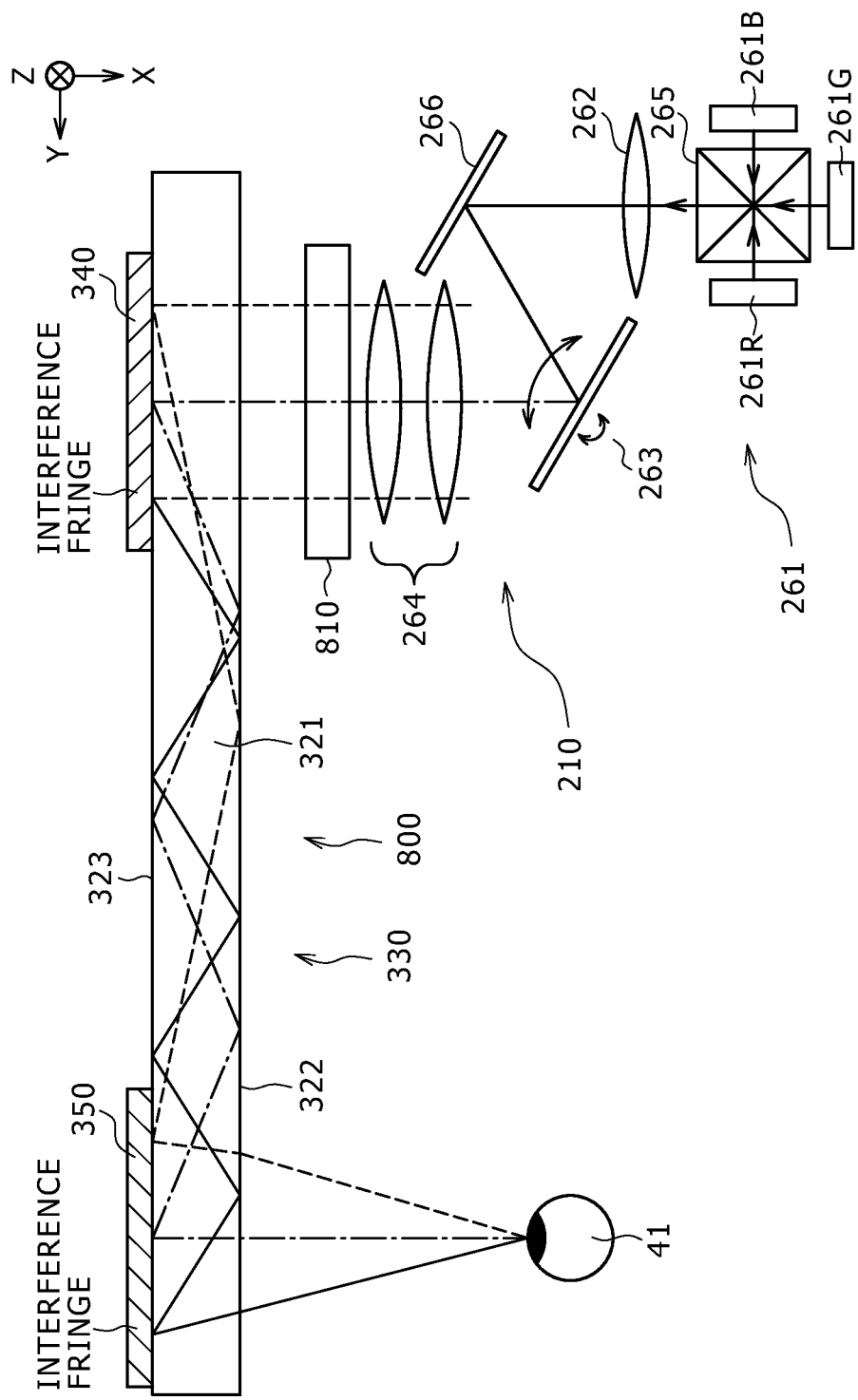
FIGS. 17, 18 and 19 are similar views but showing different modifications to the image displaying apparatus of FIG. 16.
Figure 18:
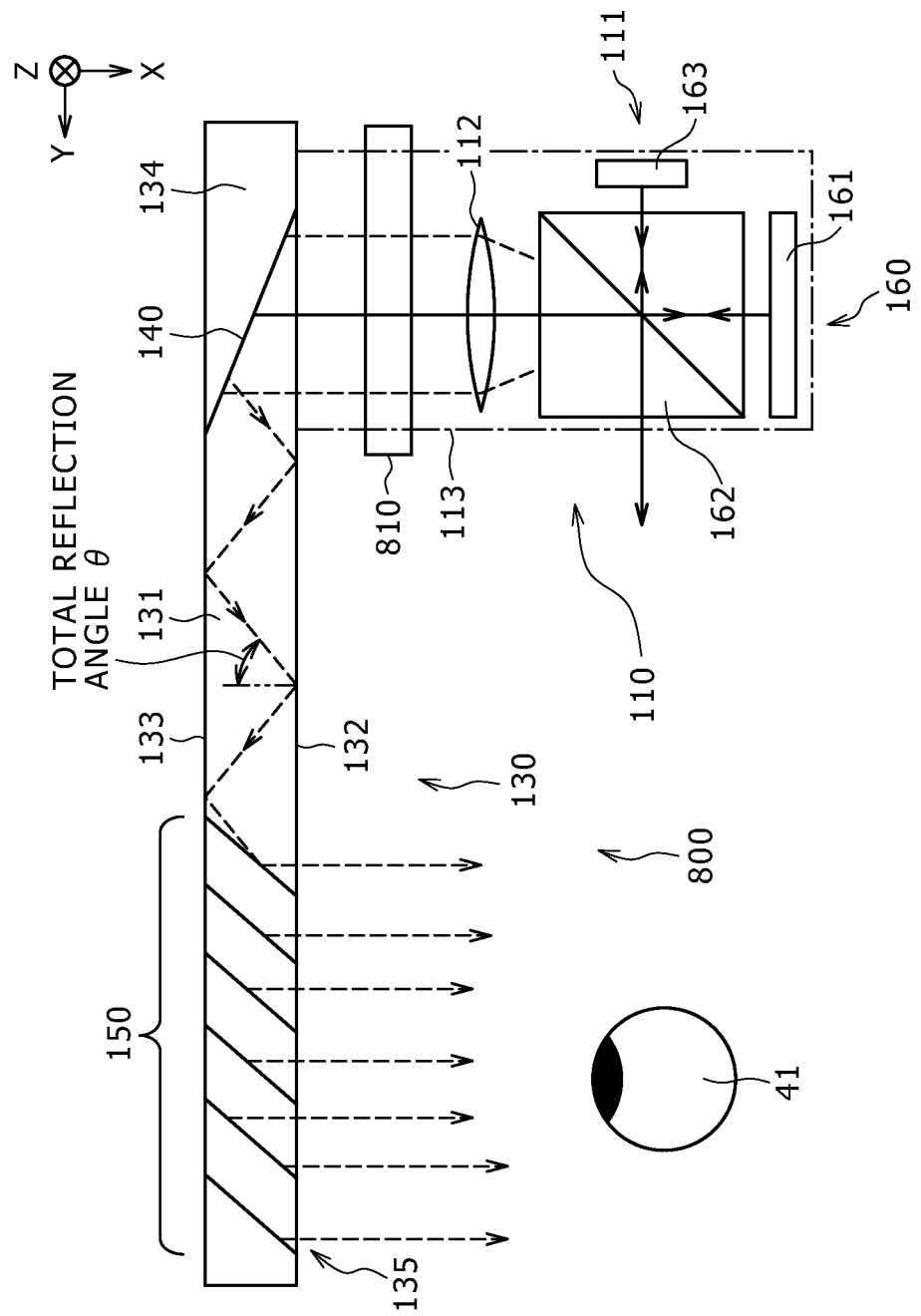
Figure 19:
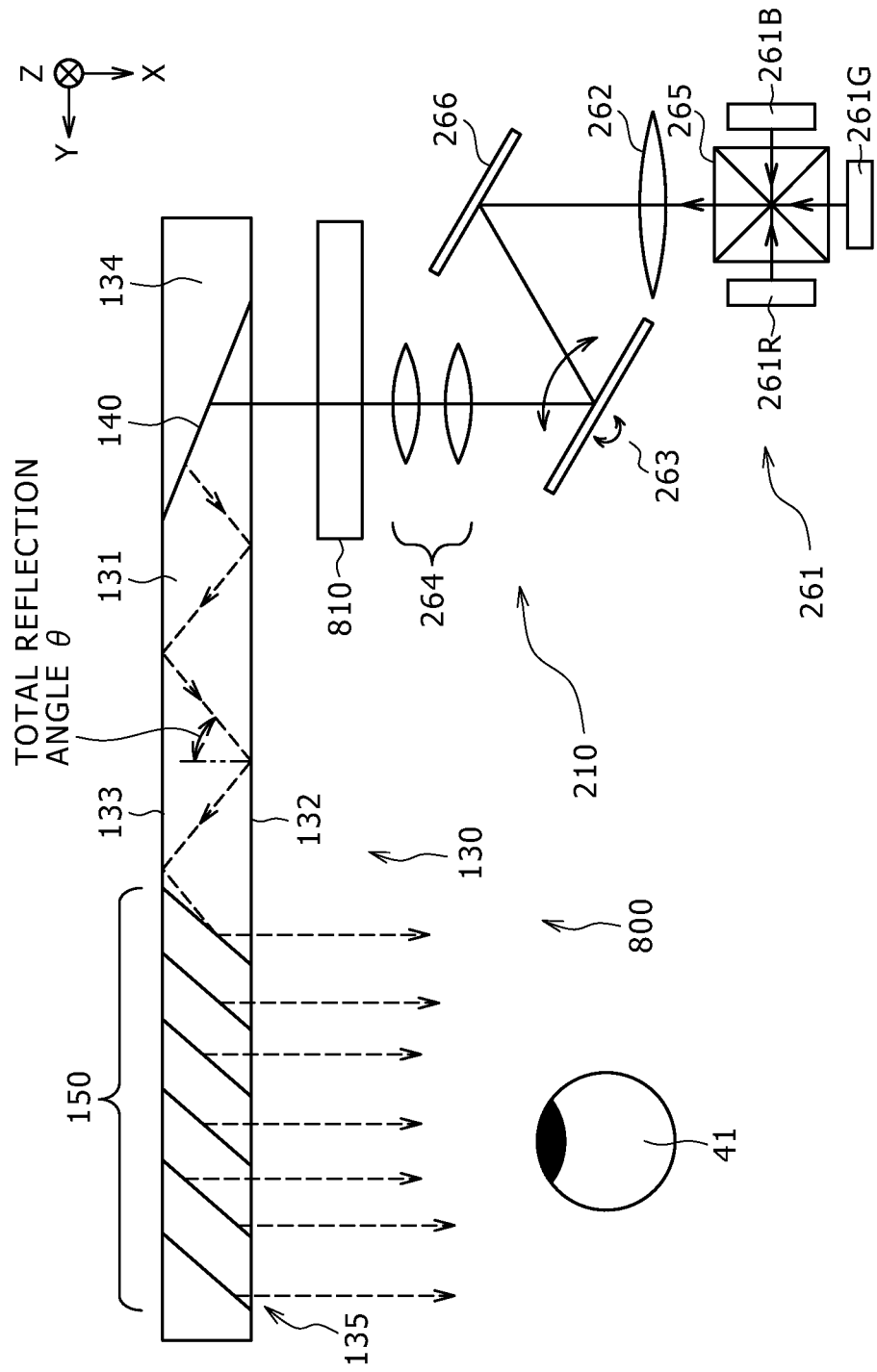

The embodiment 8 is a modification to the embodiment 7. Image display apparatus according to the embodiment 8 are conceptually shown in FIGS. 16 to 19, and an arrangement state of the image production apparatus, beam expansion section and light conduction section (hereinafter referred to as "second conduction section" similarly as in the description of the embodiment 7) is schematically illustrated in FIG. 13B. It is to be noted that the image displaying apparatus shown in FIG. 16 is an application of the beam expansion section in the embodiment 8 to the image displaying apparatus of the embodiment 3 described hereinabove with reference to FIG. 3A. Meanwhile, the image displaying apparatus shown in FIG. 17 is an application of the beam expansion section in the embodiment 8 to the image displaying apparatus of the embodiment 4 described hereinabove with reference to FIG. 4. Further, the image displaying apparatus shown in FIG. 18 is an application of the beam expansion section in the embodiment 8 to the image displaying apparatus of the embodiment 1 described hereinabove with reference to FIG. 1. Furthermore, the image displaying apparatus shown in FIG. 19 is an application of the beam expansion section in the embodiment 8 to the image displaying apparatus of the embodiment 2 described hereinabove with reference to FIG. 2.

In the embodiment 8, the beam expansion section 810 includes a half-mirror 811 and a reflecting mirror 812 which are positioned adjacent the image production apparatus with reference to the light conduction section, that is, on the light incidence side of the light conduction section. Part of light emitted from the image production apparatus passes through the half-mirror 811 and enters the light conduction section, that is, the second light conduction section 130 or 330, while the remaining part of the light is reflected by the half-mirror 811 and enters the reflecting mirror 812. Then, a series of operations that part of the light reflected by the reflecting mirror 812 passes through the half-mirror 811 and enters the light conduction, that is, the second light conduction section 130 or 330 while the remaining part of the light is reflected by the half-mirror 811 and comes to the reflecting mirror 812 is repeated by a predetermined number of times. In the example shown in FIG. 13B, the light is reflected twice by the reflecting mirror 812. Where the half-mirror 811 and the reflecting mirror 812 extend in parallel to each other and light is reflected twice by the reflecting mirror 812, the light which begins to propagate in the inside of the light conduction plate, that is, of the second light conduction plate 131 or 331, is finally expanded by approximately three times in the Z direction of the light which first enters the light conduction plate, that is, the second light conduction plate 131 or 331.

Preferably the half-mirror 811 and the reflecting mirror 812 extend in parallel to each other. Further, the light which first enters the light conduction plate, that is, the second light conduction plate 131 or 331, may be incident perpendicularly to the light conduction plate, that is, to the second light conduction plate 131 or 331 or may be incident at a certain incidence angle other than 0 degrees.

Meanwhile, where the first diffraction section 340 is formed from a reflection type volume hologram diffraction grating, the light transmission factor T of the reflection type volume hologram diffraction grating can be set, for example, to 0.1 to 0.9 by selection of the material to be used for the reflection type volume hologram diffraction grating, optimization of the thickness of the reflection type volume hologram diffraction grating and optimization of the refractive index modulation degree Δn of the reflection type volume hologram diffraction grating. The light transmission factor T may be determined, for example, by carrying out various tests. Alternatively, the light transmission factor T of the half-mirror 811 may be varied along the Z direction. By the countermeasures, the difference in brightness in the Z direction of the light which propagates in the inside of the light conduction plate, that is, of the second light conduction plate 331, can be reduced.

Where light which first enters the light conduction plate, that is, the second light conduction plate 331, enters perpendicularly into the light conduction plate, that is, into the second light conduction plate 331, and the half-mirror 811 and the reflecting mirror 812 extend in parallel to each other and besides the distance between the half-mirror 811 and the reflecting mirror 812, that is, the length of a normal to the half-mirror 811 when the normal crosses with the reflecting mirror 812, is represented by $L_0$, the angle defined by the half-mirror 811 and the conduction plate, that is, the second light conduction plate 331, is represented by $\theta_d$, the incidence angle when the light enters the half-mirror 811 is represented by $\theta_{in}$ and besides the length in the Z direction of the light when the light first enters the half-mirror 811 is represented by $Z_0$, a relationship of $L_0$, $\theta_d$, $\theta_{in}$ and $Z_0$ may have given by the following expression:

$$Z_0 = 2 \times L_0 \times \tan(\theta_{in}) \times \cos(\theta_d)$$

It is to be noted that, in the image displaying apparatus 800 of the embodiment 8, the image production apparatus 110 may be configured similarly to that in the embodiment 1 and the image production apparatus 210 may be configured similarly to that in the embodiment 2. Further, the light conduction section, that is, the second light conduction section 130 or 330, may be configured similarly to the second light conduction section 130 described hereinabove in connection with the embodiment 1 or the second light conduction section 330 described hereinabove in connection with the embodiment 3. Therefore, detailed description of them is omitted herein to avoid redundancy.

Although the present invention has been described in detail with reference to preferred embodiments thereof, the present invention is not limited to the embodiments. The configuration and structure of the image display apparatus and the optical apparatus described in connection with the embodiments are merely illustrative and can be altered suitably. For example, a surface relief type hologram (refer to U.S. Patent No. 20040062505 A1) may be disposed on the second conductive plate. Further, in the second light conduction section in the embodiment 3 or 4, such a configuration that the first deflection section formed from a transmission type hologram is disposed on the first face 332 of the second light conduction plate 331 and a second deflection section formed from a reflection type hologram is disposed on the second face 333 may be adopted. In such a configuration as just described, light incident to the first deflection section is diffracted and propagates to the second deflection section satisfying the total reflection condition in the second conduction plate. Then, the light is diffracted and reflected by the second deflection section and emitted from the second light conduction plate. Further, in the second light conduction section in the embodiment 3 or 4, it is possible to form the diffraction grating element from a transmission type diffraction grating element or to form one of the first and second light deflection sections from a reflection type diffraction grating element and form the other one of the first and second light deflection sections from a transmission type diffraction grating element. Or else, it is possible to form the diffraction grating element as a reflection type blazed diffraction grating element or a surface relief type hologram. While, in the modes, the head-mounted type display unit is formed as of the binocular type which includes two image display apparatus, it may otherwise be formed as of the monocular type which includes a single image display apparatus.

Figure 20:
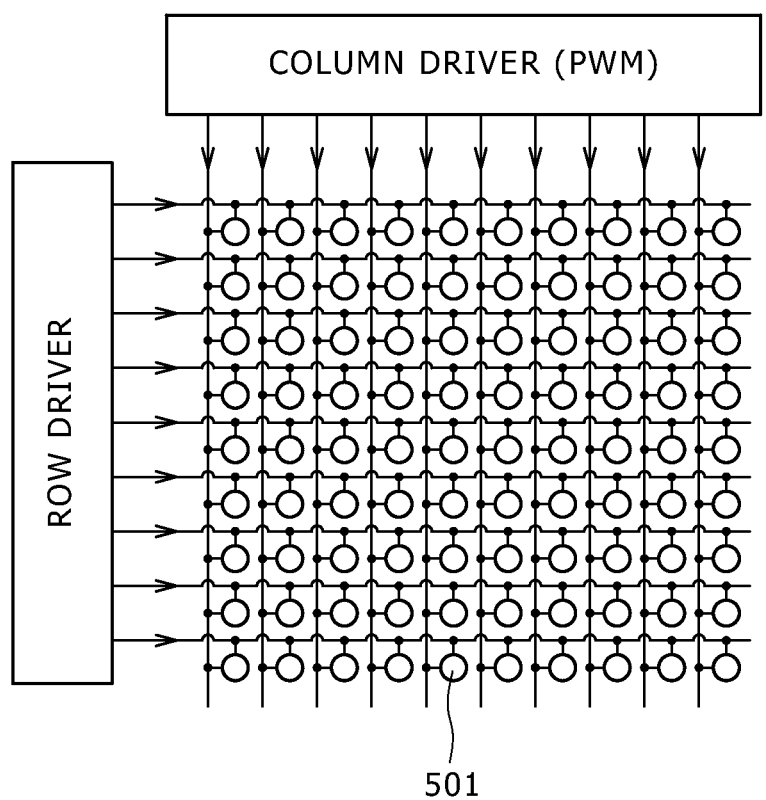
FIG. 20 is a view of a modification to an image formation apparatus suitable for use in image displaying apparatus of FIG. 1 or FIG. 3A.

As a modification to the image forming apparatus suitable for use with the embodiment 1, 3, 7 or 8, for example, such an image formation apparatus of the active matrix type as conceptually shown in FIG. 20 may be used. Referring to FIG. 20, the image formation apparatus includes a light emitting panel wherein a plurality of light emitting elements 501 each formed from a semiconductor light emitting element are arrayed in a two-dimensional matrix. The light emitting/no-light emitting state of each of the light emitting elements 501 is controlled so that the light emitting state of the light emitting element 501 is directly visually observed to display an image. Light emitted from the image formation apparatus enters the second light conduction plate 131 or 331 through the collimate optical system 112.

Figure 21:
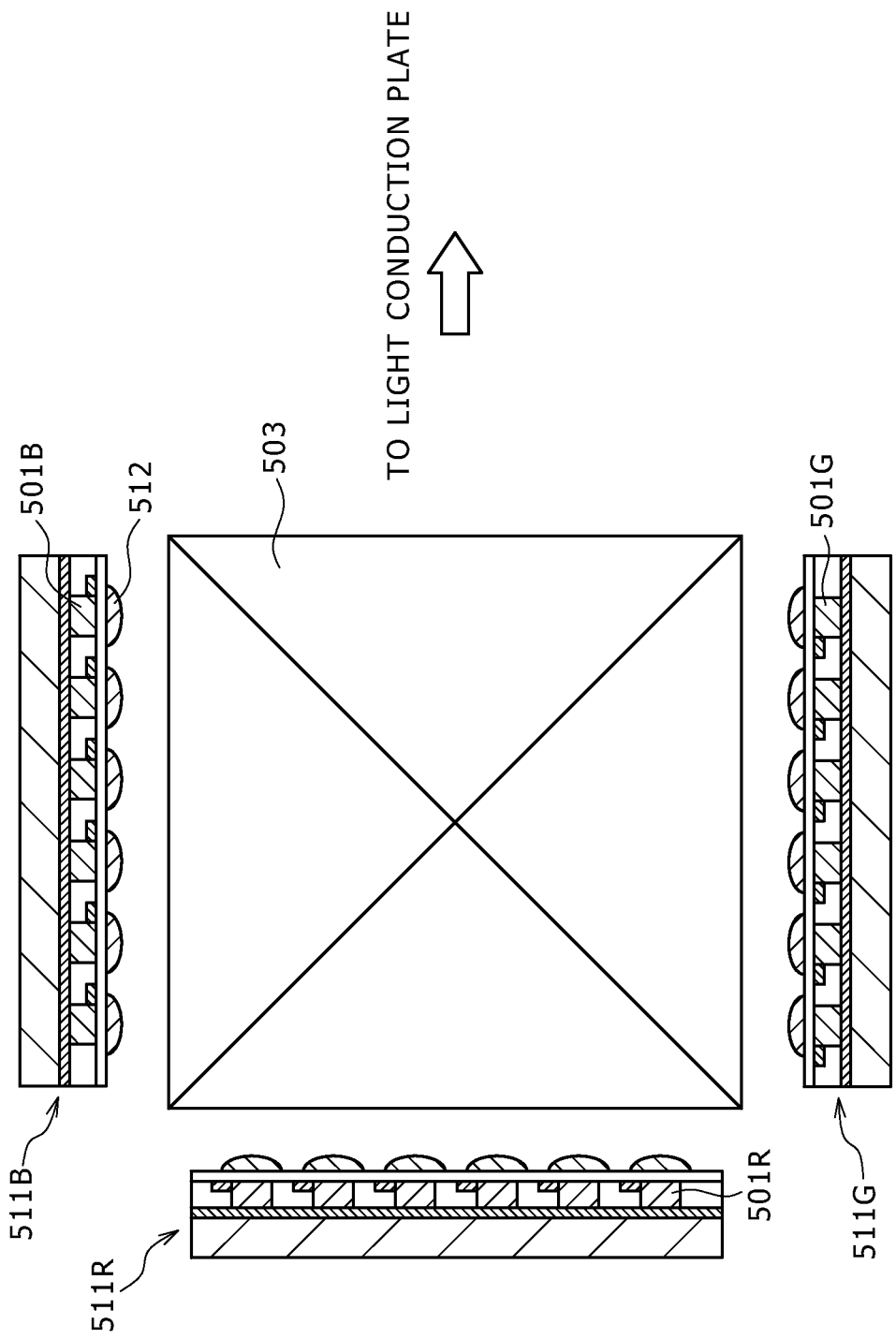
FIGS. 21, 22, 23 and 24 are similar views but showing several modifications to the image formation apparatus suitable of FIG. 20.

Alternatively, the image formation apparatus may be formed as an image formation apparatus for color display which includes, as conceptually shown in FIG. 21, (α) a red light emitting panel 511R wherein a plurality of red light emitting elements 501R for emitting red light are arrayed in a two-dimensional matrix;

(β) a green light emitting panel 511G wherein a plurality of green light emitting elements 501G for emitting green light are arrayed in a two-dimensional matrix;

(γ) a blue light emitting panel 511B wherein a plurality of blue light emitting elements 501B for emitting blue light are arrayed in a two-dimensional matrix; and (δ) a member such as, for example, a dichroic prism 503, for integrating the light emitted from the red light emitting panel 511R, green light emitting panel 511G and blue light emitting panel 511B into a single light flux, and the light emitting/no-light emitting state of the red light emitting elements 501R, green light emitting element 501G and blue light emitting elements 501B is individually controlled. Also the light emitted from this image formation apparatus is introduced to the second light conduction plate 131 or 331 through the collimate optical system 112. It is to be noted that reference numeral 512 denotes a microlens element for condensing the light emitted from the light emitting elements.

Figure 22:
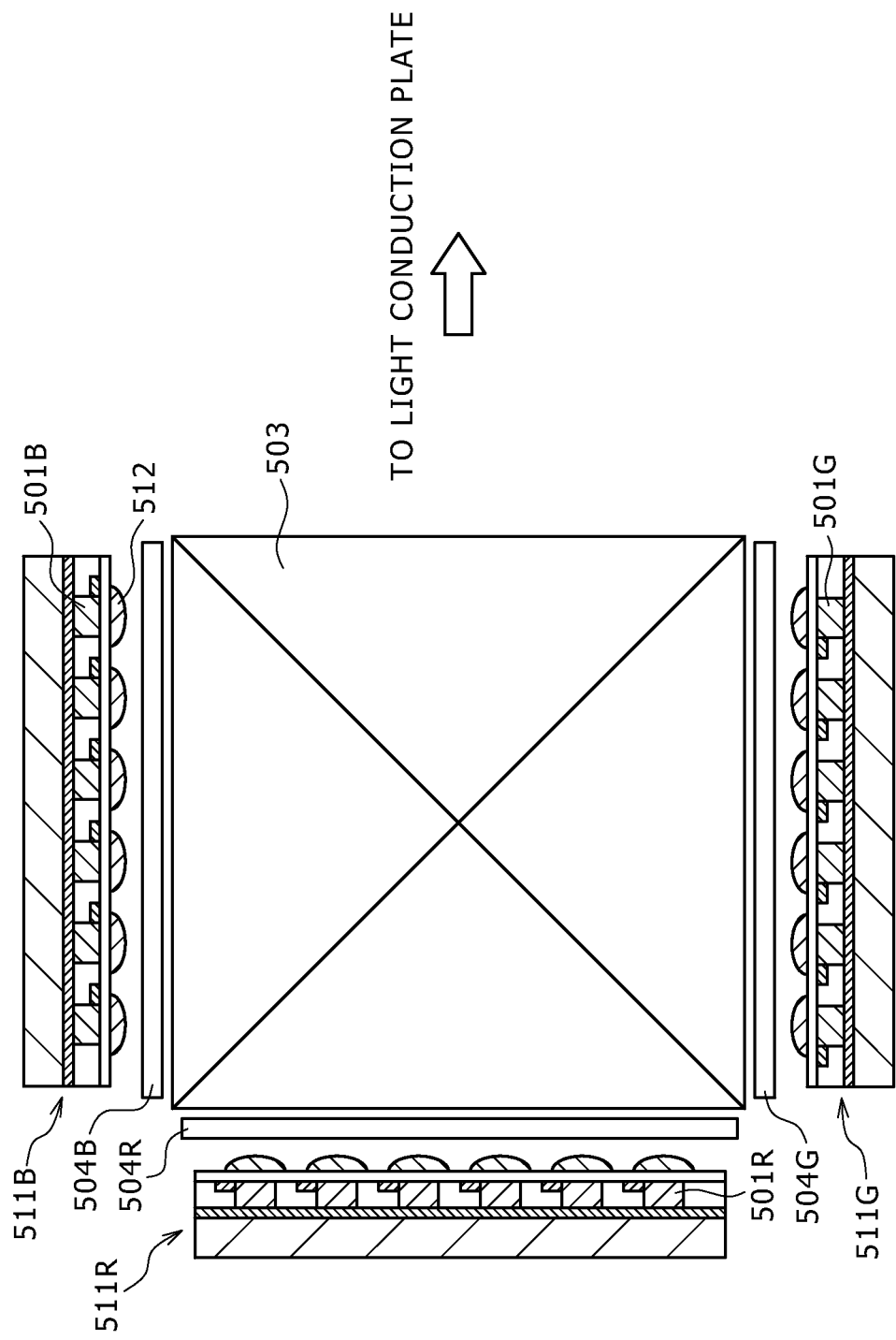

An image formation apparatus including light emitting panels 511R, 511G and 511B in which such light emitting elements 501R, 501G and 501B as described above are arrayed in a two-dimensional matrix, respectively, is conceptually shown in FIG. 22. Referring to FIG. 22, light emitted from the light emitting panels 511R, 511G and 511B is controlled to pass or not pass by light passage controlling apparatus 504R, 504G and 504B, respectively, and enters the dichroic prism 503 by which it is integrated into a single light flux. The light flux is introduced into the second light conduction plate 131 or 331 through the collimate optical system 112.

Figure 23:
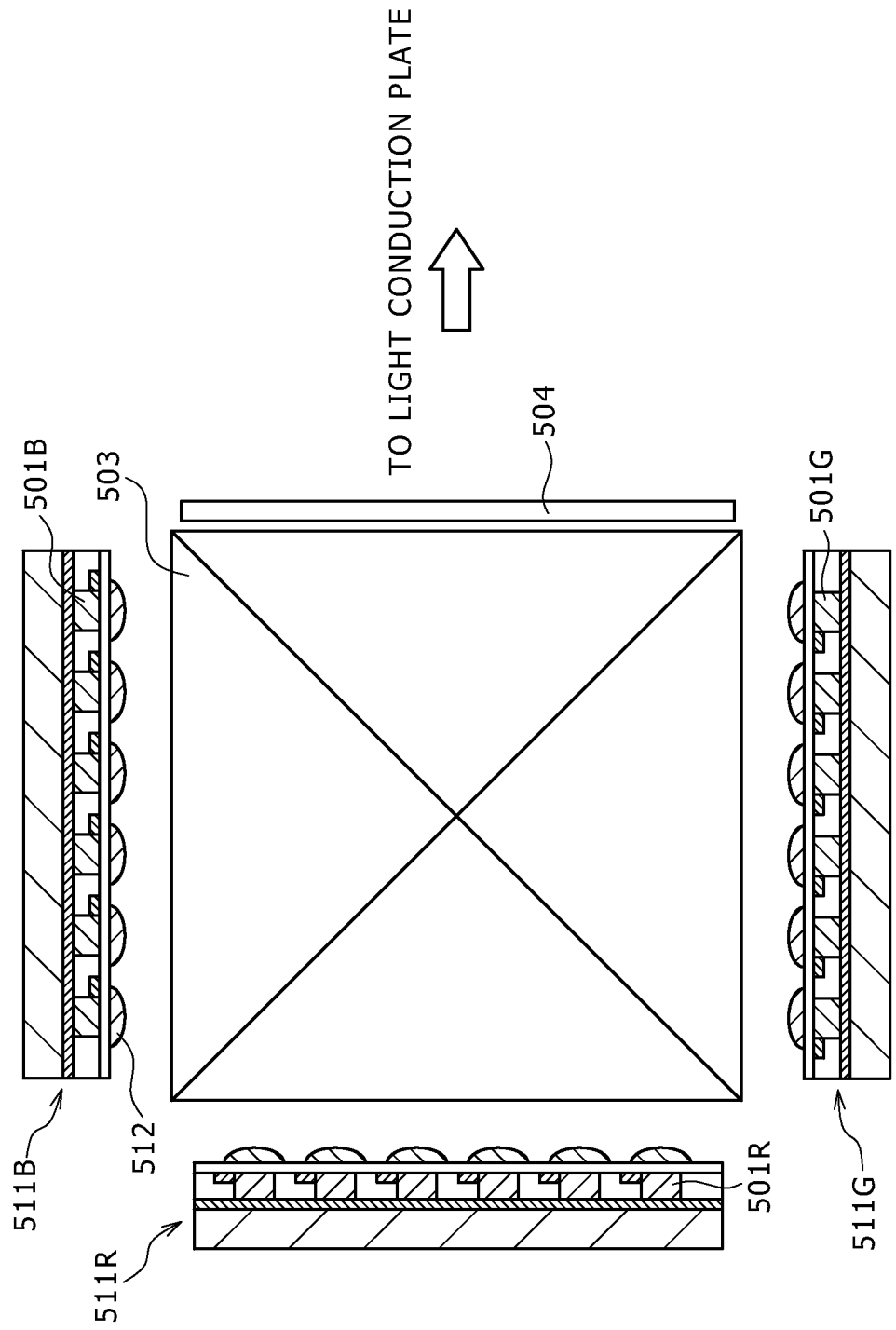

Meanwhile, an image formation apparatus which includes light emitting panels 511R, 511G and 511B in which the light emitting elements 501R, 501G and 501B are arrayed in a two-dimensional matrix, respectively, is shown conceptually shown in FIG. 23. Referring to FIG. 23, light emitted from the light emitting panels 511R, 511G and 511B enters the dichroic prism 503, by which fluxes of the light are integrated into a single light flux. Then, the light emitted from the dichroic prism 503 is controlled to pass or not pass by a light passage controlling apparatus 504 and is introduced to the second light conduction plate 131 or 331 through the collimate optical system 112.

Figure 24:
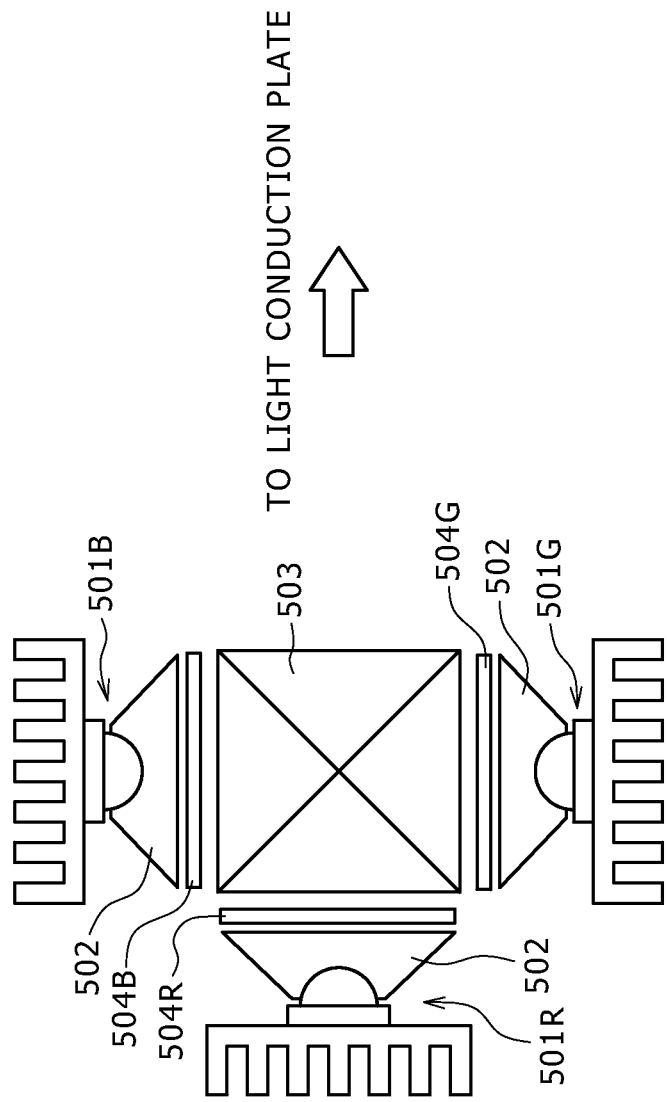
Figure 25:
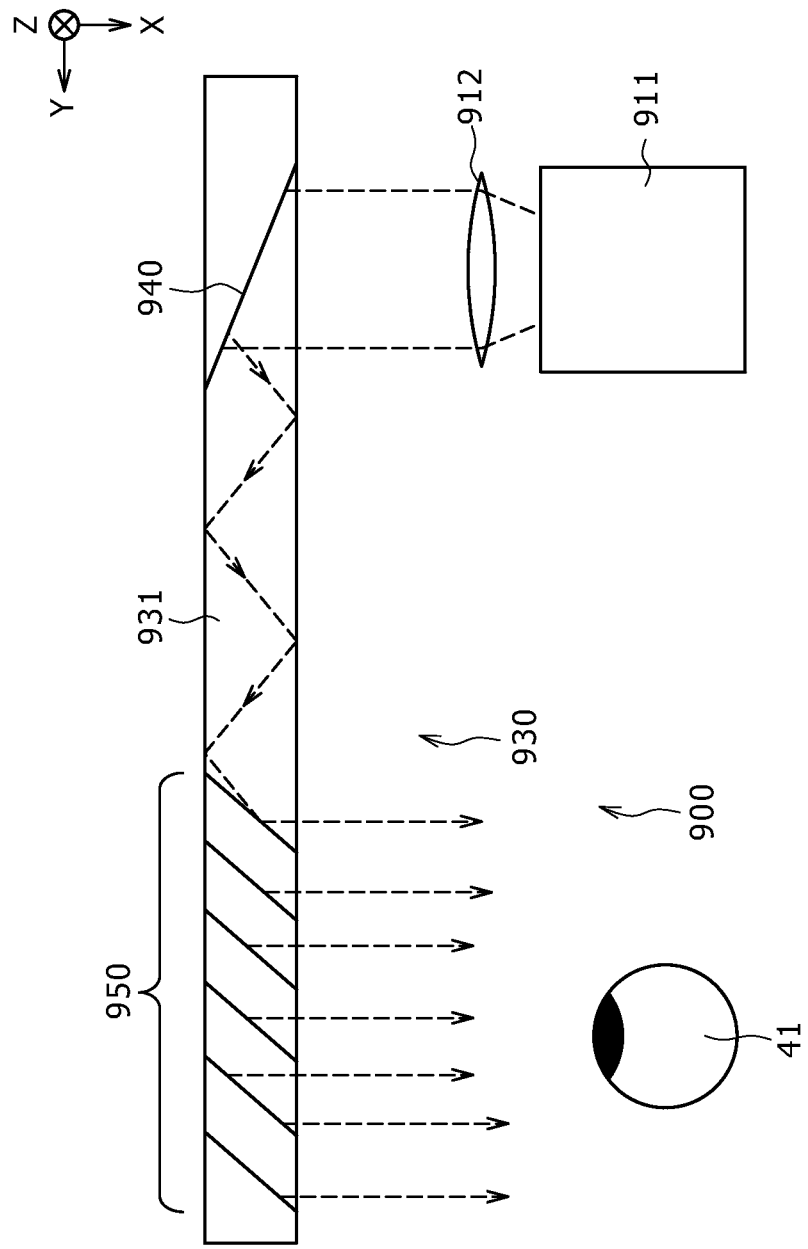
FIG. 25 is a schematic view conceptually showing a conventional image displaying apparatus.
Figure 26:
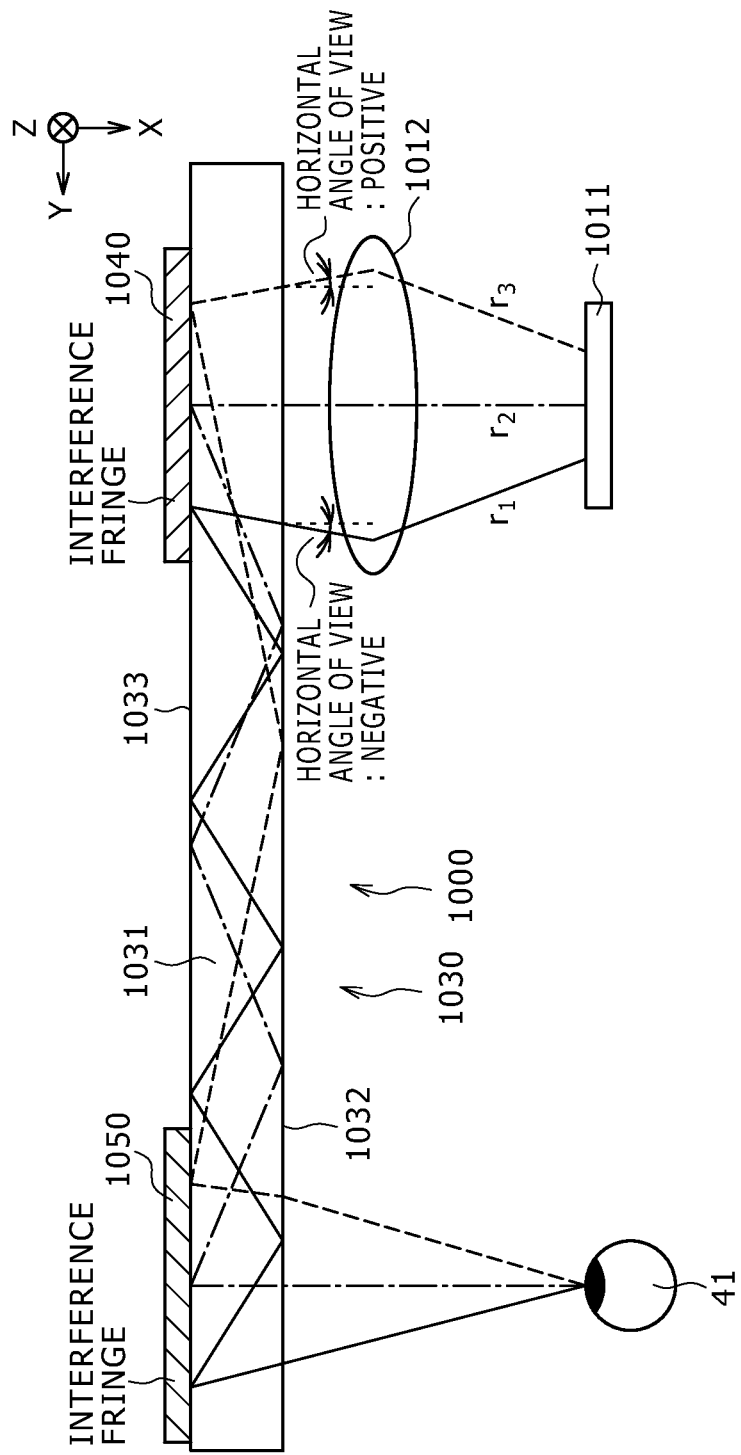
FIG. 26 is a schematic view conceptually showing another conventional image displaying apparatus.
Figure 27:
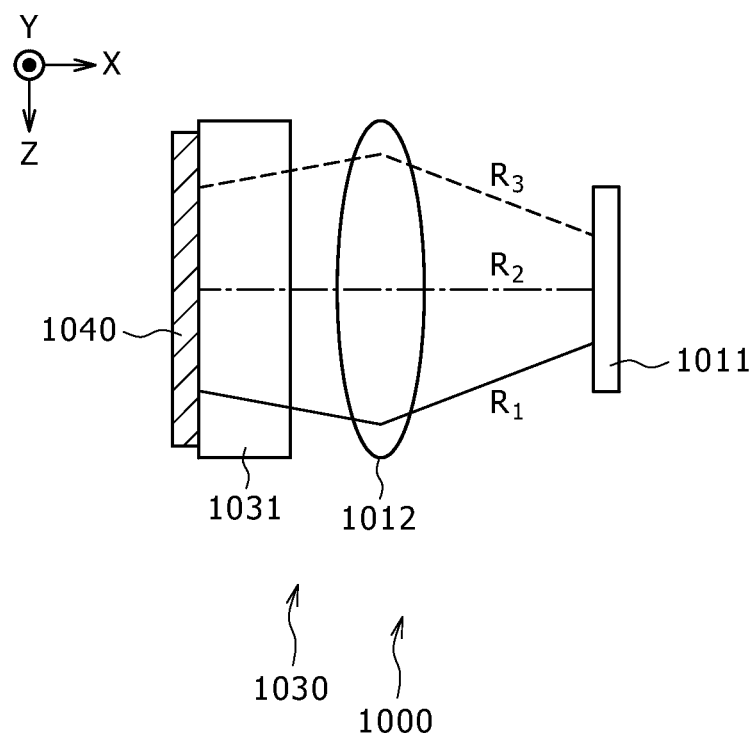
FIG. 27 is a view of the conventional image displaying apparatus of FIG. 25 as viewed from a direction different from that in FIG. 26.
Figure 28A:
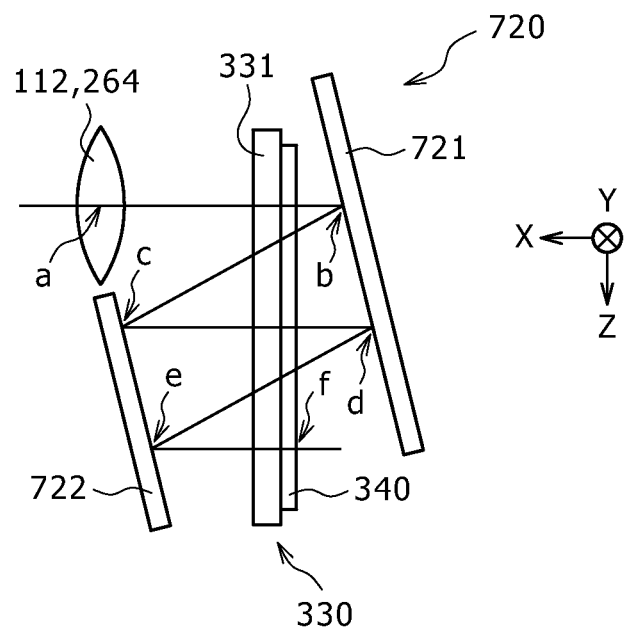
FIGS. 28A and 28B are schematic views of an arrangement state of an image production apparatus, a beam expansion section and a light conduction section in a working example 9 as viewed in a Y direction and a Z direction, respectively.
Figure 28B:
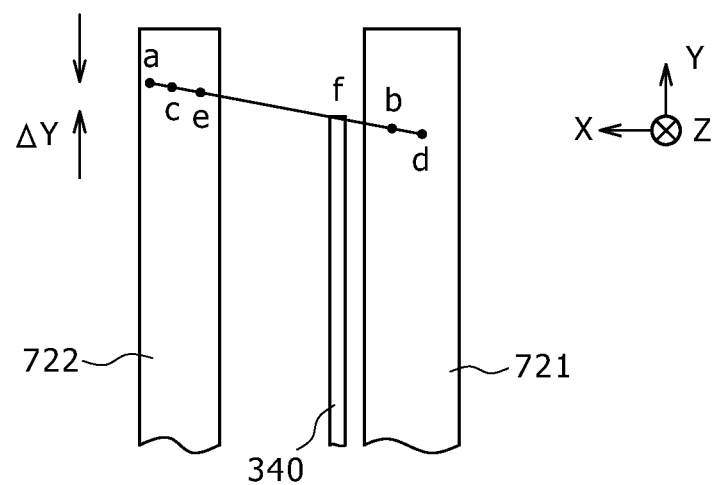
Figure 29A:
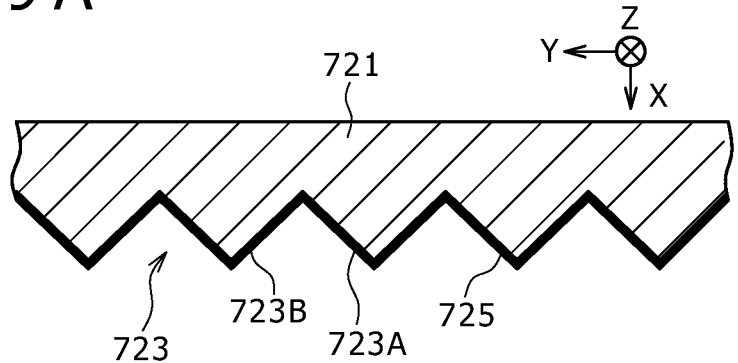
FIGS. 29A and 29B are schematic partial sectional views of the beam expansion section in the working example 9 and FIG. 29C is a schematic view illustrating a state in which light is reflected by the beam expansion section in the working example 9.
Figure 29B:
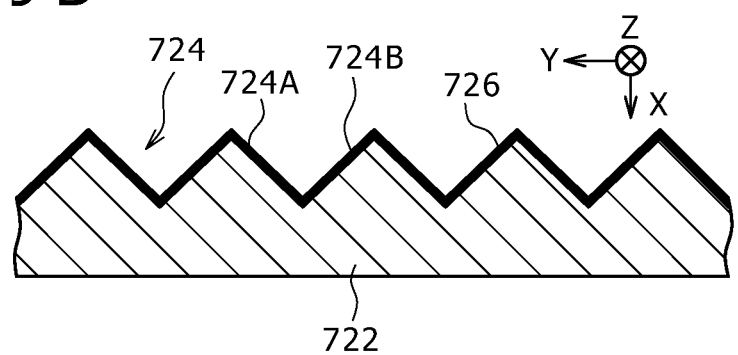
Figure 29C:
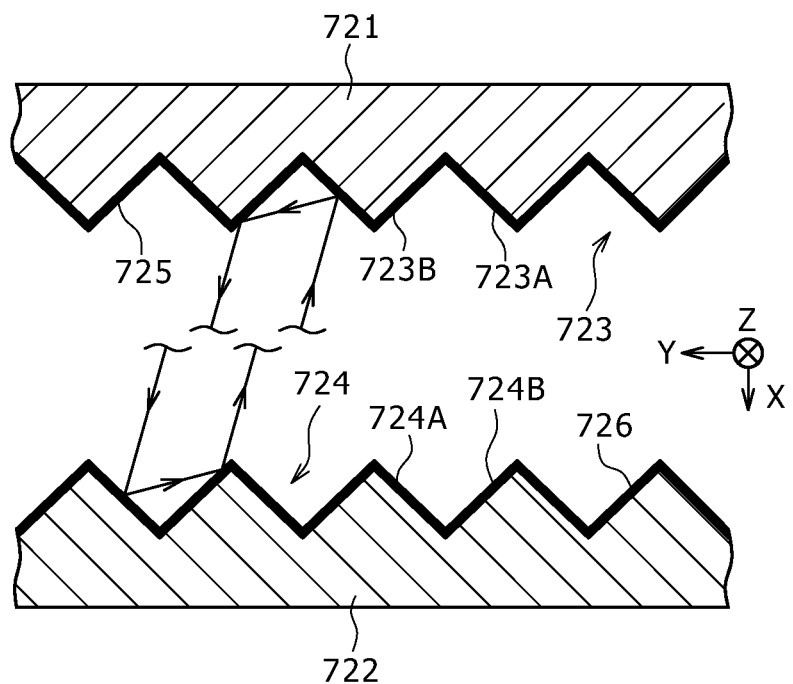
Figure 30A:
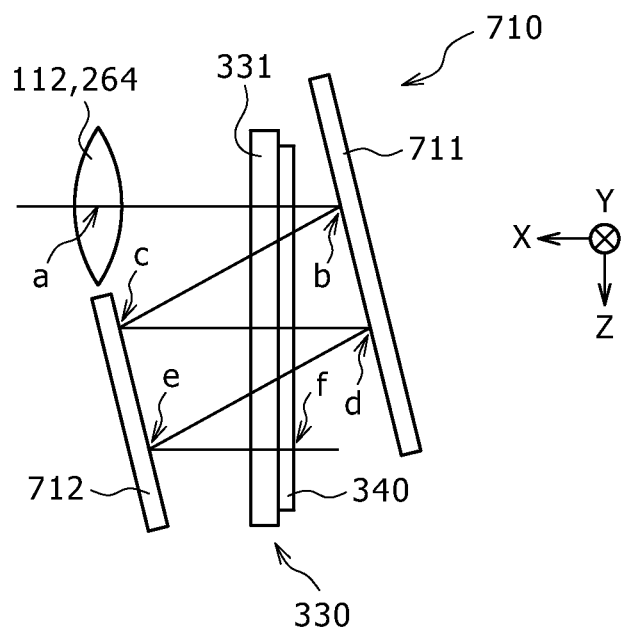
FIGS. 30A and 30B are schematic views illustrating an arrangement state of the image production apparatus, the beam expansion section and the light conduction section in the working example 7 as viewed in a Y direction and a Z direction, respectively.
Figure 30B:
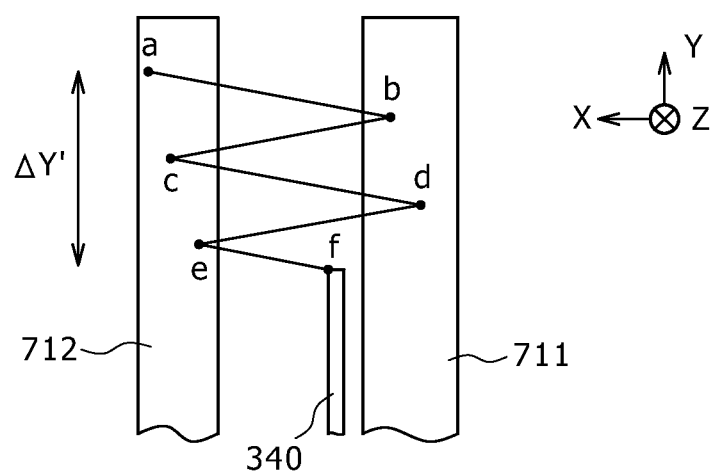

Alternatively, the image information apparatus may have such a configuration as shown in FIG. 24. Referring to FIG. 24, the image formation apparatus includes a red light emitting element 501R for emitting red light and a light passage controlling apparatus such as, for example, a liquid crystal display apparatus 504R which is a kind of light valve for controlling passage/non-passage of light emitted from the red light emitting element 501R, a green light emitting element 501G for emitting green light and a light passage controlling apparatus such as, for example, a liquid crystal display apparatus 504G which is a kind of light valve for controlling passage/non-passage of light emitted from the green light emitting element 501G, and a blue light emitting element 501B for emitting blue light and a light passage controlling apparatus such as, for example, a liquid crystal display apparatus 504B which is a kind of light valve for controlling passage/non-passage of light emitted from the blue light emitting element 501B. The image formation apparatus further includes a light conduction member 502 for conducting light emitted from each of the light emitting elements 501R, 501G and 501B, which are made of a GaN-based semiconductor, and a member such as, for example, a dichroic prism 503 for integrating the light conducted by the light conduction member 502 into a single light flux.

The present application contains subject matter related to that disclosed in Japanese Priority Patent Applications JP 2009-170730 filed in the Japan Patent Office on Jul. 22, 2009 and JP 2010-101615 filed in the Japan Patent Office on Apr. 27, 2010, the entire contents of which is hereby incorporated by reference.

What is claimed is:

1. An image displaying apparatus, comprising:
an image production apparatus that outputs, in an X direction, a beam of light corresponding to a produced image;
a light conduction plate configured to propagate light in a Y direction by total internal reflection;
a first deflection element disposed in the light conduction plate;
a second light deflection element disposed in the light conduction plate;
a beam expanding section comprising a first reflective element and a second reflective element arranged such that the first deflection element is located between the first reflective element and the second reflective element, and configured to expand in a Z direction a diameter of the beam of light output by the image production apparatus,
wherein the first deflection element is configured to deflect a portion of any light flux incident thereon from the X direction in such a manner that the deflected light is propagated within the light conduction plate by total internal reflection and to pass another portion of the light flux to the second reflective element,
wherein the beam expanding section and the first deflection element are configured such that the beam of light, as expanded, is propagated within the light conduction plate by total internal reflection,
wherein the second light deflection element is configured to deflect the beam of light propagating within the light conduction plate so as to emit the beam of light toward the pupil of an observer, and
wherein the Z direction is orthogonal to the X direction and the Y direction.

2. The image displaying apparatus according to claim 1, wherein said beam expanding section is configured to expand a diameter of the beam of light in the Z direction by at least 3 times relative to a diameter of the beam of light in the Z direction prior to the beam of light being expanded.

3. An optical apparatus, comprising:
- a light conduction plate configured to propagate light in a Y direction by total internal reflection;
- a first deflection element disposed in the light conduction plate;
- a second light deflection element disposed in the light conduction plate;
- a beam expanding section comprising a first reflective element and a second reflective element arranged such that the first deflection element is located between the first reflective element and the second reflective element, and configured to expand in a Z direction a diameter of a beam of light received from an X direction,
- wherein the first deflection element is configured to deflect a portion of any light flux incident thereon from the X direction in such a manner that the deflected light is propagated within the light conduction plate by total internal reflection and to pass another portion of the light flux to the second reflective element,
- wherein the beam expanding section and the first deflection element are configured such that the beam of light, as expanded, is propagated within the light conduction plate by total internal reflection,
- wherein the second light deflection element is configured to deflect the beam of light propagating within the light conduction plate so as to emit the beam of light from the light conduction plate
- wherein the Z direction is orthogonal to the X direction and the Y direction.

4. The image displaying apparatus according to claim 3, wherein said beam expanding section is configured to expand a diameter of the beam of light in the Z direction by at least 3 times relative to a diameter of the beam of light in the Z direction prior to the beam of light being expanded.

5. An image displaying apparatus, comprising:
- an image production apparatus that outputs, in an first direction, a beam of light corresponding to a produced image;
- a light conduction plate configured to propagate light in a second direction;
- a first deflection element disposed in the light conduction plate;
- a second light deflection element disposed in the light conduction plate;
- a beam expanding section comprising a first reflective element and a second reflective element arranged such that the first deflection element is located between the first reflective element and the second reflective element, and configured to expand in a third direction a diameter of the beam of light output by the image production apparatus,
- wherein the first deflection element is configured to deflect a portion of any light flux incident thereon from the first direction in such a manner that the deflected light is propagated within the light conduction plate and to pass another portion of the light flux to the second reflective element,
- wherein the beam expanding section and the first deflection element are configured such that the beam of light, as expanded, is propagated within the light conduction plate,
- wherein the second light deflection element is configured to deflect the beam of light propagating within the light conduction plate so as to emit the beam of light from the light conduction plate, and
- wherein the third direction is orthogonal to the second direction and the first direction.

6. The image displaying apparatus according to claim 5, wherein said beam expanding section is configured to expand a diameter of the beam of light in the third direction by at least 3 times relative to a diameter of the beam of light in the third direction prior to the beam of light being expanded.

7. An optical apparatus, comprising:
- a light conduction plate configured to propagate light in a Y direction;
- a first deflection element disposed in the light conduction plate;
- a second light deflection element disposed in the light conduction plate;
- a beam expanding section comprising a first reflective element and a second reflective element arranged such that the first deflection element is located between the first reflective element and the second reflective element, and configured to expand in a Z direction a diameter of a beam of light received from an X direction,
- wherein the first deflection element is configured to deflect a portion of any light flux incident thereon from the X direction in such a manner that the deflected light is propagated within the light conduction plate and to pass another portion of the light flux to the second reflective element,
- wherein the beam expanding section and the first deflection element are configured such that the beam of light, as expanded, is propagated within the light conduction plate,
- wherein the second light deflection element is configured to deflect the beam of light propagating within the light conduction plate so as to emit the beam of light from the light conduction plate, and
- wherein the Z direction is orthogonal to the X direction and the Y direction.

8. The image displaying apparatus according to claim 7, wherein said beam expanding section is configured to expand a diameter of the beam of light in the Z direction by at least 3 times relative to a diameter of the beam of light in the Z direction prior to the beam of light being expanded.

* * * * *